US012755021B2

(12) United States Patent
Kleen et al.

(10) Patent No.: US 12,755,021 B2
(45) Date of Patent: Oct. 6, 2026

(54) APPARATUS AND METHOD FOR BOOTING AN APPLICATION PROCESSOR

(71) Applicant: Intel Corporation, Santa Clara, CA (US)

(72) Inventors: Andreas Kleen, Portland, OR (US); David Sheffield, Portland, OR (US); Xiang Zou, Portland, OR (US); Jason Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/217,361

(22) Filed: Jun. 30, 2023

(65) Prior Publication Data

US 2024/0320341 A1 Sep. 26, 2024

Related U.S. Application Data

(60) Provisional application No. 63/454,265, filed on Mar. 23, 2023.

(51) Int. Cl.
*G06F 21/57* (2013.01)
*G06F 9/30* (2018.01)

(52) U.S. Cl.
CPC ........ *G06F 21/575* (2013.01); *G06F 9/30098* (2013.01)

(58) Field of Classification Search
CPC .................................................. G06F 9/30098
See application file for complete search history.

(56) References Cited

U.S. PATENT DOCUMENTS 6,636,964 B1 * 10/2003 Okamura .............. G06F 9/4406 713/2
7,418,584 B1 8/2008 Klaiber et al.
(Continued)

FOREIGN PATENT DOCUMENTS

EP 3120239 B1 8/2019

OTHER PUBLICATIONS

Intention to Grant, EP App. No. 23212854.6, Apr. 30, 2026, 8 pages.
(Continued)

*Primary Examiner* — Phil K Nguyen
(74) *Attorney, Agent, or Firm* — NICHOLSON DE VOS WEBSTER & ELLIOTT LLP

(57) ABSTRACT

An apparatus and method for booting a processor directly into a paged 64-bit execution environment. For example, one embodiment of an a processor comprises: a register to store a first value and a second value related to a secure boot process; a plurality of cores, at least one of which performs operations comprising: receiving a first initialization message, the core to clear a plurality of registers responsively; receiving a second initialization message and reading the first and second values responsively, the first value indicating whether a first initialization mode is supported, and the second value comprising an address pointer identifying a data structure comprising a plurality of state values; and initializing a paged 64-bit execution environment using the state values from the data structure responsive to the first value indicating the first initialization mode is supported and the data structure indicating enabling the paged 64-bit execution environment.

20 Claims, 25 Drawing Sheets

(56) References Cited

U.S. PATENT DOCUMENTS

| | | | | |
|---|---|---|---|---|
| 10,613,773 | B2 * | 4/2020 | Roche | G06F 9/4401 |
| 2002/0099893 | A1 | 7/2002 | Nguyen et al. | |
| 2003/0229794 | A1 | 12/2003 | Sutton et al. | |
| 2005/0114639 | A1 | 5/2005 | Zimmer | |
| 2008/0165288 | A1 * | 7/2008 | Miller | H04N 21/4432 348/725 |
| 2014/0281092 | A1 | 9/2014 | Jayakumar et al. | |
| 2014/0325203 | A1 * | 10/2014 | Roche | G06F 3/0679 713/2 |
| 2016/0056960 | A1 * | 2/2016 | Sutton | G06F 21/57 713/189 |
| 2017/0085384 | A1 | 3/2017 | Tsuji et al. | |
| 2017/0286318 | A1 | 10/2017 | Brannock et al. | |
| 2019/0156015 | A1 | 5/2019 | Brannock et al. | |
| 2020/0249957 | A1 * | 8/2020 | Qin | G06F 9/4405 |
| 2021/0326142 | A1 * | 10/2021 | Banik | G06F 12/084 |

OTHER PUBLICATIONS

Intention to Grant, EP App. No. 23212854.6, Jan. 5, 2026, 6 pages.

Extended European Search Report, EP App. No. 23217049.8, May 2, 2024, 13 pages.

Intention to Grant, EP App. No. 23217049.8, May 20, 2025, 6 pages.

Anonymous, "x86 Assembly/Protected Mode", WikiBooks, Available Online at <https://en.wikibooks.org/wiki/X86_Assembly/Protected_Mode>, Oct. 23, 2020, 5 pages.

Extended European Search Report, EP App. No. 23212854.6, May 15, 2024, 11 pages.

Pelner et al., "Minimal Intel Architecture Boot Loader", Intel, White Paper, Jan. 2010, 26 pages.

Non-Final Office Action, U.S. Appl. No. 18/375,381, May 20, 2026, 13 pages.

* cited by examiner

700

| cycle | 0 | 1 | 2 | 3 | 4 | 5 | 6 | 7 | 8 | 9 | 10 |
|---|---|---|---|---|---|---|---|---|---|---|---|
| zero-level hit | **rs2** | **rs3** | **rs4/zld1** | **rs5/zld2** | **zld3** | **zld4** | **rs1** | **rs2** | | | |
| | rs dispatch | rc + dispatch xbar | AGU L0 mem | L0 Hit | iclb setup wr iclb credit return | RC | *iclb_credit receipt* | dispatch | | | |
| zero level miss, not min | **rs2** | **rs3** | **rs4** | **rs5/flr1** | **flr2** | **flr3** | **rs1** | **rs2** | | | |
| | rs dispatch | rc + dispatch xbar | dispatch xbar / AGU | | iclb setup wr iclb credit return | RC | *iclb_credit receipt* | dispatch agu | | | |
| zero level miss, min slice | **rs2** | **rs3** | **rs4** | **flr1** | **fld2** | **fld3** | **fld4** | **fld5** | **fld6** | **rs1** | **rs2** |
| | rs dispatch | rc + dispatch xbar | dispatch xbar + AGU | agu xbar + bypass | L1 tag read | L1 tag match | writeback | rc + iclb credit return | RC | *iclb_credit receipt* | dispatch |
| iclb_avail count | | | | | decrement | | | increment | updated | | |

*Fig. 7*

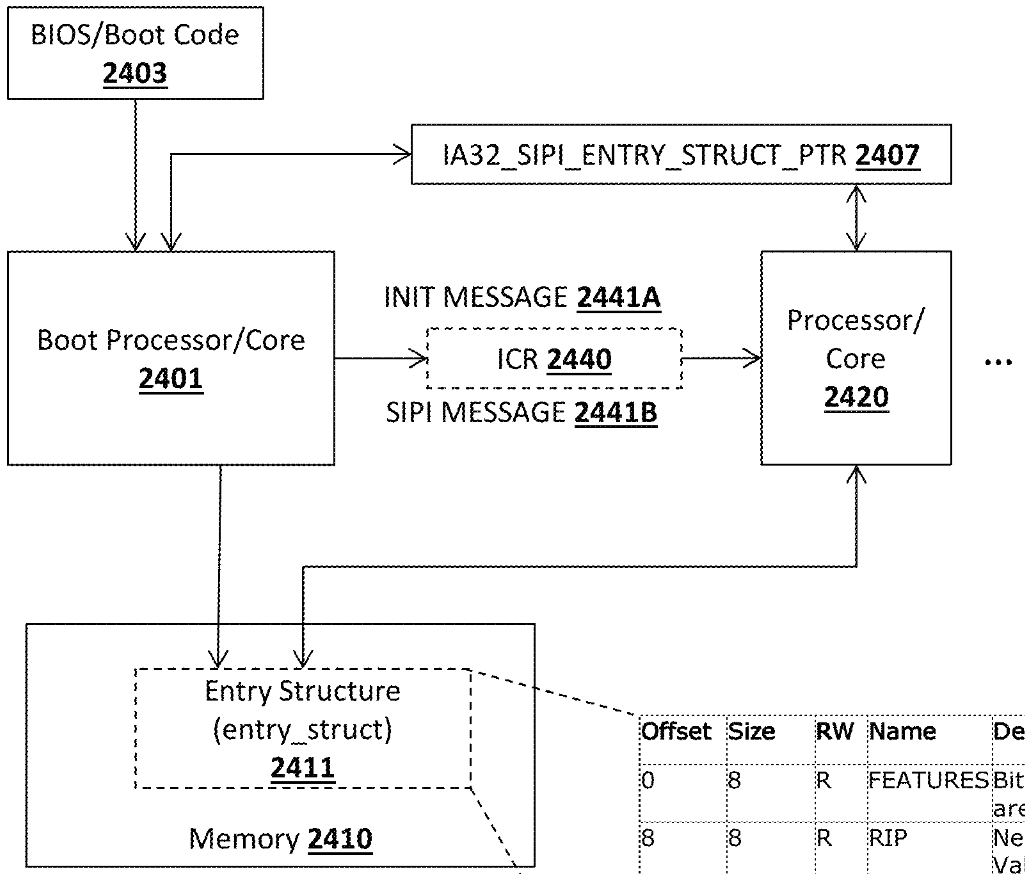

| Offset | Size | RW | Name | Description |
|---|---|---|---|---|
| 0 | 8 | R | FEATURES | Bit 0 - enable bit (0 - shutdown). Other bits are reserved. |
| 8 | 8 | R | RIP | New instruction pointer to execute after SIPI. Valid values depend on new CR4. |
| 16 | 8 | R | CR3 | New CR3 value. Must be consistent with new CR4.PCIDE and no reserved bits set. |
| 24 | 8 | R | CR0 | New CR0 value. Non-flexible bits must match fixed values and no reserved bits set. |
| 32 | 8 | R | CR4 | New CR4 value. Non-flexible bits must match fixed value. Must be consistent with new CR3 new RIP, new CR0 and no reserved bits set. |

*Fig. 24*

APPARATUS AND METHOD FOR BOOTING AN APPLICATION PROCESSOR

CROSS-REFERENCE TO RELATED APPLICATIONS

This application claims the benefit of U.S. Provisional Application No. 63/454,265, filed Mar. 23, 2023, which is hereby incorporated by reference.

TECHNICAL FIELD

The embodiments of the disclosure relate generally to the field of computer processors. More particularly, the embodiments relate to an apparatus and method for booting an application processor.

BACKGROUND ART

A computer processor may be booted up through a boot process. During an initialization stage, a processor is initialized, and memory is checked for errors. The processor then enters another stage of the boot process, which is the System Initialization and Power-On Self-Test (SIPOST) stage and performs a series of diagnostic tests on various hardware components, initializes and configures the system's hardware components, and selects the boot device from which the operating system will be loaded. The operating system (OS) is then loaded into memory and the OS startup process initiated.

The processor may be booted in the 16-bit real mode, where it starts up using 16-bit addressing directly to access up to 1 megabyte (MB) of memory using a segmented memory model. The available memory is divided into segments, and the segment registers (CS, DS, ES, FS, GS, SS) hold the segment addresses. A 16-bit offset is added to the base address held in the segment register to complete the memory address.

Yet newer processors operate in a paged 64-bit mode, where the processor operates in a 64-bit instruction set architecture (ISA) and utilizes paging mechanisms to manage memory addressing. In the paged 64-bit mode, the processor employs paging mechanisms to manage memory addressing and translation. It is difficult to support the earlier boot process in the 16-bit real mode that is not supported by the newer compilers, and supporting other alternative boot processes in the newer processors is cumbersome.

BRIEF DESCRIPTION OF THE DRAWINGS

The disclosure may best be understood by referring to the following description and accompanying drawings that are used to show embodiments of the disclosure.

FIG. 7 illustrates a timing diagram for incomplete load buffer (ICLB) credit returns according to examples of the disclosure.

FIG. 24 illustrates an architecture and associated process for booting a processor/core in accordance with some embodiments.

DETAILED DESCRIPTION

Figure 1:
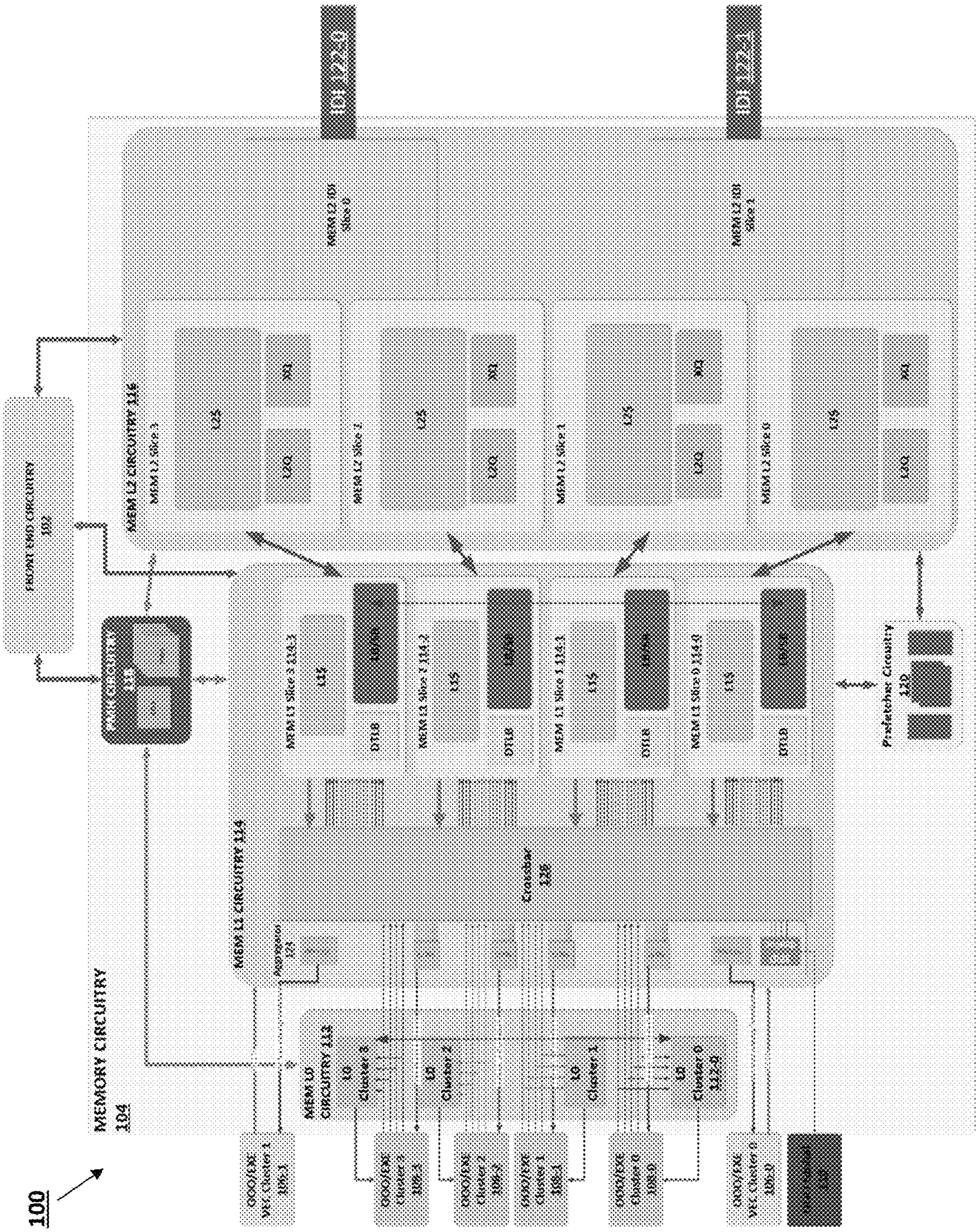
FIG. 1 illustrates a block diagram of a hardware processor (e.g., core) comprising a set of clusters of execution circuits coupled to memory circuitry that includes a level (e.g., L1) of memory circuitry that is sliced according to address values according to examples of the disclosure.

The present disclosure relates to methods, apparatus, systems, and non-transitory computer-readable storage media for booting an application processor.

In the following description, numerous specific details are set forth. However, it is understood that examples of the disclosure may be practiced without these specific details. In other instances, well-known circuits, structures, and techniques have not been shown in detail in order not to obscure the understanding of this description.

References in the specification to "one example," "an example," "examples," etc., indicate that the example described may include a particular feature, structure, or characteristic, but every example may not necessarily include the particular feature, structure, or characteristic. Moreover, such phrases do not necessarily refer to the same example. Further, when a particular feature, structure, or characteristic is described in connection with an example, it is submitted that it is within the knowledge of one skilled in the art to affect such feature, structure, or characteristic in connection with other examples whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Certain operations include accessing one or more memory locations, e.g., to store and/or read (e.g., load) data. A system may include a plurality of cores, e.g., with a proper subset of cores in each socket of a plurality of sockets, e.g., of a system-on-a-chip (SoC). Each core (e.g., each processor or each socket) may access data storage (e.g., a memory). Memory may include volatile memory (e.g., dynamic random-access memory (DRAM)) or (e.g., byte-addressable) persistent (e.g., non-volatile) memory (e.g., non-volatile RAM) (e.g., separate from any system storage, such as, but not limited, separate from a hard disk drive). One example of persistent memory is a dual in-line memory module (DIMM) (e.g., a non-volatile DIMM), for example, accessible according to a Peripheral Component Interconnect Express (PCIe) standard.

In certain examples, a hardware processor core includes memory circuitry (e.g., as an "execution circuitry" of the core). In certain examples, the memory circuitry processes memory requests and page translation requests from front end circuitry (e.g., including fetch circuitry for fetching instructions from memory, decoder circuitry for decoding instructions, and delivering them to scheduling/execution circuitry). In certain examples, memory circuitry processes load operations (e.g., load micro-operations (μops)) and store operations (e.g., store micro-operations (μops)), returning the results, and/or final status (e.g., complete or incomplete (e.g., fault)) to the out-of-order (OOO) circuitry for subsequent instructions and/or instruction retire. In certain examples, memory circuitry receives off core (e.g., uncore) snoops and ensures that correct coherence actions are taken in the core. In certain examples, memory circuitry is sub-divided into multiple sections (e.g., parcels). In certain examples, memory circuitry is sub-divided into five distinct sections (e.g., parcels): L0 memory circuitry (e.g., zeroth level), L1 memory circuitry (e.g., first level), L2 memory circuitry (e.g., second level), page miss handler (PMH) circuitry, and prefetcher circuitry.

Data may be stored in a processor's cache (e.g., of any level, such as, but not limited to, L3, L2, L1, L0, etc.), system memory (e.g., separate from a processor), or combinations thereof. In certain examples, memory is shared by multiple cores. In certain examples, a cache line is a section (e.g., a sector) of memory (e.g., a cache) that is managed as a unit for coherence purposes. In certain examples, a cache line is referenced by an (e.g., virtual) address, e.g., a program address that the memory maps to a physical address. A virtual address may be a linear address. Mapping may occur during a process referred to as translation. In certain examples, a linear address is formed by adding (e.g., concatenating) a segment address (e.g., referred to by a segment selector) to the virtual address (e.g., virtual offset).

To effectively manage complexity, in certain examples the memory circuitry (e.g., cache) is divided internally into clusters in some sections, and into slices in other sections. In certain examples, clusters divide the instruction stream into (e.g., medium-sized) groups of contiguous instructions called "strands", and then one or more strands may be executing on a cluster at a time. In certain examples, clusters are most effective when executing work that is adjacent in program order to other work. In certain examples, the memory circuitry in the L0 memory circuitry (e.g., level 0) is clustered.

In certain examples, slices divide the memory instruction stream based upon the (e.g., linear) addresses the instructions access. In certain examples, slices create an inherent proof that certain memory instructions can mostly ignore other instructions, and therefore reduce ordering and correctness checks, when different memory instructions have been assigned to different slices. In certain examples, slices are most effective when the memory address pattern is relatively balanced across cache lines. In certain examples, the memory circuitry in (e.g., only) the L1 memory circuitry (e.g., first level) and/or the L2 memory circuitry (e.g., second level) memory circuitry (e.g., zeroth level) are both sliced.

In certain examples, to transition between the cluster domain and the slice domain, memory operations traverse a crossbar (e.g., a crossbar switch).

FIG. 1 illustrates a block diagram of a hardware processor (e.g., core) 100 comprising a set of clusters of execution circuits coupled to memory circuitry that includes a level (e.g., L1) of memory circuitry that is sliced according to address values according to examples of the disclosure. In certain examples, processor core 100 is a core of a system disclosed herein, e.g., in FIGS. 12 through 23. In certain examples, processor core 100 couples to a system memory, e.g., memory 1232 in FIG. 12.

Depicted processor (e.g., core) 100 includes front end circuitry 102 (e.g., including fetch circuitry for fetching instructions from memory, decoder circuitry for decoding instructions, and delivering them to scheduling/execution circuitry). Depicted processor (e.g., core) 100 includes out-of-order (OOO) (e.g., out of program order) and execution clusters, e.g., a vector out-of-order (OOO) (e.g., out of program order) and execution clusters 106-0 to 106-1 (although two vectors clusters are shown, a single, none, or any plurality of vector clusters may be utilized in certain examples), and (e.g., scalar) out-of-order (OOO) (e.g., out of program order) and execution clusters 108-0, 108-1, 108-2, and 108-3 (although four scalar clusters are shown, a single, none, or any plurality of scalar clusters may be utilized in certain examples). In certain examples, the hardware processor (e.g., core) 100 includes OOO global circuitry 110, e.g., to maintain global ordering in an out-of-order superscalar processor core. In certain examples, the OOO global circuitry 110 includes circuitry to maintain global ordering in a processor core that utilizes multiple clusters to execute multiple strands.

Depicted processor (e.g., core) 100 includes memory circuitry 104, e.g., as a multiple level cache. In certain examples, memory circuitry 104 includes a coupling to additional (e.g., system) memory, for example, in-die interface (IDI) 122-0 and/or in-die interface (IDI) 122-1.

In certain examples, the memory circuitry 104 includes five distinct sections (e.g., parcels): L0 memory circuitry (e.g., L0 MEM) 112, L1 memory circuitry (e.g., L1 MEM) 114, L2 memory circuitry (e.g., L2 MEM) 116, page miss handler (PMH) circuitry 118, and prefetcher circuitry 120.

L0 MEM

Figure 2:
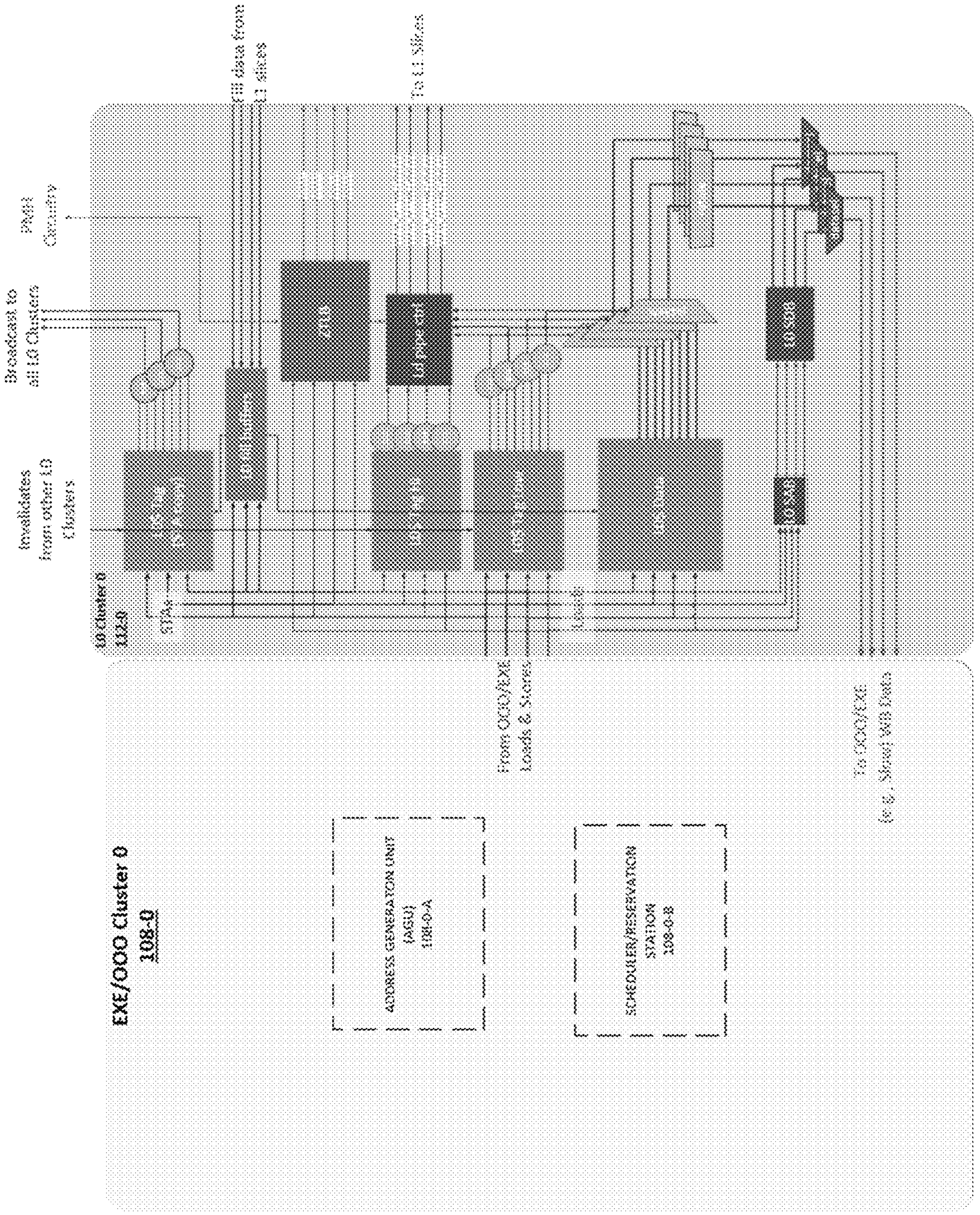
FIG. 2 illustrates a more detailed block diagram of an execution cluster coupled to a cluster of a level (e.g., L0) of memory circuitry according to examples of the disclosure.

FIG. 2 illustrates a more detailed block diagram of an execution cluster 108-0 coupled to a Level 0 (L0) cluster 112-0 comprising L0 memory circuitry according to examples of the disclosure. The depicted cluster 108-0 includes an address generation unit 108-0-A to generate memory addresses and a scheduler/reservation station 108-0-B for scheduling memory access operations to be serviced by one or more of the levels of memory described herein (e.g., L0 memory, L1 memory, L2 memory, etc.).

Referring to FIGS. 1 and 2, in certain examples, the L0 MEM 112 is the smallest, fastest unit of memory in memory circuitry 104 (e.g., in core 100) and attempts to service loads in a certain number of threshold cycles (e.g., about 3). In certain examples, L0 MEM 112 attempts to satisfy a portion of loads (e.g., about 40%) that meet the most common cases. In certain examples, L0 MEM 112 has two key benefits that it provides: first, it provides a large fraction of loads with low latency, and second, it provides bandwidth resilience for the larger L1 MEM 114 that is sliced by address. Without the L0 MEM 112, load operations mapped to the same cache line (and therefore the same L1 MEM 114 slice) would be limited by the comparatively narrow bandwidth of an L1 MEM slice. In some embodiments, the L0 MEM 112 alleviates bandwidth to the L1 MEM by maintaining a cache of the most frequently used addresses and servicing the hot-line loads.

In certain examples, L0 MEM 112 is divided into clusters. For example, with one cluster of L0 MEM 112 attached to one OOO cluster, e.g., cluster 112-0 of L0 MEM 112 attached to OOO cluster 108-0, etc. In certain examples, L0 MEM 112 operates in parallel with L1 MEM 114, e.g., L0 MEM 112 will attempt to service a load in parallel with the load being transmitted to L1 MEM 114 over the crossbar 126. In certain examples, if L0 MEM 112 is successful in completing a load, it will send an "10_complete" signal to L1 MEM 114, which will prevent loads from being dispatched in L1 or cancel them in-flight.

In certain examples, L0 MEM 112 will have a lower hit rate compared to L1 MEM 114, and thus, to avoid spurious wakeups, an L0 hit predictor may be used in OOO to determine when to generate a wakeup signal to the reservation station (RS) to schedule the dependents in L0 timing.

In certain examples, each cluster of L0 MEM 112 contains its own:

- Zero-Level Cache (ZLC) (e.g., L0 cache (L0$) tag array and L0$ data array). In certain examples, the L0$ tag array may be subdivided into L0$ tag low array and L0$ tag high array to reduce access latency: Small set-associative cache that features a low access latency, e.g., where the ZLC is virtually indexed and virtually tagged.
- L0 Store Address Buffer (L0SAB): Subset of the full store address buffer. In certain examples, this contains only the portion of fields of stores needed for store to load forwarding, and only the stores within the attached OOO cluster.
- L0 Store Data Buffer (LOSDB): Subset of the full store data buffer. In certain examples, this contains store data only for the bottom (e.g., 64) bits of each store, and only the stores within the attached OOO cluster.
- Zero-Level TLB (ZTLB): Small fully-associative TLB used to prove that a linear address maps to cacheable memory and is therefore legal for completion in L0 MEM, and provide a physical address translation. (Either from ZLC or Store-to-Load forwarding).
- Zero-Level Fill Buffers (LOFB): one buffer per L1 slice.
- L0 Mini-Memory Order Buffer (MOB): Small store-to-load forwarding scheduler, with a plurality of (e.g., 4) entries per load pipeline (e.g., "pipe"). In certain examples, some parts also live in OOO, but L0 MEM is responsible for entry allocation, data read, and write-back. In certain examples, the mini-MOB also has the Stale Data Watchdog (SDW) which disables mini-MOB allocation if deallocated SDB entries cause too many loads to nuke.

In certain examples, each cluster of L0 MEM 112 also includes some pieces physically located in OOO, but logically owned by MEM:

- Memory Disambiguation (MD) Predictor: CEIP (e.g., a hashed effective instruction pointer)-indexed structure to predict whether a load may bypass unknown store addresses (e.g., "STAs") without generating a clear.
- L0 Load Hit Predictor (LOLHP): CEIP-indexed structure to predict whether a load will hit the L0 (either ZLC or L0SAB). In certain examples, this will wake up the load's dependents if it predicts hit.
- L0 Mini-MOB: OOO is responsible for wakeup and scheduling.

In certain examples, each cluster of L0 MEM 112 has its own set of pipelines:

- L0 Load Pipeline: In certain examples, this is the only load pipeline in L0 MEM. In certain examples, this is responsible for receiving load dispatch and AGU payloads, looking up the Zero Level Cache, checking the L0SAB for address overlap, and potentially forwarding data.
- L0 Mini-MOB Pipeline: Handles loads that schedule out of the mini-MOB. In certain examples, this is responsible for reading data from a known store data buffer (SDB) entry and writing back.
- L0 Store Address Pipeline: Pipeline to receive store address payloads, update L0SAB, and invalidate L0 cache entries and fill buffers that match store address.
- L0 Store Data Pipeline: Pipeline to receive store data payloads and update LOSDB.
- ZLC Fill Pipeline: Receives data from the L1 MEM and fills it into the ZLC.

L1 MEM

Figure 3:
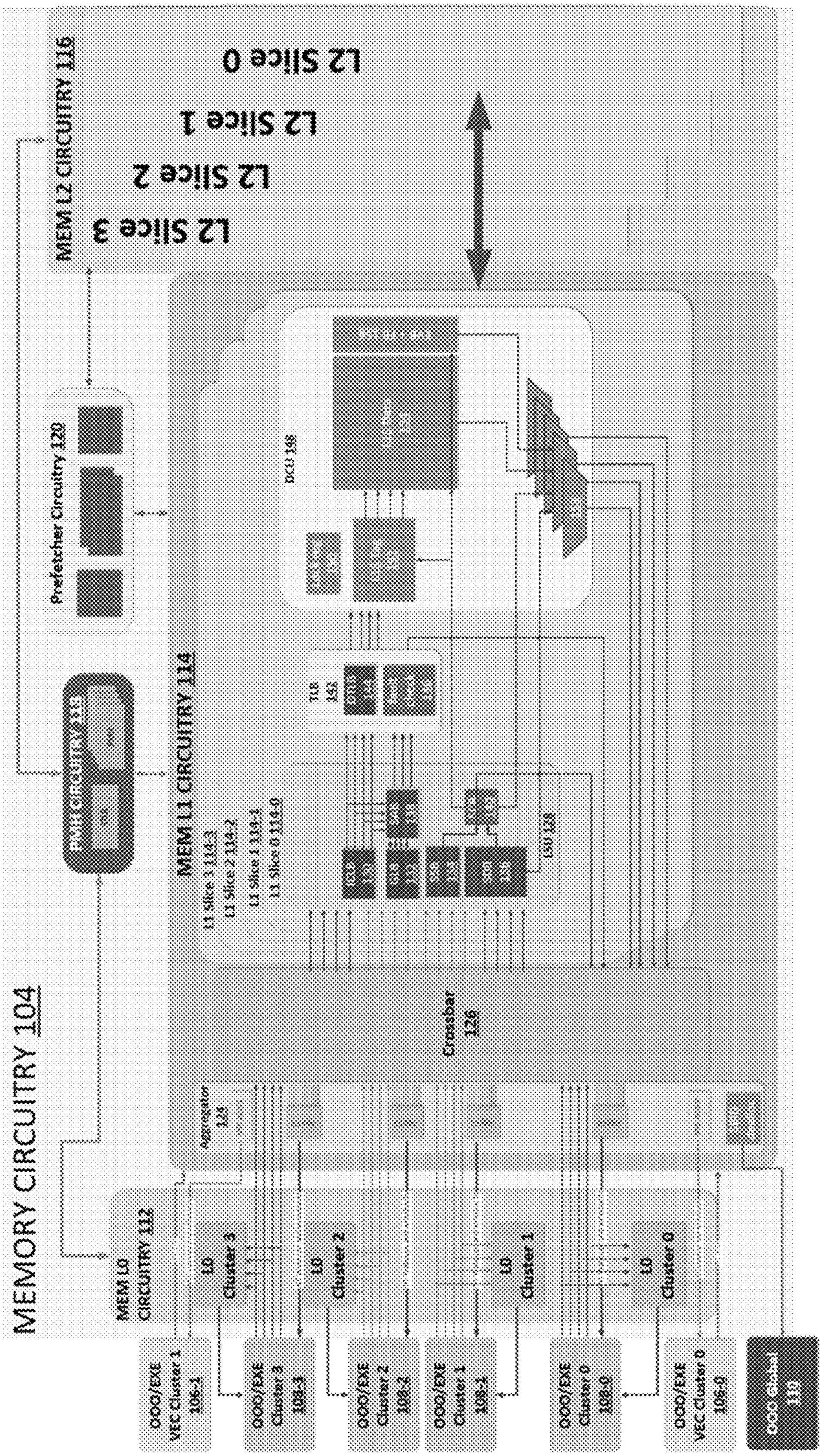
FIG. 3 illustrates a more detailed block diagram of the level (e.g., L1) of memory circuitry that is sliced according to address values according to examples of the disclosure.

FIG. 3 illustrates a more detailed block diagram of the level (e.g., L1) 114 of memory circuitry that is sliced according to address values according to examples of the disclosure. In certain examples, a load pipeline includes the components shown in load store unit 128.

Figure 4:
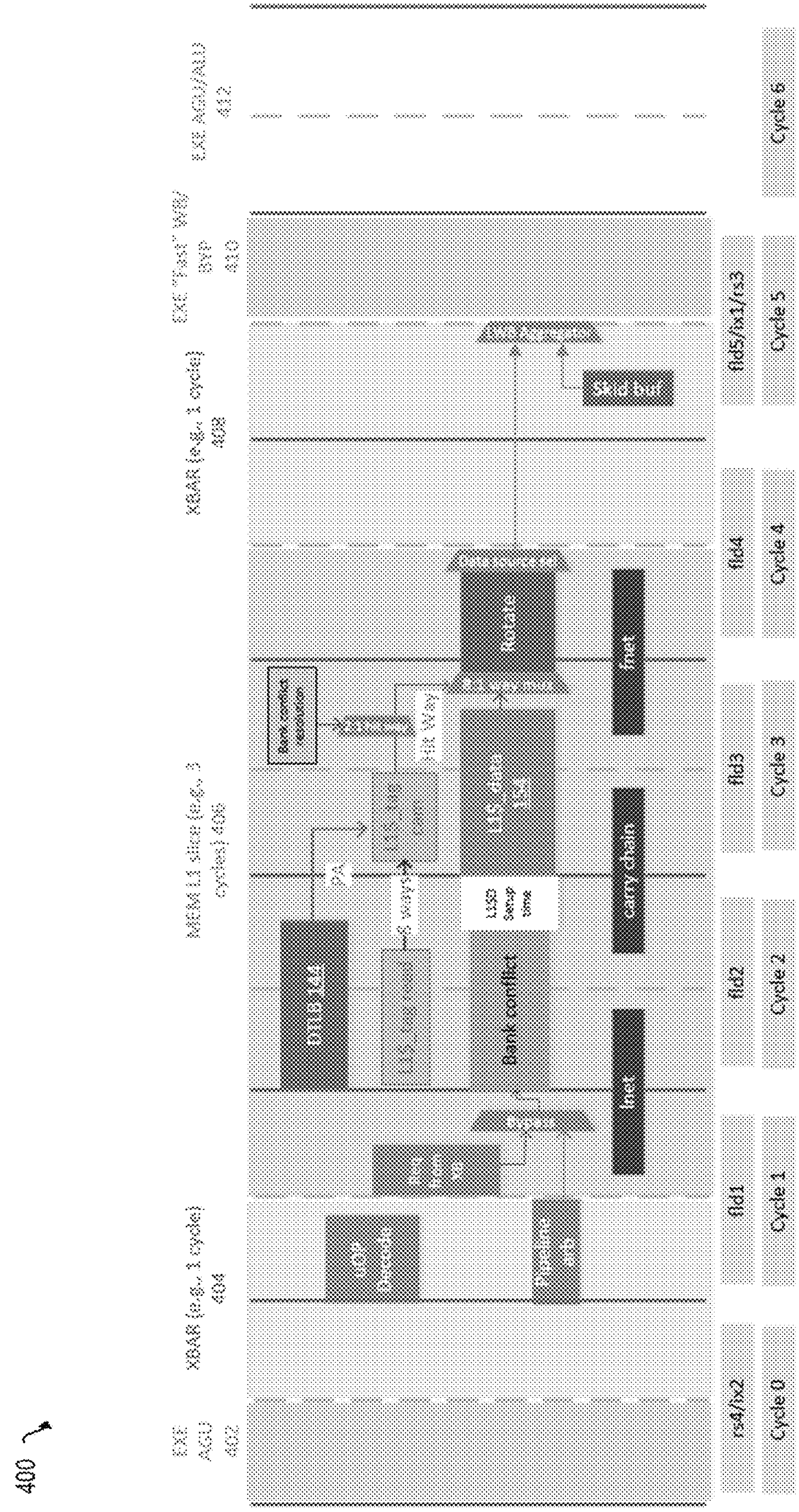
FIG. 4 illustrates a six-cycle load-to-use timing path for a hit in a data cache of the level (e.g., L1) of memory circuitry that is sliced according to address values according to examples of the disclosure.

Referring to FIGS. 1 and 2, in certain examples, the L1 MEM is a L1 unit of memory in memory circuitry 104 (e.g., in core 100) with (e.g., larger than L0's) caches, (e.g., larger than L0's) buffers, and supports all loads and stores (e.g., in a moderate latency). In certain examples, the L1 MEM 114 has interfaces with the out-of-order circuitry (OOO) (e.g., OOO 502 in FIG. 5), the execution circuitry (EXE) (e.g., EXE 504 in FIG. 5) (e.g., cumulatively OOO/EXE clusters), and the front end (FE) circuitry 102. In certain examples, the OOO and EXE interfaces are used to synchronize processing around loads and stores, while the FE interface is used to detect potential self-modifying code (SMC) cases. In certain examples, loads that complete out of L1 MEM 114 will have a relatively short (e.g., six as shown in FIG. 4) cycle load-to-use latency, e.g., assuming the most favorable and fastest alignments.

In order to provide scalable performance, the L1 MEM 114 is sliced by address. In certain examples, a given cache line of memory may only exist in a single slice of L1 MEM. This provides significant scope reduction of memory ordering checks. In certain examples, there are a plurality (e.g., shown as 4 slices, although other numbers of slices may be utilized) of L1 MEM 114, where each slice contains a different range of address values compared to the other slices. In certain examples, after a load or store has passed address generation (e.g., by AGU as shown in FIG. 2), the appropriate L1 slice for that memory operation is determined by looking at the (e.g., linear) address bits of the load or store. In the case of line splits, multiple L1 MEM slices may be needed to produce the final load or store result. In certain examples, a given (e.g., single) cache line of memory will only exist in a single slice of memory, e.g., and a load or a store can be split such that there is access to some byte(s) in a first cache line and then the rest of the byte(s) in the subsequent cache line (e.g., to logically form the single cache line). In certain examples, a split happens when a load or store starts too close to the end of the line (e.g., for a request for 8 bytes starting from the last byte of one cache line, which splits as one (the last) byte from the one cache line and the (first) seven bytes of the next cache line).

In certain examples, each OOO/EXE cluster can produce at most a first threshold (e.g., 4) loads or at most a second threshold (e.g., 3) stores per cycle (e.g., loads or stores within respective data cache unit in each slice, e.g., with data cache unit 148 shown for L1 slice 0 114-0), or a combination of the two up to a total of a third threshold (e.g., 4) of memory operations (e.g., μops). Ideally, the addresses of these memory operations (e.g., μops) are distributed evenly across the (e.g., 4) slices. However, in the worst scenario in one example, each slice can receive 16 loads or 12 store addresses and 12 store data. In certain examples, the L1 mem slices guarantee they will sink all requests that they receive from OOO/EXE. In certain examples, the L1 mem slices will buffer these memory operations (e.g., μops) in the load and store buffers and in each cycle select up to the first threshold (e.g., 4) loads and the second threshold (e.g., 3) store addresses to be executed. In certain examples, L1 MEM has separate pipelines for loads and stores and each slice may write back to EXE/OOO up to the first threshold (e.g., 4) loads and the second threshold (e.g., 3) store addresses.

The MEM L1 circuitry 114 includes crossbar 126 as a set of couplings (e.g., wires) which connect all OOO/EXE clusters to all L1 MEM slices.

In certain examples, the OOO circuitry is organized into a plurality of (e.g., 4) clusters which feed memory operations (e.g., μops) to the (e.g., same number of) L1 MEM slices. However, in certain examples, the cluster is address agnostic and does not know ahead of time to which slice it should send the memory operation (e.g., μop). As such, in certain examples, the OOO (e.g., of an OOO/EXE cluster) broadcasts the memory operations (e.g., μops) (e.g., via a DispatchAGU indication) to all slices, and a certain number of cycles later the EXE (e.g., of an OOO/EXE cluster) broadcasts the address it computed. In certain examples, each slice will check the (e.g., linear) address (e.g., a proper subset of the bits, e.g., bits in bit positions [7:6]) and determine whether the memory operation (e.g., μop) belongs to the slice. In certain examples, if bit positions [7:6] of the (e.g., linear) address are 0b00 (e.g., in binary format), the memory operation will be sent to slice 0, while if bit positions [7:6] of the (e.g., linear) address are 0b11, the memory operation will be sent to slice 3.

In certain examples, the crossbar 126 of the L1 MEM circuitry 114 is responsible for transmitting load memory operations (e.g., load μops), store address memory operations (e.g., store address μops), and store data memory operations (e.g., store data μops) from OOO and EXE clusters into L1 MEM slices. In certain examples, while loads and stores have specific target slices based on their address, the information is broadcast to all slices, and each slice makes its own decisions on what data to catch and process.

In certain examples, the crossbar 126 of the L1 MEM circuitry 114 is responsible for transmitting results from L1 MEM slices back to OOO and EXE clusters. In certain examples, this is a broadcast of results back to clusters and the aggregator 124 (e.g., corresponding aggregator circuitry for each OOO/EXE cluster) makes decisions on what data to collect.

In certain examples, each L1 memory slice can send responses to any OOO/EXE cluster, e.g., and the responses are sent back over the crossbar 126 to all clusters. In certain examples, one EXE/OOO cluster cannot sink (e.g., service) the combined responses from all slices, so certain MEM L1 circuitry 114 uses an L1 aggregator 124 (e.g., aggregation manager) described herein.

In certain examples, the L1 MEM aggregator 124 is a sub-component of L1 MEM 114 that deals outside of the sliced memory domain. In certain examples, there are per-cluster portions of the aggregator (e.g., to achieve per-cluster aggregation), and global portions of the aggregator. In certain examples, the L1 aggregator 124 is responsible for coordinating the L1 slices and their communication with other components, e.g., circuitry. In certain examples, this coordination can happen at a cluster level (for example, combining and reducing L1 slices' writeback responses to each OOO/EXE cluster), at a global level (e.g., OOO global 110) (for example deallocation (dealloc) of store buffers identification values (SBIDs) or memory ordering nuke (MONuke management), or internal to MEM L1 circuitry 114 for inter-slice coordination.

In certain examples, the aggregator 124 includes a clustered aggregator and/or a global aggregator. In certain examples, a clustered aggregator includes a load write back (LWB) aggregator to coordinate wakeups and writebacks from slices to the appropriate cluster and/or a store write back aggregator that coordinates writebacks from the store address operations (e.g., "STAs") in slices to the appropriate cluster. In certain examples, the global aggregator includes a SBID deallocation aggregator (e.g., "SBID dealloc") to coordinate deallocation of store buffers from slices back to OOO.

In certain examples, a store is split into multiple operations (e.g., μops), for example, a store address ("STA") operation (e.g., μop) for the address of data that is to be stored and a store data ("STD") operation (e.g., μop) for the data that is to be stored at that address.

In certain examples, each slice of L1 MEM contains its own:

Incomplete Load Buffer (ICLB) (e.g., ICLB 130 for L1 Slice 0 114-0)-Holds loads that have been executed by AGU and are logically part of this slice, but have not yet completed.

Global Load Buffer (GLB) (e.g., GLB 131 for L1 Slice 0 114-0)-Tracking for all loads in the out-of-order window. In certain examples, only entries for loads that are logically part of this slice will be filled out in detail (e.g., fully filled out) (e.g., filled out with a full physical address, store forwarding information, and memory predictor training information) and/or loads that are logically part of other slices will capture a single bit to indicate the load is out-of-slice.

Store Address Buffer (SAB) (e.g., SAB 138 for L1 Slice 0 114-0)-Tracking for the address component of all stores in the out-of-order window. In certain examples, only entries for stores that are logically part of this slice will be filled out in detail and/or stores outside of this slice will be marked as out of slice for control purposes.

Store Data Buffer (SDB) (e.g., SDB 136 for L1 Slice 0 114-0)-Data storage for all stores in the out-of-order window. In certain examples, an STD operation (e.g., μop) may not know which slice the address will reside in, so the SDB will be populated for all stores whether or not the address eventually resides within this slice. In certain examples, SDB entries are mapped 1:1 against SAB entries.

Senior Store Buffer (SSB) (e.g., SSB 134 for L1 Slice 0 114-0)-Data storage for the portion of a store that is used in the store coalescing pipeline. In certain examples, this is primarily the physical address and size of a store.

Store Coalescing Buffer (SCB) (e.g., SCB 140 for L1 Slice 0 114-0)-A cache-line aligned buffer in the logical path between a retired store and the data case unit (DCU) and/or fill buffer (FB) that potentially combines multiple stores into a single entry.

Data-side Translation Lookaside Buffer (e.g., DTLB 144 in translation lookaside buffer TLB 142 for L1 Slice 0 114-0)-Contains linear to physical mappings to translate loads and STAs that will execute within this slice. In certain examples, the DTLB is subdivided into buffers per page size.

Data Cache Unit (DCU) (e.g., DCU 147 for L1 Slice 0 114-0)-Storage and tracking for the L1 data cache within this slice, e.g., which contains a plurality of storage (e.g., 64 KB) of cache organized as a plurality of (e.g., 128) sets, a plurality of (e.g., 8) ways, where each cache line is multiple (e.g., 64) bytes.

Fill Buffers (FB) (e.g., FB 156 for L1 Slice 0 114-0)-Structure to services DCU misses for both loads and senior stores. In certain examples, these misses will be sent as requests to additional memory, e.g., L2 MEM 116.

Global Ordering Buffer (GOB)-Structure to globally order stores in fill buffers across all slices of L1 MEM. In certain examples, there is copy of the GOB in every L1 MEM slice.

Eviction Buffers (EVB) (e.g., EVB 156 for L1 Slice 0 114-0)-Structure to hold evicted modified cache lines from the DCU and manage sending eviction requests to the L2 and respond to writepull requests from the L2. In certain examples, one entry will be reserved for snoops.

Split Registers (SR)-in certain examples, these are not physically located in the slice, but the control logic is within a slice and the registers are logically associated with the low-half slice of a split load.

Self-Modifying Code Inspection Reduction Filter (SMIRF)-Filter to prove which STA memory operations (e.g., μops) may safely skip sending an SMC snoop check to the FE and reduce the number of SMC checks that are sent.

Global Store Scheduler (GSS)-Tracks store ordering across slices and guarantees correct store ordering at dispatch on the store write pipeline In certain examples, each slice of L1 MEM has its own set of pipelines:

Load Receipt Pipeline—Receives load dispatch and AGU payloads from OOO & EXE and writes the payload into an ICLB entry.

ICLB Scheduling Pipeline—Chooses oldest ready load on a load port from the ICLB and tries to schedule it into the load pipeline.

Load Pipeline—The main load pipeline in L1 MEM to execute a load and write back its results.

Store Address Receipt Pipeline—Receives store address operation (e.g., μop) payloads and writes them into the store address buffer.

SAB Scheduling Pipeline—Chooses oldest ready STA on a STA port from the SAB and tries to schedule it into the store address pipeline.

Store Data Pipeline—Receives store data payload and writes it into the store data buffer.

Store Address Pipeline—The main store address pipeline in L1 MEM to execute a STA operation (e.g., μop) and writeback complete to the OOO.

Store Coalescing Pipeline—Takes retired stores from the store buffer and coalesces them into the SCB in preparation for writing to memory.

Store Write Pipeline—Takes SCB entries and writes them into the data cache or a fill buffer.

DCU Fill Pipeline—Takes data from a fill buffer and fills it into the DCU, and moves modified data from the DCU into the eviction buffer.

In certain examples, loads are assigned a global identification (GLB ID) at allocation, which will have the side-effect of port binding the load to a specific AGU port, load port, and writeback port. In certain examples, loads hold an ICLB credit at allocation, and the exact ICLB entry is allocated after dispatch. In certain examples, after AGU, the load will cross the L1 MEM crossbar and arrive at a specific L1 MEM slice based on the linear address. In certain examples, once in L1 MEM, the load will arbitrate for a load pipe, which it will eventually win. In certain examples, the load pipeline (e.g., LSU) will be responsible for page translation, L1 data cache lookup, and resolving memory ordering against stores. In certain examples, the load will schedule down a load pipeline one or more times, until the load eventually binds to data and writes back the data to EXE and complete to the ROB. In certain examples, complete loads prepare the GLB to prove memory ordering correctness and will generate a machine clear event if they are found to be in violation. In certain examples, when the load writes back to the OOO, the ICLB entry will be deallocated. When the load is retired, the GLB entry will be deallocated.

In certain examples, stores are assigned a stored buffer identification (SB ID) at allocation, which is an exact pointer to an entry in the SAB, SDB, and SSB, e.g., the three logical components of the store buffer. In certain examples, the SB ID assignment has a side-effect of port binding the STA operation (e.g., μop) and STD operation (e.g., μop) to specific AGU and STD ports. In certain examples, stores have two component μops, a store address (STA) μop and a store data (STD) μop. In certain examples, the STA and the STD will schedule independently, and may arrive in L1 MEM in any order. In certain examples, while an STA is assigned to a specific L1 MEM slice based on linear address, the STD may arrive before an STA is known and therefore will be written into all slices of L1 MEM. In certain examples, when STAs arrive in L1 MEM, the STAs will be written into the SAB. In certain examples, when STDs arrive in MEM, the STDs will be written into the SDB. STAs will arbitrate for and eventually win the STA pipeline. In certain examples, the STA pipeline will be responsible for page translation, resolving memory ordering against loads, and sending the FE a packet to check for SMC violations. In certain examples, the store will hold its SAB, SDB, and SSB entries after retirement.

In certain examples, after retirement, stores in a slice will be moved from the SAB, SDB, and SSB into the store coalescing buffer (SCB) following age-order within a slice. In certain examples, when a store is moved into the SCB, it will deallocate the SAB, SDB, and SSB entries and eventually return the SBID to OOO for use in younger stores. In certain examples, L1 MEM slices will coordinate SBID return so that buffer entries are returned in order, despite different slices going out-of-order to move stores into the SCB. In certain examples, stores may merge into existing SCB entries following specific rules to make them (e.g., x86) Total Store Ordering compliant. In certain examples, the oldest SCB entries in the machine, across all MEM slices, will be scheduled to a Store Write pipeline to attempt to write the L1 data cache or a Fill Buffer.

L2 MEM

In certain examples, memory circuitry 104 includes another level of memory, e.g., MEM L2 circuitry 116. In certain examples, the L2 MEM 116 provides two main services to the core: first, it provides access to the (e.g., larger than L1) (e.g., 16M) L2 cache, and second, it serves as the interface to the rest of the system, e.g., the System-on-Chip (SoC). As such, in certain examples, the L2 MEM 114 has interfaces with the Front End (FE) circuitry 102, L1 MEM 114, PMH circuitry 118, prefetcher circuitry 120, and other SoC components, e.g., via IDI.

In certain examples, in order to provide access to the L2 cache, the L2 MEM 116 is tasked with accepting requests from the FE circuitry 102, L1 MEM 114, PMH circuitry 118, and prefetcher circuitry 120. In certain examples, core 100 is a high performance core that requires high amounts of bandwidth to the L2 cache memory. In certain examples, to provide that bandwidth the L2 cache memory of the L2 MEM is partitioned into multiple (e.g., 4) L2 slices.

In certain examples, each L2 slice has its own:

Direct Request Interface (DRI)—L1 MEM request interface, each L2 MEM slice can take requests directly from its corresponding L1 MEM slice.

Shared Request Interface (SRI)—Shared interface that combines requests from the FE, PMH, and Prefetcher.

Second level queue (SLQ) unit—Which holds and schedules requests to the SL and IDI pipelines.

SL pipeline control unit—Which encapsulates the SL pipeline.

IDI (Intra-Die Interconnect) Control unit—which encapsulates the IDI pipeline. Runs in parallel to the L2 pipeline.

L2 Cache Portion (L2$)—A (e.g., 4M) piece of the L2 cache.

XQ unit—Which holds and schedules L2 miss requests to the SoC.

VQ unit—Which holds and schedules L2 cache eviction requests and snoop data to the SoC.

In certain examples, the L2 slices are designed to be physical address isolated (e.g., a physical address can be found in one and only one slice) and operate in parallel. In this way the L2 MEM can process up to the number of slices (e.g., 4) L2 cache requests in parallel.

In certain examples, to serve as the interface to the SoC, the L2 MEM 116 is also tasked with sending out core requests that missed the core caches to the SoC and accepting data and state for those requests from the SoC. In certain examples, the L2 MEM 116 is to accept and process all requests from the SoC, e.g., including, but not limited to, snoop requests, bus lock handling requests, and interrupt requests. In certain examples, core 100 uses high amounts of memory bandwidth from the SoC, e.g., and to provide it, the IDI portion of L2 MEM is partitioned into multiple (e.g., 2) IDI slices.

In certain examples, each IDI slice contains its own:

SnpQ (Snoop Queue) unit—Which holds, schedules, and process SoC snoop requests.

IDI (Intra-Die Interconnect) unit—Which schedules and converts XQ requests/signals into SoC requests/signals and vice versa.

FIL (Fabric Interface Logic) unit—Which contains the logic that the core provides to the SoC when the core is in a powered down state.

In certain examples, as with the L2 slices, the IDI slices are designed to be address isolated and operate in parallel. In this way the IDI slices can process up to the number of IDI slices (e.g., 2) L2 cache miss requests at the same time.

In certain examples, L2 MEM is responsible for the processing, sending, and receiving of interrupts, e.g., by an Advanced Programmable Interrupt Controller (APIC). In certain examples, where interrupts are not dependent on a physical address, the APIC is a single non-sliced unit.

Page Miss Handler (PMH)

In certain examples, page walker(s) are in a non-sliced L1 MEM circuitry, and all loads as part of the page walk would therefore go to the L1 MEM circuitry. However, with L1 addresses being sliced, missing a TLB entry in some location (e.g., some load in L1, something in L0, some prefetch, or some instruction cache (I$) request) would generate a page walk with loads that could go to any slice. Certain examples herein solve this by building a separate page miss handler (PMH), allocate translation request buffers (TRBs), and sending the page walk requests someplace global (e.g., outside of the L1/L2 slices). In certain examples, a "global page walk" is thus performed because of the address slicing.

In certain examples, the memory circuitry 104 includes page miss handler (PMH) circuitry 118 to service page translation misses on behalf of the first level TLBs, translating linear addresses into physical addresses, and producing TLB entries to fill the first level TLBs. In certain examples, the PHM circuitry 118 includes a second level TLB queue (STLBQ) (e.g., as shown in FIG. 10) to receive requests, a (e.g., large) second level TLB, a pipelined page walker state machine capable of handling multiple requests in flight, page walk caches, virtualization page walk caches, etc.

In certain examples, the PMH circuitry 118 will provide translation services for the front-end circuitry 102 as well as the L1 MEM Slices, L0 MEM Clusters, and/or the prefetcher circuitry 120. In certain examples, each L1 MEM slice, L0 MEM cluster, prefetcher circuitry and the FE circuitry may send address translation requests to the PMH circuitry.

Figure 10:
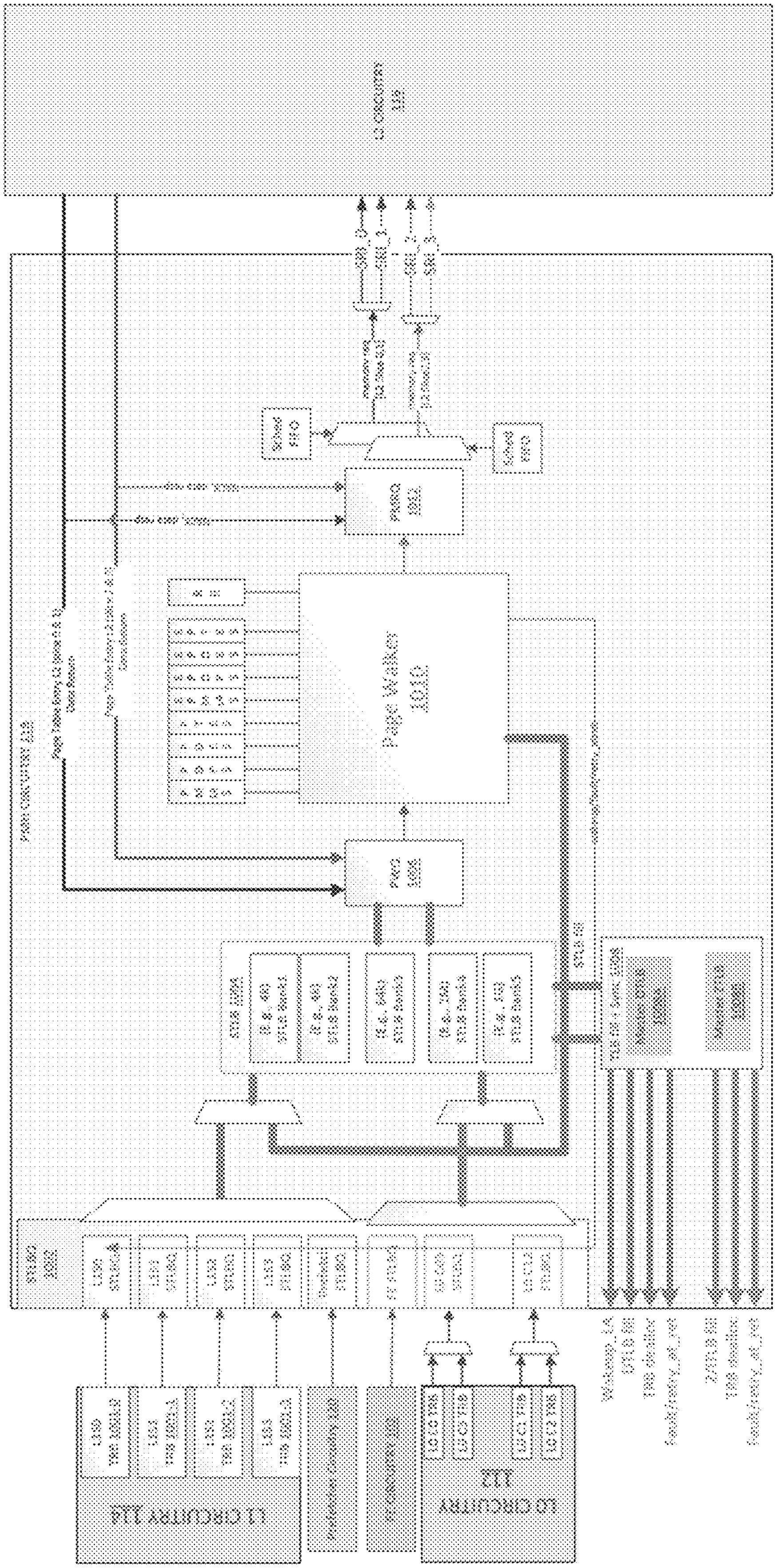
FIG. 10 illustrates a more detailed block diagram of page miss handler (PMH) circuitry according to examples of the disclosure.

In certain examples, the L1 MEM slices, L0 MEM slices, and the prefetcher circuitry 120 will collect requests locally into a Translation Request Buffer (TRB) (e.g., as shown in FIG. 10) before sending the requests to the PMH circuitry 118. In certain examples, the PMH circuitry 118 will receive these requests into the STLBQ, a request holding structure positioned before the STLB pipeline in the PMH.

In certain examples, the STLBQ will arbitrate ready requests into two STLB pipelines, e.g., where the requests will check a (e.g., large) second level TLB (STLB) for translation, and either hit or miss. In certain examples, STLB hits will fill into the first level TLBs (e.g., DTLB, ZTLB, and/or ITLB).

In certain examples, STLB misses will arbitrate for a free page walker that will perform page walks. In certain examples, once a page walker is allocated, the STLBQ entry is put to sleep and does not arbitrate for the STLB pipeline until the walk completes. In certain examples, page walks will first check, in parallel, a set of page walk caches (PXEs) to find the deepest matching level of the page table. In certain examples, the page walkers will resume the walk from this deepest matching state. In certain examples, when a page walk is successfully complete, the page walker will write the translation into the STLB (and corresponding requester first level TLB) and wake up STLBQ entries that were sleeping as a result of matching the ongoing PWQ entry. In certain examples, the entry that allocated the PWQ entry will get deallocated after first level TLB fill without having to go down the STLB pipeline again.

In certain examples, the STLBQ entries will arbitrate again for STLB pipeline, and if they hit in STLB, then the STLB will fill the first level TLBs.

In certain examples, in order to keep the DTLBs in sync with each other (e.g., and the ZTLBs in sync with each other), the PMH circuitry 118 will also hold a primary copy of the DTLB and ZTLB, e.g., which will be checked for duplicates before sending fills to the L1 slices, prefetcher circuitry, or L0 clusters.

In certain examples, the PMH circuitry is responsible for choosing replacement ways in the first level MEM TLBs (e.g., DTLB and ZTLB, but not ITLB). In certain examples, to accomplish this, the L0 TLBs and L1 TLBs will send the PMH circuitry sampled least recently used (LRU) update packets, providing a partial view of which TLB entries are actively being used by the L1s and the L0s. In certain examples, the PMH will update the L1 (or L0) LRU array based on these samples, and then choose a victim way based on this local view of TLB LRU.

Prefetcher Circuitry

In certain examples, the prefetcher circuitry 120 is the home to all of the different L1 (e.g., L1 data (LID)) and L2 hardware prefetchers. In certain examples, the LID and L2 caches send prefetch training events to the prefetcher circuitry, and the prefetcher circuitry in turn sends prefetch requests to the caches. In certain examples, prefetches serve to fill cache lines into the cache ahead of a predicted demand so that the demand access observes less latency.

In certain examples, each level of cache has its own set of prefetchers.

In certain examples, in addition to the prefetching algorithms themselves, the prefetcher circuitry is home to one or more prefetch filters. In certain examples, for each prefetch training event, each of the prefetching algorithms may generate several prefetches. It is possible, and in many instances likely, that there is significant overlap between the cache lines each prefetcher wants to prefetch. In certain examples, the prefetch filters serve to reduce the number of redundant prefetches that are sent to the caches, saving cache lookup bandwidth and power.

Pipelines

In certain examples, each slice of L1 MEM has its own set of one or more of the following pipelines:

- Load Receipt Pipeline—Receives load dispatch and AGU payloads from OOO & EXE and writes the payload into an ICLB entry.
- ICLB Scheduling Pipeline—Chooses oldest ready load on a load port from the ICLB and tries to schedule it into the load pipeline.
- Load Pipeline—The main load pipeline in L1 MEM to execute a load and write back its results.
- Store Address Receipt Pipeline—Receives store address μop payloads and writes them into the store address buffer.
- SAB Scheduling Pipeline—Chooses oldest ready STA on a STA port from the SAB and tries to schedule it into the store address pipeline.
- Store Data Pipeline—Receives store data payload and writes it into the store data buffer.
- Store Address Pipeline—The main store address pipeline in L1 MEM to execute a STA pop and writeback complete to the OOO.
- Store Coalescing Pipeline—Takes retired stores from the store buffer and coalesces them into the SCB in preparation for writing to memory.
- Store Write Pipeline—Takes SCB entries and writes them into the data cache or a fill buffer.
- DCU Fill Pipeline—Takes data from a fill buffer and fills it into the DCU and moves modified data from the DCU into the eviction buffer.

L1 Interface

Figure 5:
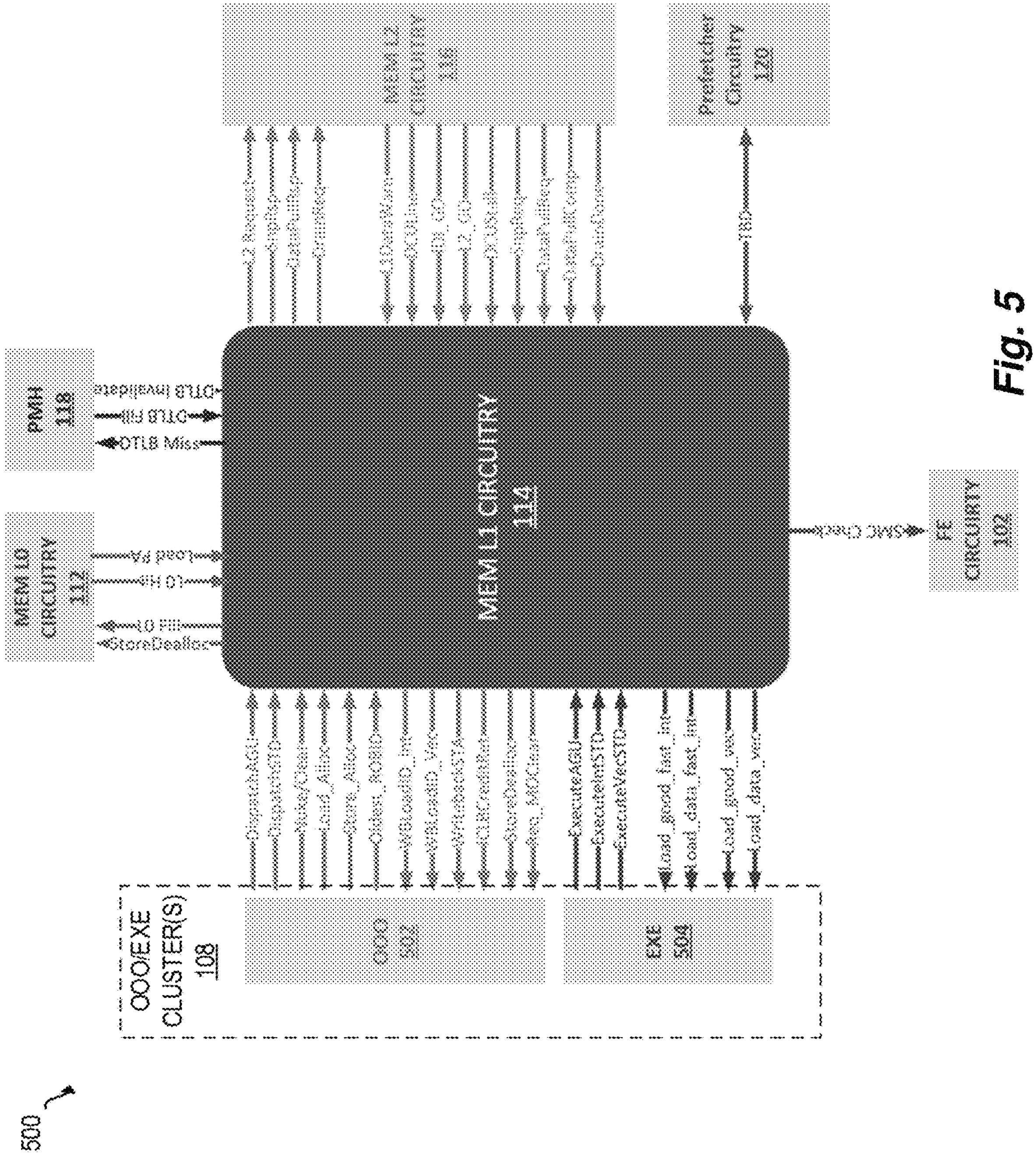
FIG. 5 illustrates interface couplings for the level (e.g., L1) of memory circuitry that is sliced according to address values according to examples of the disclosure.

FIG. 5 illustrates interface 500 couplings for the level (e.g., L1) of memory circuitry 114 that is sliced according to address values according to examples of the disclosure. Depicted interface 500 includes couplings between MEM L1 circuitry 114 and OOO circuitry 502, EXE circuitry 504 (which may cumulatively be an OOO/EXE cluster 108), MEM L0 circuitry 112, PMH circuitry 118, MEM L2 circuitry 116, and prefetcher circuitry 120.

L1 MEM<--->EXE/OOO

ExecuteAGU: In certain examples, EXE 504 communicates the result of the Load or STA μop after Address Generation Unit (AGU) is executed. In certain examples, ExecuteAGU indication (e.g., value) arrives at the MEM L1 114 (e.g., one cycle) after DispatchAGU indication (e.g., value) and MEM L1 114 obtains the LBID or SBID of the μop from the DispatchAGU interface. In certain examples, there are multiple (e.g., 4) Load and multiple (e.g., 3) STA ExecuteAGUs in each of the (e.g., 4) EXE clusters.

ExecuteIntSTD: In certain examples, EXE 504 communicates the result of one STD pop with the corresponding data payload to MEM L1 114. In certain examples, ExecuteSTD indication (e.g., value) arrives at the MEM L1 114 interface (e.g., one cycle) after DispatchSTD indication (e.g., value) and therefore MEM L1 114 knows the SBID of the STD μop. In certain examples, there are a plurality of (e.g., 3) ExecuteSTD interfaces in each of the (e.g., 4) EXE clusters.

Execute VecSTD: In certain examples, the vector cluster (e.g., vector cluster 106-0 and/or vector cluster 106-1 in FIG. 1) communicates with the OOO INT/MEM (e.g., OOO 502) cluster for vector STD operations. In certain examples, in order to reduce the indication sent (e.g., and wires) to MEM L1 114, the upper (e.g., 64-bits) goes directly to the L1 interface while the lower half is sent to the INT/MEM cluster to use the INT STD interface. In certain examples, the cluster is found by using the strand ID of the Vec STD. In certain examples, since the VEC and INT clusters have the same number of ports for STDs, they map to the appropriate one. In certain examples, where the pipeline alignment between the INT and VEC clusters is fixed, the SBID or other identifying information does not need to be sent by EXE with the data.

L1 MEM<--->L0 MEM

In certain examples, L1 slices are responsible for filling data in the L0 cache. In certain examples, each L1 slice can have at most one fill to L0 in flight, and the slice will fill all L0 clusters' data caches. In certain examples, an L1 slice will broadcast a cache line to all L0 clusters, e.g., over multiple cycles. In certain examples, each L0 cluster will accumulate cache line chunks into a Fill Buffer entry dedicated to that L1 slice until it receives all the chunks of the cache line, e.g., then write the entire cache line to the L0 cache.

L1 MEM<--->L2 MEM

In certain examples, the L1 MEM (e.g., first level cache (FL)) may send the L2 MEM (e.g., second level cache (SL)) up to a number of (e.g., 4) DCU Miss requests per cycle. In certain examples, the request ports are divided (e.g., into 4) based on (e.g., bits [7:6]) of the physical address. In certain examples, in this way each FL slice is paired with a single SL slice, and there is 1 request port per FL and SL slice pair, e.g., there may be up to 1 request issued per cycle per slice. In certain examples, as long as the FL slice is not receiving a stall signal from its paired SL slice, it is free to issue a DCU Miss request that cycle. In certain examples, the FL is to provide data to the SL, such as, but not limited to, DCU evictions, Snoop data, and UC/USWC writes. In certain of these cases, once the SL is ready it will send a data pull request (or datapull_req) to the FL, and the FL is to respond with the data in a data pull response (or datapull_resp) message. In certain examples, the SL will send a data pull complete (or datapull_comp) message to the FL when the data pull has been successfully completed.

In certain examples, to prevent FL request from overrunning the SLQ, the SL will send a DCU Stall signal to the FL, e.g., when asserted, the FL may send any valid request on the DCU Miss interface.

In certain examples, DCU (e.g., DCU 148 in L1 Slice 114-0 in FIG. 3) miss requests have a globally observed (GO) line state returned along with the data or with no data, e.g., in the case of write or data-less requests. In certain examples, in the case of the DCU miss request missing the SL (e.g., MEM L2 circuitry 116), the GO comes from the IDI. In certain examples, in the case of the DCU miss request hitting the SL, the GO comes from the SL. In certain examples, to keep two GOs from colliding, each GO source has its own bus to the FL. In certain examples, when there is a miss at the second level cache (e.g., MEM L2 circuitry 116), memory circuitry 104 allocates a transaction queue buffer (XQ) to service the miss and request the cache line from IDI. In certain examples, the L2GO message is for the DCU miss requests that hit the SL or promoted onto a transaction queue (XQ) GP entry with a valid GO already received from IDI. In certain examples, each DCU miss request is to only receive a single GO message. In certain examples, the DCU Stall signals are divided (e.g., into 4) based on (e.g., bits [7:6]) of the physical address. In certain examples, in this way each FL slice is paired with a single SL slice, and there is one DCU Stall signal per FL and SL slice pair.

In certain examples, the SL responds to DCU cache misses with (e.g., whole or (e.g., 16 B) partial) cache lines of data. In certain examples, chunk valid bits indicate which (e.g., 16 B) chunks are valid in the data return. In certain examples, IDI returns data in larger (e.g., 32 B) pieces, and, in order to send the FL data at the earliest possible time, the SL may send the same DCU miss a plurality of (e.g., up to 2) data return messages. In certain examples, if SL does send two data return messages, the chunk valid indications for the messages cannot overlap.

In certain examples, the SL may send FL multiple (e.g., up to 4) DCU Line responses per cycle. In certain examples, the response ports are divided (e.g., into 4) based on (e.g., bits [7:6] of) the physical address. In certain examples, each FL slice is paired with a single SL slice, and there is 1 response port per FL and SL slice pair. In certain examples, there may be up to 1 response issued per cycle per slice.

L1 MEM<--->PMH Circuitry

In certain examples, each slice of L1 MEM has a DTLB miss interface to the PMH circuitry. In certain examples, this is used when there is a DTLB miss and the STLB/PMH is used to perform Page Translation. In certain examples, only one request can be sent per cycle per slice.

In certain examples, DTLB misses in L1 MEM are collected in a Translation Request Buffer (TRB) (see FIG. 10) and sent to the PMH circuitry. In certain examples, the PMH circuitry maintains guaranteed storage for the translation requests in the STLBQ, e.g., where the PMH is guaranteed to sink any translation requests sent to the PMH. In certain examples, there is a 1:1 mapping between the TRB entry ID and STLBQ entry ID for each slice.

In certain examples, the PMH keeps a primary copy of the DTLB in order to keep all of the slice DTLBs synchronized and make centralized victim selection decisions. In certain examples, the PMH circuitry is responsible for checking that there are no duplicates filled in the DTLB. In certain examples, all slice DTLBs (e.g., and prefetcher DTLB) are copies of the Primary DTLB and they are identical to each other.

L1 Aggregator

In certain examples, the ICLB credit return aggregator manages the credit returns from the individual slices, e.g., and produces a single increment count to OOO every cycle. In certain examples, this logic ensures that no slice overruns its ICLB partition, while also returning credits to OOO as soon as possible in the pipeline. In certain examples, the credits are managed on a per port per cluster basis. In certain examples, the OOO has no concept of MEM's slices with regard to the ICLB credits.

Figure 6:
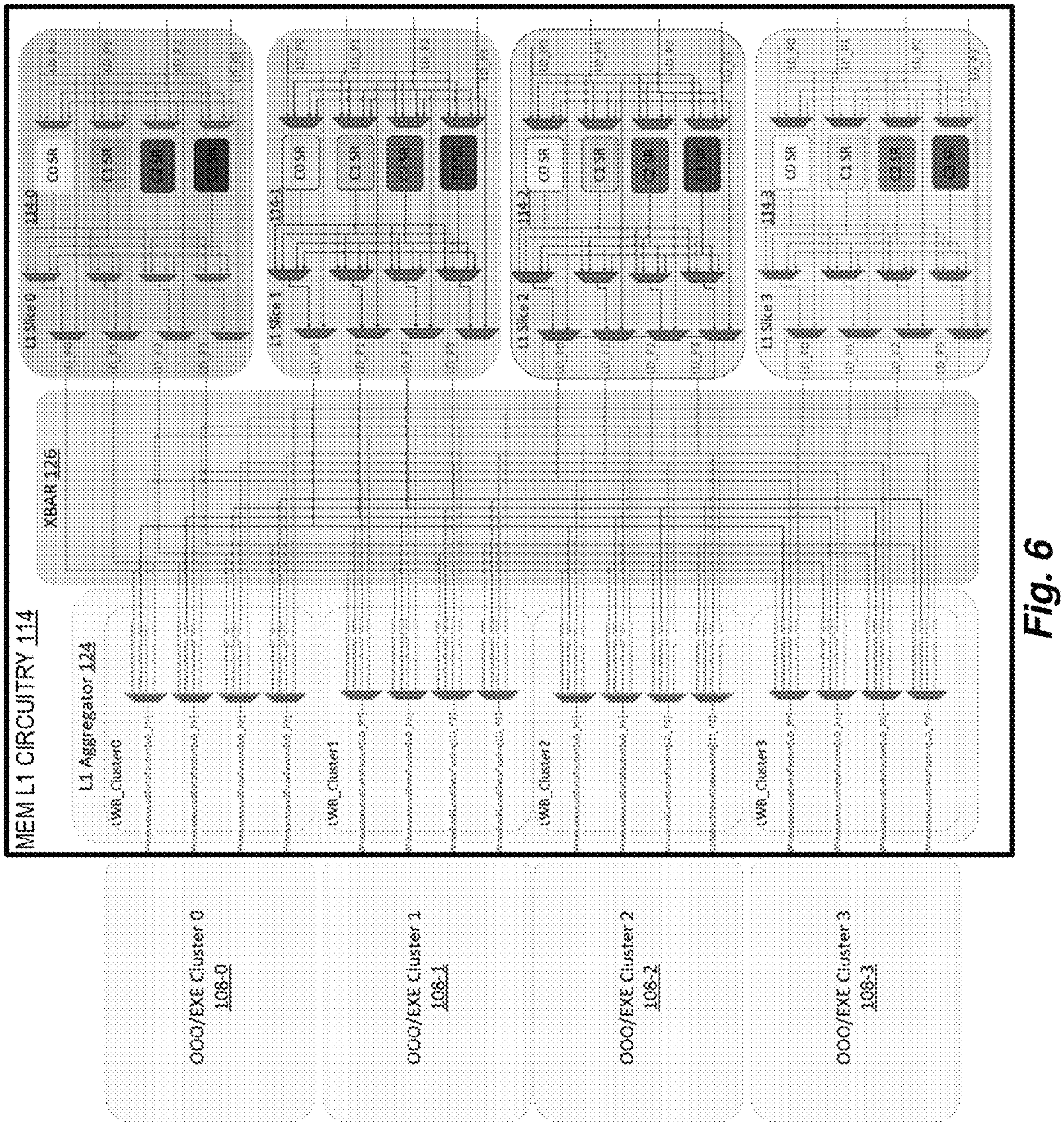
FIG. 6 illustrates a more detailed block diagram of the level (e.g., L1) of memory circuitry that is sliced according to address values and includes an aggregator according to examples of the disclosure.

FIG. 6 illustrates a more detailed block diagram of the level (e.g., L1) of memory circuitry that is sliced according to address values and includes an aggregator 124 according to examples of the disclosure.

FIG. 7 illustrates a timing diagram 700 for incomplete load buffer (ICLB) credit returns according to examples of the disclosure.

Number of Credits

In certain examples, loads consume their ICLB credit at dispatch (e.g., in stage RS2). In certain examples, where OOO does not know which slice a load is destined for at dispatch, the MEM L1 circuitry 114 (e.g., L1 aggregator 124) only maintains a credit pool of a certain number (e.g., 9) credits per cluster per port, e.g., not per slice.

In certain examples, once an individual slice fills up its ICLB partition, that OOO cannot send any more loads to that port, since there is no way to avoid overrun of the full slice after the slice destination is known. In certain examples, there is only ever one full slice in a cluster/port. In certain examples, this leads to the fact that a cluster can never completely fill up all ICLB storage across all slices, e.g., the maximum capacity is achieved by having max-1 entries per slice and then the next load fills up one slice, which stops OOO from sending further loads. In certain examples, the effective number of ICLB entries is 9 entries/slice/port/cluster*4 slices−3=29 per port per cluster.

Credit Return Cycle

In certain examples, a credit can be returned in either of two places in the pipeline depending on the state of the slice's credits:

at AGU-time: agu_credit_return in AGU (e.g., stage IX2/RS4 in FIG. 7)

at writeback: wb_credit_return (e.g., stage FLD5 in FIG. 7)

ICLB Crediting Algorithm

In certain examples, if a load maps to a slice with the minimum number of available credits, or the ICLB is empty, then it does not return the credit at AGU (agu_credit_return) and instead this credit is returned at writeback (wb_credit_return, e.g., in fld5). In certain examples, this covers the case where all loads map to one slice and use all the entries.

In certain examples, if a load maps to a non-minimum slice, then return the credit after AGU (agu_credit_return, e.g., in rs6/flr2). In certain examples, this is acceptable because buffer-overrun is protected by the WB-credit held by the minimum slice.

In certain examples, the aggregator prevents the credit return at writeback if more than one slice has the minimum number of available entries. In certain examples, the other slice(s) will inherit the responsibility for that credit. In certain examples, it is possible that a load has already issued an agu_credit_return, and then inherits a second credit to return at writeback due to the composition of the slices. In certain examples, the minimum slice indication is gained by a slice or passed to a slice, e.g., when a slice decrements its avail count and as a result it alone has the minimum count, then it is the minimum slice, or if the minimum slice increments its avail count and no longer has the minimum count, then the minimum slice is passed to the next incremental slice. In certain examples, it will always be true that ooo_cnt+wb_credit+wb_credit_return=entries per slice. In certain examples, both L0 and L1 pipes are aligned and parallel at the AGU stage. In certain examples, the return algorithm is performed at AGU+2, which is aligned for both pipes, or in writeback stage of the L1 pipeline.

In certain examples (e.g., in a given cycle), one MEM slice can receive up to a threshold number of loads (e.g., 16 loads from 4 clusters*4 AGU ports). In certain examples, loads dispatched to MEM are to allocate an entry in the Incomplete Load Buffer (ICLB) to enable redispatch if they failed to complete MEM pipeline on first pass. In certain examples, to simplify allocation and pipeline arbitration, ICLB will be partitioned into multiple (e.g., 16) banks, e.g., by cluster and AGU port. In certain examples, loads will stay in the ICLB until they complete the MEM pipeline. In certain examples, the ICLB is a credited structure. In certain examples, where OOO does not know at dispatch time which slice the load will map to, it can dispatch a load μop only if there is an empty entry for it in the ICLB in all slices. In certain examples, there are total of 144 ICLB entries, e.g., 9 entries per cluster and AGU port. In certain examples, ICLB entry is allocated by Load receipt pipeline and updated/deallocated by main load pipeline. In certain examples, ICLB entries are read by ICLB scheduling pipeline.

ICLB Allocation

In certain examples, an ICLB entry is allocated after a new load μop that is received by an L1 MEM slice determines that it belongs to this current slice. In certain examples, loads that were predicted hits in L0 and actually hit in L0 will be written into ICLB and then removed from ICLB (e.g., two cycles later) when the load L0 hit information arrives. In certain examples, up to 16 ICLB entries can be allocated per cycle, one per each bank. In certain examples, each bank only has one write port for the static portion of the ICLB entry. In certain examples, allocation is done by finding first not valid entry within each of the (e.g., 16) ICLB banks. In certain examples, an age matrix is also updated on ICLB allocation.

ICLB Block Code Update

In certain examples, block codes and block code IDs are calculated based on load pipeline events. In certain examples, e.g., by the middle of fld4, it is determined if the load will need to recycle. In certain examples, e.g., in the second half of fld4, the raw recycle/block signals will be prioritized to generate one block code and the correct block ID (wherever applicable). In certain examples, a (e.g., fld5) cycle is allocated to cover any RC delay to travel to ICLB and/or any ICLB update computation that might not fit in second half of fld4.

ICLB Deallocation

In certain examples, there are two sources of ICLB deallocation: load completing its course through L1 MEM, and loads nuked or cleared by OOO. In certain examples, ICLB deallocation is simpler to compute than ICLB updates. In certain examples, any load that is signaling write back valid (e.g., in the middle of fld4) can deallocate its ICLB entry. In certain examples, this can be due to writing back valid data, μop completing load pipeline without returning data (e.g., fences), or load completing with a fault. In certain examples, a plurality of (e.g., up to 4) ICLB entries can be deallocated in a cycle due to loads completing L1 MEM pipeline. In certain examples, a stage (e.g., fld5) has been reserved for any RC delay to ICLB, so deallocation will match ICLB update timing, e.g., hence ICLB entry will have valid=0 in a later stage (e.g., fld6). In certain examples, for ICLB entries deallocated due to nukes and clears, there is no maximum number of entries that can be deallocated. For example, where a nuke will clear all valid ICLB entries.

ICLB Wakeup

In certain examples, loads that are blocked due to memory ordering constraints or resource limitations in the L1 pipeline are put to sleep in the ICLB buffer. In certain examples, these loads will need to be re-issued to complete. In certain examples, these loads will go through the Load ICLB scheduling pipeline to determine when the blocked entries should be woken up and scheduled on the L1 MEM load pipelines. In certain examples, for loads that are sleeping on a block_code, there is a stage (e.g., fls1) in which wakeup events are checked against each entry's block_code and block_id. In certain examples, if the wakeup events match the block_code and block_id matches the wakeup_event_id (for example a load is sleeping on a specific fill buffer, and that fill buffer receives data), the block_code will be updated in the next cycle to NONE.

GLB (Global Load Buffer)

In certain examples, loads are assigned a global load buffer (GLB) (e.g., GLB 132 in FIG. 9) entry at allocate by OOO. In certain examples, the GLB is broken into multiple (e.g., 16) banks (e.g., per cluster per AGU port) such that each bank only has 1 write port for static bits. In certain examples, dynamic bits can be updated either by loads completing in L0 or loads completing in L1, e.g., and thus using two write ports. For example, a load can be going through L1 pipeline (e.g., scheduled from ICLB) and getting a DTLB translation around the same time as a load is going through L0 pipeline and hitting L0 cache and ZTLB, as these two loads can be from the same cluster and same port, the GLB dynamic/address bits is to support two loads updating the same GLB bank in certain examples.

In certain examples, the full GLB is replicated in each slice. In certain examples, only entries that are valid in that slice mark the valid bit asserted. In certain examples, once load dispatch+agu is received by a slice and linear address of the load is known, that slice's GLB entry will be marked valid. In certain examples, the GLB is written one cycle after the ICLB to allow a cycle of RC to reach the location of the GLB.

Split Data Support with Sliced Memory

In certain examples, a cache line is split between two (e.g., adjacent) slices. In certain examples, split operations have two parts: split low half that covers from the starting address to the cache line boundary, and split high half that covers from the next cache line boundary to the end of the operation size.

Figure 8:
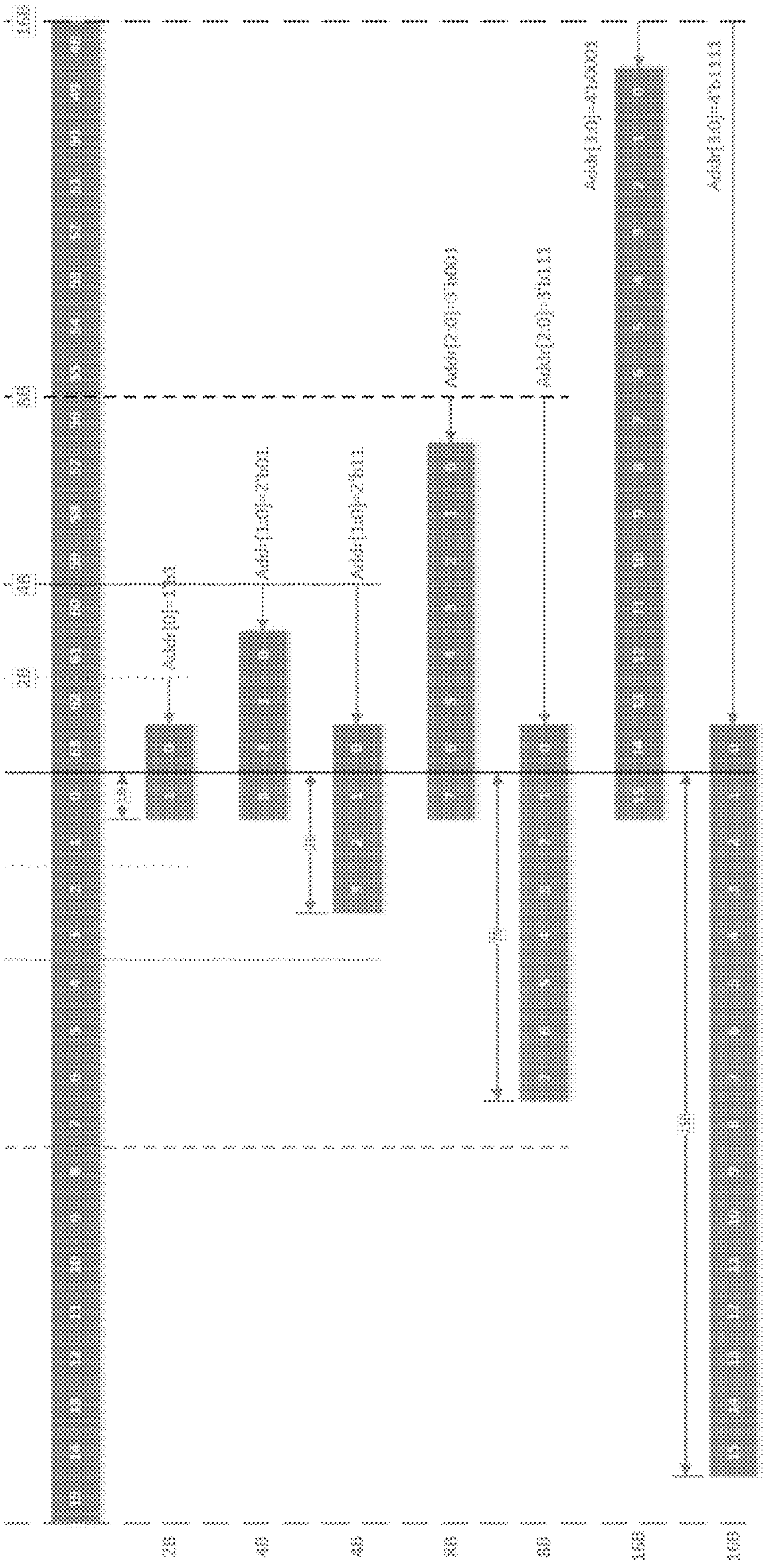
FIG. 8 illustrates alignments for split data according to examples of the disclosure.

FIG. 8 illustrates alignments for split data according to examples of the disclosure. For example, with the "split high" in green on the left of the black line and the split low on the right of the black line in blue.

In certain examples, one or more of the following are imposed on handling operations on a "split" cache line. In certain examples, the high half and low half of the split operation are executed on adjacent slices. In certain examples, by their nature, split operations access two consecutive cache lines, and in certain of those, the MEM interleave the slices by low-order cache line address (e.g., [7:6]) (for example, where if the low half executes on slice n, then the high half executes on slice (n+1)%NUM_SLICES. In certain examples, the low half is to appear to occur before (or at same time) as the high half of the split operation. In certain examples, the low half load is to bind to data (and be snoopable) before high half load. In certain examples, low is to receive a page translation before high in general, e.g., to not have a software visible high half before low half. In certain examples, the low half store is to be GO before high half store is GO. In certain examples, low and high are not required to have identical page translations. In certain examples, split_hi cannot write the PA in to the ICLB until split_lo hits in the DTLB.

Figure 9:
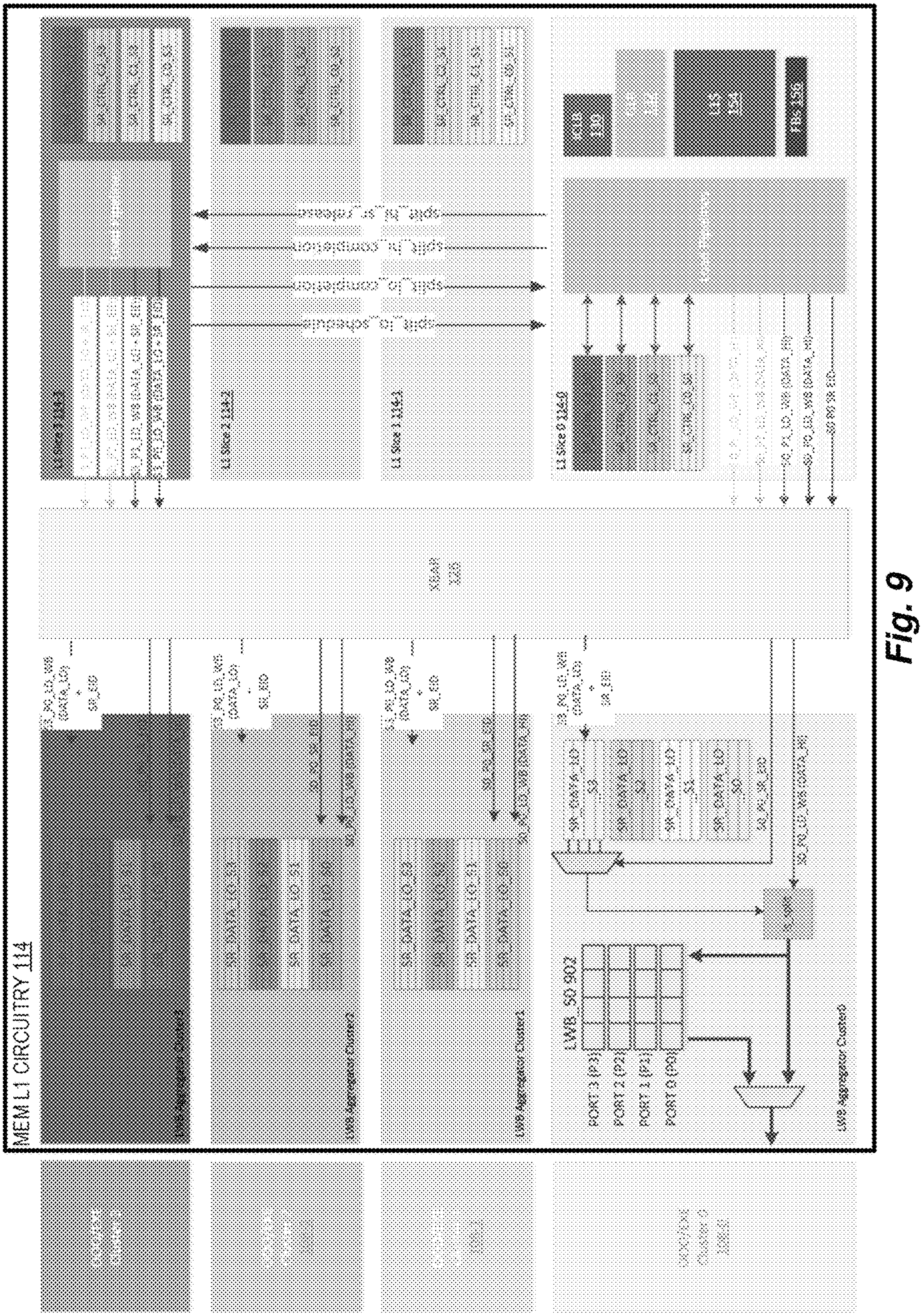
FIG. 9 illustrates load writeback split register (SR) data paths in the level (e.g., L1) of memory circuitry that is sliced according to address values according to examples of the disclosure.

FIG. 9 illustrates load writeback split register (SR) data paths in the level (e.g., L1) of memory circuitry that is sliced according to address values according to examples of the disclosure.

In certain examples, split data is combined on the data path in FLD5 of the split_hi op. In certain examples, the split_hi data is rotated to register alignment like normal and then muxed in with the split_lo data in the SR. In certain examples, the split_lo data is read from the SR_eid and it selected on to the data path according to the sr_sel_hi vector. In certain examples, if the sr_sel_hi bit is set that indicates to select the cache/FB data from split_hi.

In certain examples, the sr_sel_hi vector is set by split_lo based on its osize and address. In certain examples, where split_lo always occupies the low-order bytes after rotation, the MEM circuitry only needs to calculate the starting byte of split_hi, e.g., then set all the bits in the vector from the starting byte in a thermometer code fashion.

In certain examples, after split_hi successfully completes it sends a completion message back to split_lo slice to release the SR to the pool.

Split Register (SR)

In certain examples, the split register control logic lives in the slices. In certain examples, the split register data is located near the WB aggregator in both the integer and vector data paths. In certain examples, the split_lo slice controls the SR on a per cluster per slice basis.

In certain examples, split registers live on the L1 return data path before the integer and vector L1 WB Aggregators. In certain examples, SRs are organized per cluster per slice. In certain examples, the integer SR is a first (e.g., 15 B) width and the vector SR is a wider (e.g., 31 B) width. In certain examples, SRs are register aligned, and contain a (e.g., 15 b/31 b) sr_sel_hi vector to indicate which bytes split_lo populated.

SR Allocation

In certain examples, SRs are allocated in the load pipeline (e.g., 4×) in FLD2. In certain examples, each slice maintains a pool of SRs that is shared among all ports. In certain examples, up to a threshold (e.g., 4) SRs are allocated per cycle. In certain examples, if fewer SRs are available then round-robin priority is used to allocate the SRs to the ports. In certain examples, if split_lo cannot allocate an SR, then it blocks until SR dealloc and all blocked split_lo ops respin in the load pipeline.

In certain examples, one SR is reserved for at_ret loads. In certain examples, during arbitration speculative loads are only able to allocate SR[3:1], and at_ret loads always allocate SR[0]. In certain examples, this ensures forward progress without the need for "clobbering" of speculative loads in the SR.

FLD Interaction

In certain examples, allocating the SR in the pipeline allows split_lo to just flow to the WB aggregator like normal. In certain examples, then split_lo writes the SR in FLD5 when it is on the input of the aggregator. In certain examples, each SR entry has a (e.g., 4:1) mux on the write port to support the number of (e.g., 4) load ports that share the SR pool. In certain examples, split_lo writes rotated load data only, and populates the sr_sel_hi vector.

SR Deallocation

In certain examples, in the normal case, SRs are deallocated after split_hi completion to ensure split_lo data is retained long enough to used. In certain examples, this requires that split_hi communicate back to split_lo over the split_hi completion interface. In certain examples, the split_lo slice can also deallocate an SR if the load is blocked in the load pipeline, e.g., valid message in the split_hi completion interface and/or in the FLD pipeline when split_lo is blocked Summary of SR Control In certain examples, there are multiple SRs (e.g., 4) available per cluster per slice per cycle, e.g., where multiple (e.g., 4) deallocate per cycle, allocated by split_lo, find first allocation, and deallocated after split_hi sends completion message to split_lo slice.

Forward Progress

In certain examples, forward progress guarantees, entry [n] can be reserved for thread_n, at_ret load will not return SR to pool if blocked in the load pipeline, and SR[0] is only available to at_ret load.

Split Load Interfaces

In certain examples, there are four interfaces that are used to properly control split execution and manage the SR: split-lo schedule, split-lo completion, split-hi completion, and split-hi SR release.

Split-Lo Schedule Interface

In certain examples, this interface communicates the SR_eid and split_lo scheduling information to split_hi, e.g., split-lo calculates in FLD2, FLD3 & FLD4 are RC cycles, and FLD5 of split_lo aligns with FLS1 of split_hi in the best case.

In certain examples, when a slice receives a valid packet on this interface, the MEM circuitry compares (e.g., CAM) its ICLB to determine the matching load for that packet, e.g., then the SR_eid is stored in that ICLB entry. In certain examples, this interface also sets the ICLB.BlkCode to NONE for the matching split_hi op so that it can arbitrate for the FLS pipeline.

In certain examples, if a split_hi load is prevented from completion due to split_lo failure, then ICLB.BlkCode is set to SPLIT_WAIT. In certain examples, in this case the split_lo will transmit the scheduling message again, which will clear the block code to NONE again.

Split-Lo Completion Interface

In certain examples, this interface communicates the split_lo completion information to split_hi. In certain examples, it is systolic with split-lo schedule interface and communicates that the split-hi can send a WB to OOO/EXE. In certain examples, it updates ICLB.split_lo_dn and the load_split_fault[6:0] register. And bypasses into the FLS2 & FLS3 pipeline stages. In certain examples, it uses delayed iclb_cam_hit information from schedule interface, e.g., split_lo uses load_good_mfld4h and fault_info[6:0], FLD5 & FLD6 are RC cycles, and FLD7 of split_lo aligns with FLS3 of split_hi in the best case.

Split-Hi Completion Interface

In certain examples, this interface communicates the split_hi fault condition to split_lo. In certain examples, this is only used when split_lo is UC memory type and needs to sample split_hi fault condition before execution and ICLB deallocation. In certain examples, the split_lo ICLB.[split_hi_flt_chk, split_fault] bits are set via this interface. In certain examples, the SR_eid is used to find the correct ICLB entry for split_lo update. In certain examples, when a slice receives a valid packet on this interface, it CAMs the ICLB.SR_eid[2:0] field to determine a match. In certain examples, the raw match vector is qualified with ICLB.valid and ICLB.split_lo to find the exact entry that contains the split_lo.

In certain examples, since both the split-hi and split-lo completion interfaces update the load_split_fault[6:0] register the MEM is to check that they align in the FLD pipeline. In certain examples, although the MEM has the TLB information earlier in the FLD pipe, it stages the information to FLD4 to align with the split-lo timing of the write port, e.g., split_lo collects fault info from TLB access, FLD5 & FLD6 are RC cycles, and FLD7 of split_hi aligns with FLS3 of split_lo in the best case.

Split-Hi SR Release Interface

In certain examples, this interface communicates that the split_hi has completed and the SR can be returned to the pool of available entries. In certain examples, this interface is physically part of the split_hi completion interface, e.g., where the SR is located before the WB aggregator and the aggregator hold the assembled split data after split_hi completion.

ICLB Fields

Page Miss Handler (PMH) Components

FIG. 10 illustrates a more detailed block diagram of page miss handler (PMH) circuitry 118 according to examples of the disclosure. In certain examples, PMH circuitry 118 translates for a miss on behalf of the first level TLBs (e.g., in L1 MEM 114), e.g., translating linear addresses into physical addresses for the misses and producing TLB entries to fill the first level TLBs for the misses. In certain examples, the PMH includes a second level TLB queue (STLBQ) 1002 to receive requests, a large second-level TLB 1004, a pipelined page walker 1010 (e.g., state machine) capable of handling multiple requests in flight, page walk caches, virtualization page walk caches, etc.

In certain examples, the PMH provides translation services for the front end (FE) circuitry 102, L1 MEM 114 (e.g., slices), L0 MEM 112 (e.g., clusters), and/or the prefetcher circuitry 120.

In certain examples, each L1 MEM slice, L0 MEM cluster, prefetcher circuitry, and/or FE circuitry may send the PMH circuitry address translation requests. In certain examples, the L1 MEM 114 (e.g., slices), L0 MEM 112 (e.g., clusters), and/or the prefetcher circuitry 120 will collect requests locally into a Translation Request Buffer (TRB) before sending the requests to the PMH circuitry 118. For example, the respective TRBs for clusters C0-C3 shown in L0 circuitry 112 and the respective TRBs 1001-0 to 1001-3 for slices S0-S4, respectively, as shown in FIG. 10.

In certain examples, the PMH circuitry will receive these (e.g., "miss") requests into a request holding structure positioned before the STLB 1004 pipeline in the PMH (e.g., the STLBQ 1002). In certain examples, the STLBQ 1002 includes a respective queue for each slice, cluster, FE circuitry, prefetcher circuitry, etc. In certain examples, the STLBQ 1002 will arbitrate ready requests into multiple (e.g., two) STLB pipelines, e.g., where the requests will check the (e.g., large) second level TLB (STLB 1004) for translation, and either hit or miss. In certain examples, STLB hits will fill into the first level TLBs (e.g., DTLB, ZTLB, and/or ITLB). In certain examples, a page walk queue 1006 is included, e.g., to store a miss request while a walk is performed.

In certain examples, STLB misses will arbitrate for a free page walker 1010 that will perform page walks, e.g., walking through L2 circuitry 116 (e.g., TLB therein) and/or further (e.g., system) memory. In certain examples, once a page walker is allocated, the STLBQ 1002 entry is put to sleep and does not arbitrate for the STLB pipeline until the walk completes. In certain examples, page walks will first check, in parallel, a set of page walk caches (PXEs) to find the deepest matching level of the page table. In certain examples, the page walkers will resume the walk from this deepest matching state. In certain examples, when a page walk is successfully complete, the page walker will write the translation into the STLB 1004 (and corresponding requester first level TLB) and wake up STLBQ 1002 entries that were sleeping as a result of matching the ongoing PWQ 1006 entry. In certain examples, the entry that allocated the PWQ 1006 entry will get deallocated after first level TLB fill without having to go down the STLB pipeline again. In certain examples, the STLBQ entries will arbitrate again for STLB 1004 pipeline, and if they hit in STLB, then the STLB will fill the first level TLBs.

In certain examples, in order to keep the DTLBs in sync with each other (e.g., and the ZTLBs in sync with each other), the PMH circuitry will also hold a primary copy of the DTLB and ZTLB, e.g., which will be checked for duplicates before sending fills to the L1 slices, prefetcher circuitry, and/or L0 clusters. In certain examples, the PMH circuitry will be responsible for choosing replacement ways in the first level MEM TLBs (e.g., DTLB and ZTLB, but not ITLB).

In certain examples, to accomplish this, the L0 TLBs and L1 TLBs will send the PMH circuitry sampled LRU update packets, providing a partial view of which TLB entries are actively being used by the L1s and the L0s. In certain examples, the PMH will update the L1 (or L0) LRU array based on these samples, and then choose a victim way based on this local view of TLB LRU.

Requests to PMH Circuitry

In certain examples, L0 MEM 112, L1 MEM 114, prefetching circuitry 120, and/or FE circuitry make address translation requests to PMH using dedicated networks. In certain examples, each L1 slice has its own DTLB miss interface to PMH circuitry, e.g., for a total of 4 interfaces in one example. In certain examples, e.g., to reduce wires, two of the four L0 clusters share one ZTLB miss interface to PMH circuitry.

In certain examples, prefetcher circuitry and/or FE circuitry have their own address translation and/or TLB miss interfaces to PMH circuitry 118. In certain examples, PMH circuitry 118 has an STLBQ 1002 for each of the TLB miss request interfaces, e.g., and is able to sink all requests from the various requesters. In certain examples, each requester (e.g., L1 slice, L0 cluster, prefetcher, FE) has an internal structure called TRB (translation request buffer) which is mapped 1:1 with the STLBQ and guarantees that STLBQ will not be overflown, e.g., which removes the need for a crediting mechanism between PMH circuitry and any of the requesters. In certain examples, the TRBs in each of the requesters are responsible for filtering out requests to the same linear address (e.g., 4k page boundary). In certain examples, a duplicate (e.g., 4k) boundary request will not allocate another TRB entry and will not be sent to PMH circuitry. In certain examples, when a requester's translation request buffer is full, that requester will not send additional translation request to PMH, guaranteeing not to overflow the STLBQ.

In certain examples, once requests arrive at PMH circuitry, they are written in the STLBQ for that particular requester. In certain examples, there are a plurality of (e.g., 8) STLBQs, for example, one for each requester: one SLTBTQ per L1 slice to hold requests from that slice (e.g., so four STLBQs for four slices); one STLBQ for the L0 Clusters (e.g., one queue shared between two clusters because they also share the request network); one STLBQ for requests coming from FE (e.g., front end ITLB miss requests); and one STLBQ for requests coming from the prefetcher circuitry.

In certain examples, within an STLBQ bank, the entries are aged based on allocation order (e.g., using an AOM-Age Order Matrix). In certain examples, the only exception is that a request received with the "at_ret" attribute set is always marked older than anything else that is already valid in the STLBQ bank. In certain examples, requests from STLBQs arbitrate for one of the (e.g., 2) STLB pipelines (e.g., "pipes"), e.g., and the STLBQ banks are statically bound to one of the pipelines as described below.

STLB Requests

In certain examples, there are two STLB pipelines, e.g., where the first pipeline (e.g., Pipe0) handles (e.g., services) requests from all (e.g., 4) L1 slices and Prefetch STLBQs, and the second pipeline line (e.g., Pipeline 1) handles (e.g., services) requests from all (e.g., 4) L0 clusters and FE STLBQs. In certain examples, requests coming from MEM parcels (e.g., L1 114 slices, L0 112 clusters, prefetcher circuitry 120) are also called d-side (data) requests. In certain examples, requests coming from FE circuitry 102 are also called i-side (instruction) requests.

PMH Interface

Figure 11:
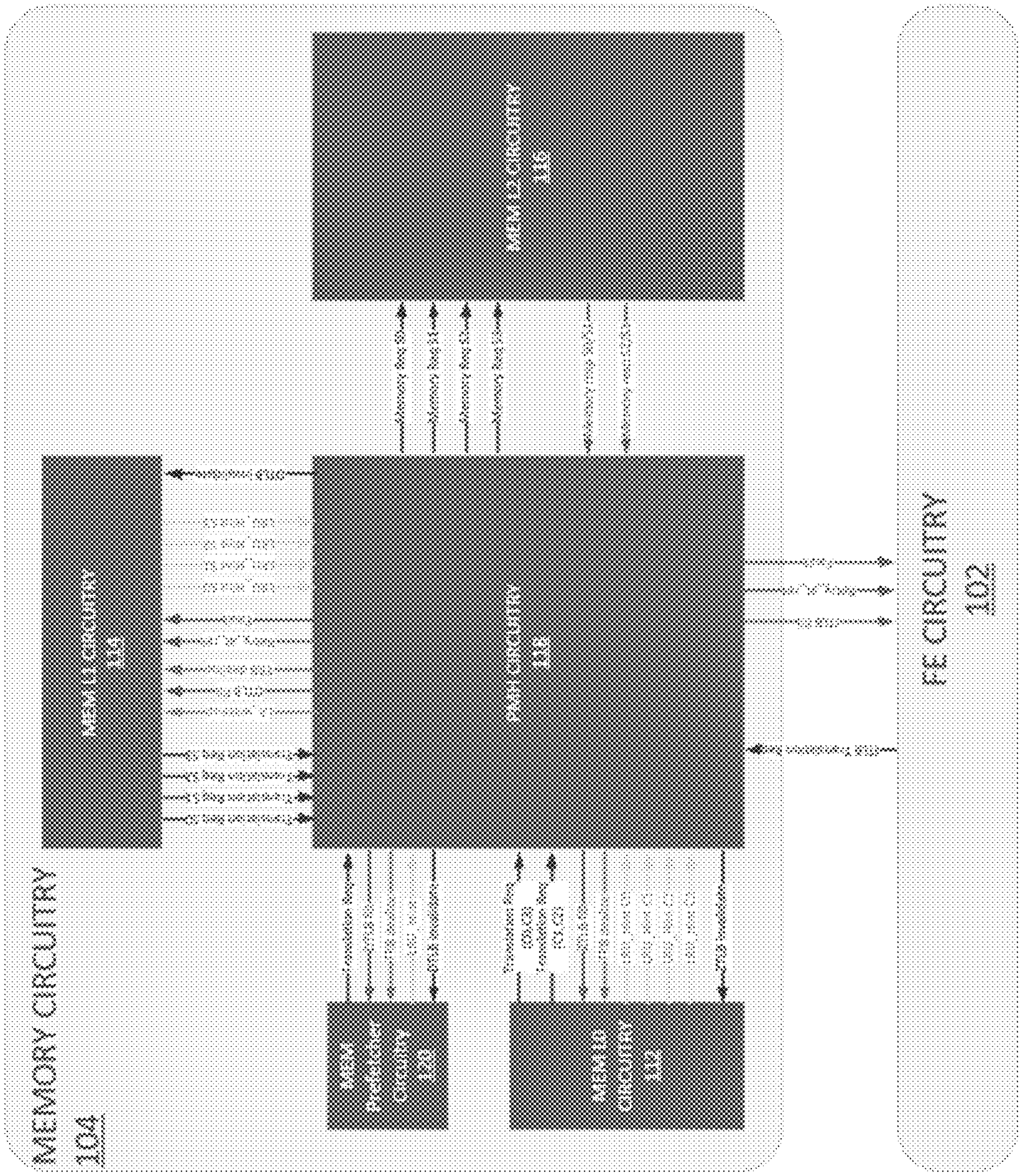
FIG. 11 illustrates interface couplings for the PMH circuitry according to examples of the disclosure.

FIG. 11 illustrates interface 1100 couplings for the PMH circuitry 118 according to examples of the disclosure.

L1 MEM Slice<--->PMH Interfaces

DTLB miss interface [e.g., FLD5]: In certain examples, each slice of L1 MEM has a respective instance of the DTLB miss interface to the PMH circuitry. In certain examples, this DLTB miss interface is used when there is a DTLB miss and the STLB/PMH is needed to perform Page Translation. In certain examples, only one request can be sent per cycle per slice.

In certain examples, DTLB misses in L1 MEM are collected in a Translation Request Buffer (TRB) (see, for example, FIG. 10), and sent to the PMH circuitry. In certain examples, the PMH circuitry maintains guaranteed storage for the translation requests in the STLBQ, therefore PMH is guaranteed to sink any translation requests sent to the PMH. In certain examples, there is 1:1 mapping between TRB entry ID and STLBQ entry ID for each slice.

DTLB LRU information [e.g., FLD4/FST4]: In certain examples, slices send periodic updates to PMH, e.g., such that DTLB LRU can be updated to reflect recently used ways in a set. In certain examples, there is one LRU packet per L1 slice per cycle.

In certain examples, a (e.g., 1G) DTLB is a fully associative array with multiple (e.g., 16) ways. In certain examples, in order to represent the way hit, the fl_dtlb_lru_upd_mfld4h packet will use the lower two bits of the set in conjunction with the two bits of way, e.g., 1G LRU update way={set[1:0], way[1:0]}.

In certain examples (e.g., in FLD3/FST3) multiple (e.g., 3) load pipes and multiple (e.g., 4) STA pipes total a plurality of (e.g., 7) hits in DTLB per cycle. In certain examples, a round robin arbitration amongst loads and store pipes happens (e.g., in FLD3). In certain examples, each winner from load pipeline and store pipeline LRU will be sent to a central location. In certain examples, (e.g., in FLD4), out of 2nd level round robin arbitration amongst load and store pipeline there will be one ultimate LRU winner that will be sent to PMH. In certain examples, after the DTLB LRU packet is generated (e.g., in FLD4), it will take {l1slice_pmh_delay} cycles to reach PMH.

Exemplary architectures, systems, etc. that the above may be used in are detailed below. Exemplary instruction formats that may cause any of the operations herein are detailed below.

Example Computer Architectures

Detailed below are descriptions of example computer architectures. Other system designs and configurations known in the arts for laptop, desktop, and handheld personal computers, (PC)s, personal digital assistants, engineering workstations, servers, disaggregated servers, network devices, network hubs, switches, routers, embedded processors, digital signal processors (DSPs), graphics devices, video game devices, set-top circuitry, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 12:
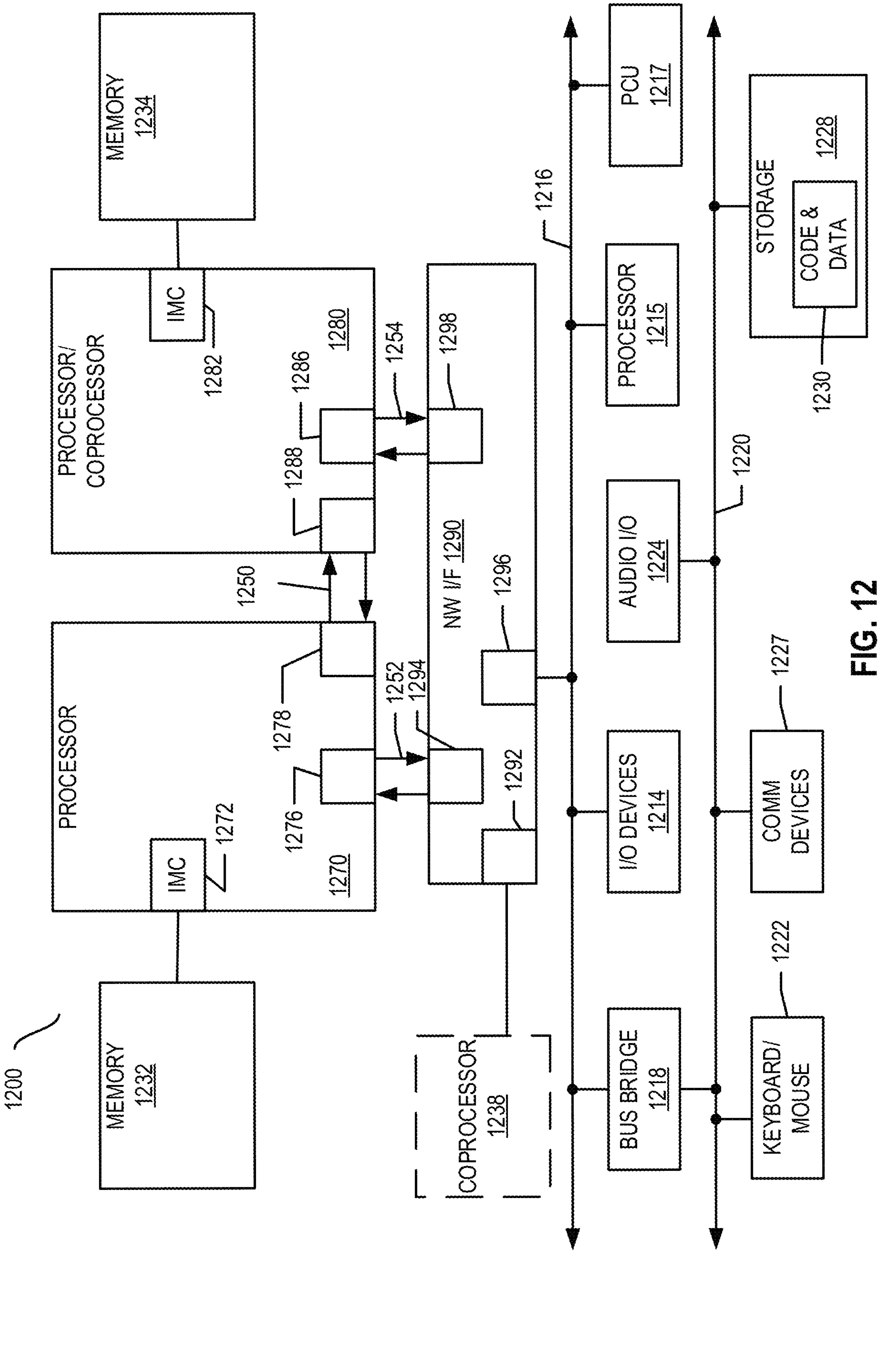
FIG. 12 illustrates an example computing system.

FIG. 12 illustrates an example computing system. Multiprocessor system 1200 is an interfaced system and includes a plurality of processors or cores including a first processor 1270 and a second processor 1280 coupled via an interface 1250 such as a point-to-point (P-P) interconnect, a fabric, and/or bus. In some examples, the first processor 1270 and the second processor 1280 are homogeneous. In some examples, the first processor 1270 and the second processor 1280 are heterogenous. Though the example system 1200 is shown to have two processors, the system may have three or more processors, or may be a single processor system. In some examples, the computing system is a system on a chip (SoC).

Processors 1270 and 1280 are shown including integrated memory controller (IMC) circuitry 1272 and 1282, respectively. Processor 1270 also includes interface circuits 1276 and 1278; similarly, second processor 1280 includes interface circuits 1286 and 1288. Processors 1270, 1280 may exchange information via the interface 1250 using interface circuits 1278, 1288. IMCs 1272 and 1282 couple the processors 1270, 1280 to respective memories, namely a memory 1232 and a memory 1234, which may be portions of main memory locally attached to the respective processors.

Processors 1270, 1280 may each exchange information with a network interface (NW I/F) 1290 via individual interfaces 1252, 1254 using interface circuits 1276, 1294, 1286, 1298. The network interface 1290 (e.g., one or more of an interconnect, bus, and/or fabric, and in some examples is a chipset) may optionally exchange information with a co-processor 1238 via an interface circuit 1292. In some examples, the co-processor 1238 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 1270, 1280 or outside of both processors, yet connected with the processors via an interface such as P-P interconnect, such that either or both processors' local cache information may be stored in the shared cache if a processor is placed into a low power mode.

Network interface 1290 may be coupled to a first interface 1216 via interface circuit 1296. In some examples, first interface 1216 may be an interface such as a Peripheral Component Interconnect (PCI) interconnect, a PCI Express interconnect or another I/O interconnect. In some examples, first interface 1216 is coupled to a power control unit (PCU) 1217, which may include circuitry, software, and/or firmware to perform power management operations with regard to the processors 1270, 1280 and/or co-processor 1238. PCU 1217 provides control information to a voltage regulator (not shown) to cause the voltage regulator to generate the appropriate regulated voltage. PCU 1217 also provides control information to control the operating voltage generated. In various examples, PCU 1217 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1217 is illustrated as being present as logic separate from the processor 1270 and/or processor 1280. In other cases, PCU 1217 may execute on a given one or more of cores (not shown) of processor 1270 or 1280. In some cases, PCU 1217 may be implemented as a microcontroller (dedicated or general-purpose) or other control logic configured to execute its own dedicated power management code, sometimes referred to as P-code. In yet other examples, power management operations to be performed by PCU 1217 may be implemented externally to a processor, such as by way of a separate power management integrated circuit (PMIC) or another component external to the processor. In yet other examples, power management operations to be performed by PCU 1217 may be implemented within BIOS or other system software.

Various I/O devices 1214 may be coupled to first interface 1216, along with a bus bridge 1218 which couples first interface 1216 to a second interface 1220. In some examples, one or more additional processor(s) 1215, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 1216. In some examples, second interface 1220 may be a low pin count (LPC) interface. Various devices may be coupled to the second interface 1220 including, for example, a keyboard and/or mouse 1222, communication devices 1227 and storage circuitry 1228. Storage circuitry 1228 may be one or more non-transitory machine-readable storage media as described below, such as a disk drive or other mass storage device which may include instructions/code and data 1230 and may implement a storage in some examples. Further, an audio I/O 1224 may be coupled to second interface 1220. Note that other architectures than the point-to-point architecture described above are possible. For example, instead of the point-to-point architecture, a system such as multiprocessor system 1200 may implement a multi-drop interface or other such architecture.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 13:
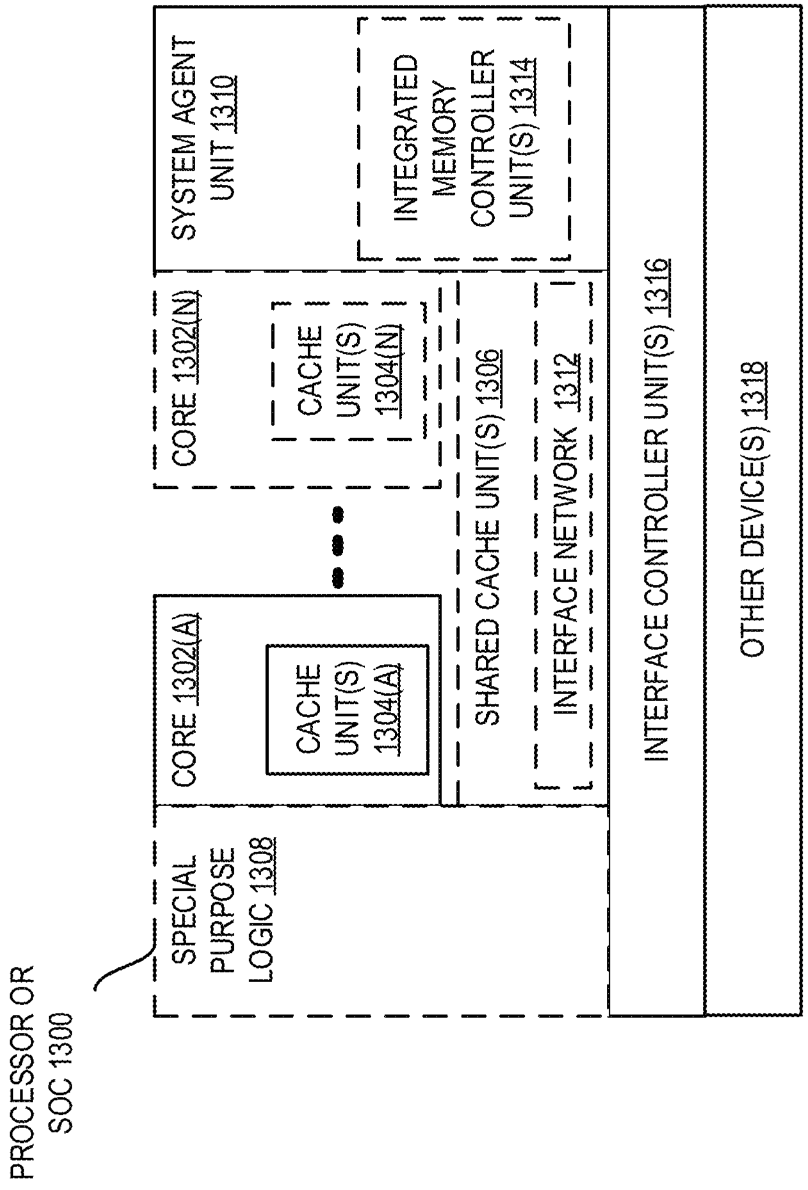
FIG. 13 illustrates a block diagram of an example of processor and/or System on a Chip (SoC) that may have one or more cores and an integrated memory controller.

FIG. 13 illustrates a block diagram of an example of processor and/or SoC 1300 that may have one or more cores and an integrated memory controller. The solid lined circuitry illustrate a processor 1300 with a single core 1302(A), system agent unit circuitry 1310, and a set of one or more interface controller unit(s) circuitry 1316, while the optional addition of the dashed lined circuitry illustrates an alternative processor 1300 with multiple cores 1302(A)-(N), a set of one or more integrated memory controller unit(s) circuitry 1314 in the system agent unit circuitry 1310, and special purpose logic 1308, as well as a set of one or more interface controller units circuitry 1316. Note that the processor pipeline 1400 may be that of one of the processors 1270 or 1280, or co-processor 1238 or 1215 of FIG. 12.

Thus, different implementations of the processor 1300 may include: 1) a CPU with the special purpose logic 1308 being integrated graphics and/or scientific (throughput) logic (which may include one or more cores, not shown), and the cores 1302(A)-(N) being one or more general purpose cores (e.g., general purpose in-order cores, general purpose out-of-order cores, or a combination of the two); 2) a coprocessor with the cores 1302(A)-(N) being a large number of special purpose cores intended primarily for graphics and/or scientific (throughput); and 3) a coprocessor with the cores 1302(A)-(N) being a large number of general purpose in-order cores. Thus, the processor 1300 may be a general-purpose processor, coprocessor, or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, complementary metal oxide semiconductor (CMOS), bipolar CMOS (BICMOS), P-type metal oxide semiconductor (PMOS), or N-type metal oxide semiconductor (NMOS).

A memory hierarchy includes one or more levels of cache unit(s) circuitry 1304(A)-(N) within the cores 1302(A)-(N), a set of one or more shared cache unit(s) circuitry 1306, and external memory (not shown) coupled to the set of integrated memory controller unit(s) circuitry 1314. The set of one or more shared cache unit(s) circuitry 1306 may include one or more mid-level caches, such as level 2 (L2), level 3 (L3), level 4 (L4), or other levels of cache, such as a last level cache (LLC), and/or combinations thereof. While in some examples interface network circuitry 1312 (e.g., a ring interconnect) interfaces the special purpose logic 1308 (e.g., integrated graphics logic), the set of shared cache unit(s) circuitry 1306, and the system agent unit circuitry 1310, alternative examples use any number of well-known techniques for interfacing such units. In some examples, coherency is maintained between one or more of the shared cache unit(s) circuitry 1306 and cores 1302(A)-(N). In some examples, interface controller units circuitry 1316 couple the cores 1302 to one or more other devices 1318 such as one or more I/O devices, storage, one or more communication devices (e.g., wireless networking, wired networking, etc.), etc.

In some examples, one or more of the cores 1302(A)-(N) are capable of multi-threading. The system agent unit circuitry 1310 includes those components coordinating and operating cores 1302(A)-(N). The system agent unit circuitry 1310 may include, for example, power control unit (PCU) circuitry and/or display unit circuitry (not shown). The PCU may be or may include logic and components needed for regulating the power state of the cores 1302(A)-(N) and/or the special purpose logic 1308 (e.g., integrated graphics logic). The display unit circuitry is for driving one or more externally connected displays.

The cores 1302(A)-(N) may be homogenous in terms of instruction set architecture (ISA). Alternatively, the cores 1302(A)-(N) may be heterogeneous in terms of ISA; that is, a subset of the cores 1302(A)-(N) may be capable of executing an ISA, while other cores may be capable of executing only a subset of that ISA or another ISA.

Example Core Architectures—In-Order and Out-of-Order Core Block Diagram

Figure 14A:
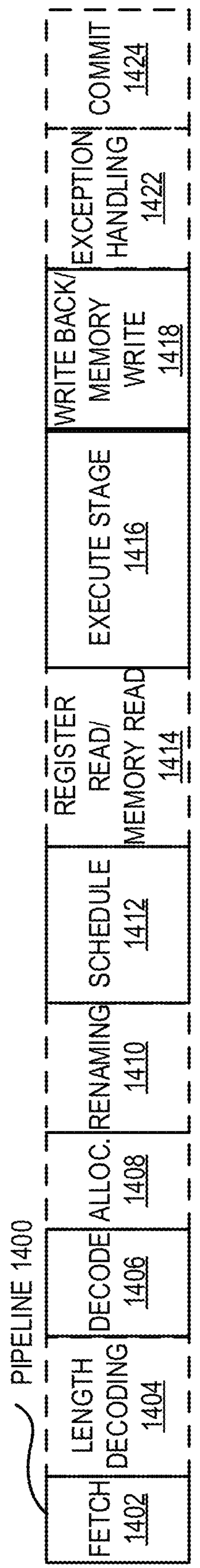
FIG. 14A is a block diagram illustrating both an example of in-order pipeline and an example of register renaming, out-of-order issue/execution pipeline according to examples.
Figure 14B:
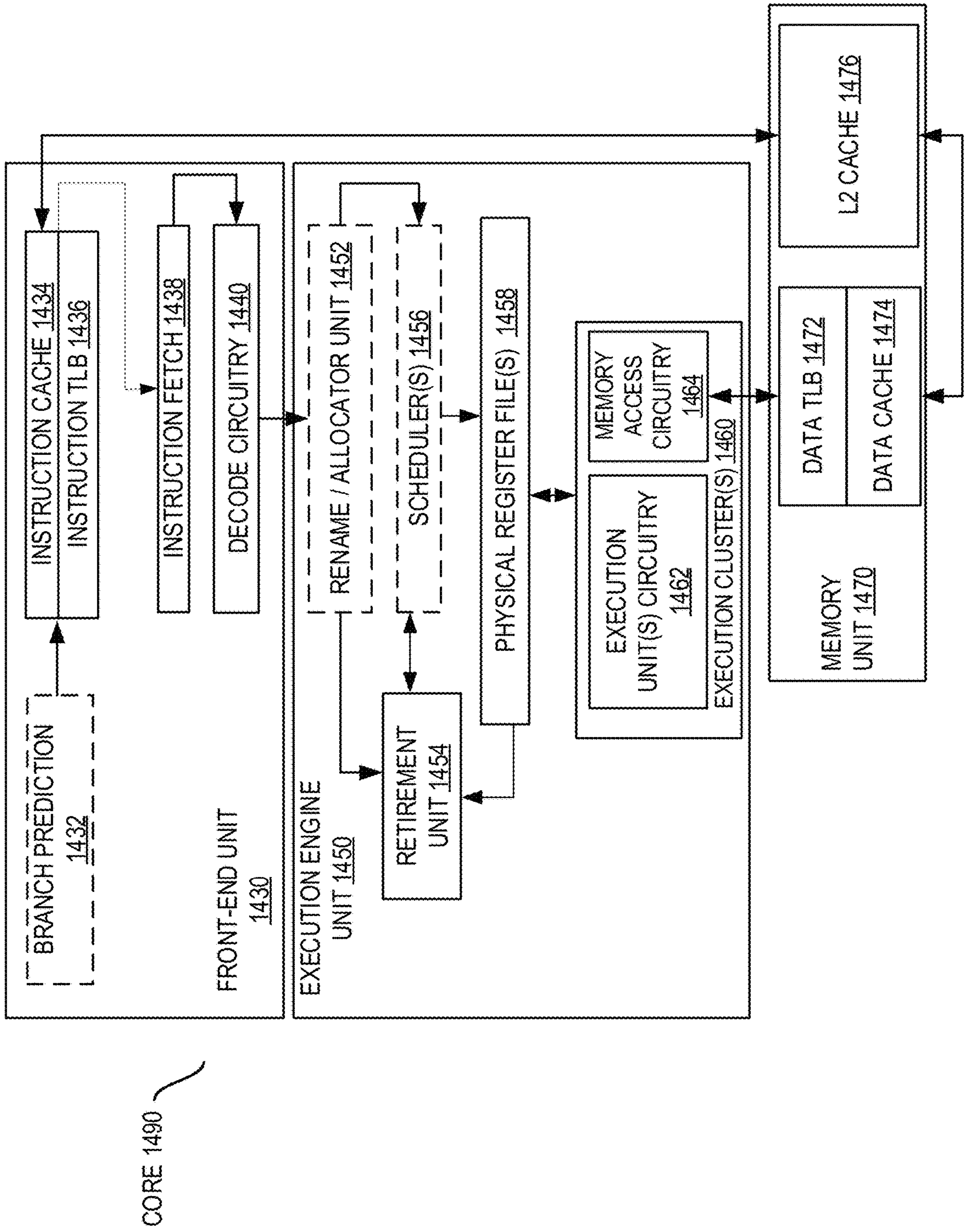
FIG. 14B is a block diagram illustrating both an example of in-order architecture core and an example of register renaming, out-of-order issue/execution architecture core to be included in a processor according to examples.

FIG. 14A is a block diagram illustrating both an example of in-order pipeline and an example of register renaming, out-of-order issue/execution pipeline according to examples. FIG. 14B is a block diagram illustrating both an example in-order architecture core and an example register renaming, out-of-order issue/execution architecture core to be included in a processor according to examples. The solid lined circuitry in FIGS. 14A-B illustrate the in-order pipeline and in-order core, while the optional addition of the dashed lined circuitry illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, an optional length decoding stage 1404, a decode stage 1406, an optional allocation (Alloc) stage 1408, an optional renaming stage 1410, a schedule (also known as a dispatch or issue) stage 1412, an optional register read/memory read stage 1414, an execute stage 1416, a write back/memory write stage 1418, an optional exception handling stage 1422, and an optional commit stage 1424. One or more operations can be performed in each of these processor pipeline stages. For example, during the fetch stage 1402, one or more instructions are fetched from instruction memory, and during the decode stage 1406, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1406 and the register read/memory read stage 1414 may be combined into one pipeline stage. In one example, during the execute stage 1416, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 14B may implement the pipeline 1400 as follows: 1) the instruction fetch circuitry 1438 performs the fetch and length decoding stages 1402 and 1404; 2) the decode circuitry 1440 performs the decode stage 1406; 3) the rename/allocator unit circuitry 1452 performs the allocation stage 1408 and renaming stage 1410; 4) the scheduler(s) circuitry 1456 performs the schedule stage 1412; 5) the physical register file(s) circuitry 1458 and the memory unit circuitry 1470 perform the register read/memory read stage 1414; the execution cluster(s) 1460 perform the execute stage 1416; 6) the memory unit circuitry 1470 and the physical register file(s) circuitry 1458 perform the write back/memory write stage 1418; 7) various circuitry may be involved in the exception handling stage 1422; and 8) the retirement unit circuitry 1454 and the physical register file(s) circuitry 1458 perform the commit stage 1424.

FIG. 14B shows a processor core 1490 including front-end unit circuitry 1430 coupled to execution engine unit circuitry 1450, and both are coupled to memory unit circuitry 1470. The core 1490 may be a reduced instruction set architecture computing (RISC) core, a complex instruction set architecture computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front-end unit circuitry 1430 may include branch prediction circuitry 1432 coupled to instruction cache circuitry 1434, which is coupled to an instruction translation lookaside buffer (TLB) 1436, which is coupled to instruction fetch circuitry 1438, which is coupled to decode circuitry 1440. In one example, the instruction cache circuitry 1434 is included in the memory unit circuitry 1470 rather than the front-end circuitry 1430. The decode circuitry 1440 (or decoder) may decode instructions, and generate as an output one or more micro-operations, micro-code entry points, microinstructions, other instructions, or other control signals, which are decoded from, or which otherwise reflect, or are derived from, the original instructions. Decode circuitry 1440 may further include address generation unit (AGU, not shown) circuitry. In one example, the AGU generates an LSU address using forwarded register ports, and may further perform branch forwarding (e.g., immediate offset branch forwarding, LR register branch forwarding, etc.). Decode circuitry 1440 may be implemented using various different mechanisms. Examples of suitable mechanisms include, but are not limited to, look-up tables, hardware implementations, programmable logic arrays (PLAs), microcode read only memories (ROMs), etc. In one example, the core 1490 includes a microcode ROM (not shown) or other medium that stores microcode for certain macroinstructions (e.g., in decode circuitry 1440 or otherwise within the front-end circuitry 1430). In one example, the decode circuitry 1440 includes a micro-operation (micro-op) or operation cache (not shown) to hold/cache decoded operations, micro-tags, or micro-operations generated during the decode or other stages of the processor pipeline 1400. The decode circuitry 1440 may be coupled to rename/allocator unit circuitry 1452 in the execution engine circuitry 1450.

The execution engine circuitry 1450 includes the rename/allocator unit circuitry 1452 coupled to retirement unit circuitry 1454 and a set of one or more scheduler(s) circuitry 1456. The scheduler(s) circuitry 1456 represents any number of different schedulers, including reservations stations, central instruction window, etc. In some examples, the scheduler(s) circuitry 1456 can include arithmetic logic unit (ALU) scheduler/scheduling circuitry, ALU queues, address generation unit (AGU) scheduler/scheduling circuitry, AGU queues, etc. The scheduler(s) circuitry 1456 is coupled to the physical register file(s) circuitry 1458. Each of the physical register file(s) circuitry 1458 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1458 includes vector registers unit circuitry, writemask registers unit circuitry, and scalar register unit circuitry. These register units may provide architectural vector registers, vector mask registers, general-purpose registers, etc. The physical register file(s) circuitry 1458 is coupled to the retirement unit circuitry 1454 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1454 and the physical register file(s) circuitry 1458 are coupled to the execution cluster(s) 1460. The execution cluster(s) 1460 includes a set of one or more execution unit(s) circuitry 1462 and a set of one or more memory access circuitry 1464. The execution unit(s) circuitry 1462 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1456, physical register file(s) circuitry 1458, and execution cluster(s) 1460 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1464). It should also be understood that where separate pipelines are used, one or more of these pipelines may be out-of-order issue/execution and the rest in-order.

In some examples, the execution engine unit circuitry 1450 may perform load store unit (LSU) address/data pipelining to an Advanced Microcontroller Bus (AMB) interface (not shown), and address phase and writeback, data phase load, store, and branches.

The set of memory access circuitry 1464 is coupled to the memory unit circuitry 1470, which includes data TLB circuitry 1472 coupled to data cache circuitry 1474 coupled to level 2 (L2) cache circuitry 1476. In one example, the memory access circuitry 1464 may include load unit circuitry, store address unit circuitry, and store data unit circuitry, each of which is coupled to the data TLB circuitry 1472 in the memory unit circuitry 1470. The instruction cache circuitry 1434 is further coupled to the level 2 (L2) cache circuitry 1476 in the memory unit circuitry 1470. In one example, the instruction cache 1434 and the data cache 1474 are combined into a single instruction and data cache (not shown) in L2 cache circuitry 1476, level 3 (L3) cache circuitry (not shown), and/or main memory. The L2 cache circuitry 1476 is coupled to one or more other levels of cache and eventually to a main memory.

Core 1490 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, core 1490 includes logic to support a packed data instruction set architecture extension (e.g., AVX1, AVX2), thereby allowing the operations used by many multimedia applications to be performed using packed data.

Example Execution Unit(s) Circuitry

Figure 15:
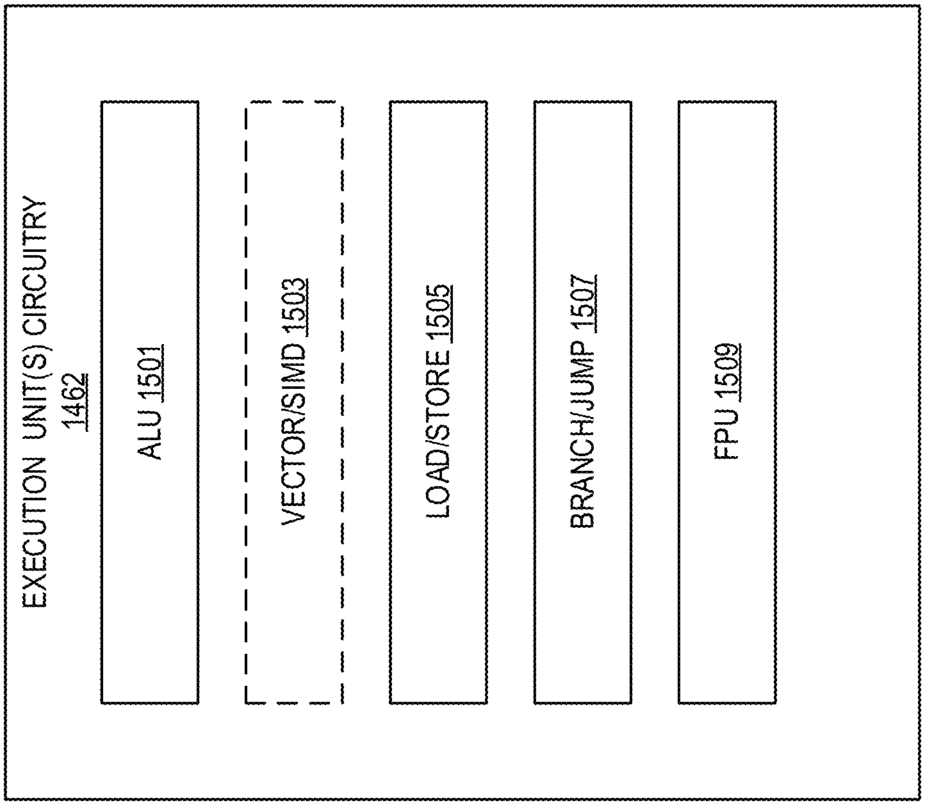
FIG. 15 illustrates examples of execution unit(s) circuitry.

FIG. 15 illustrates examples of execution unit(s) circuitry, such as execution unit(s) circuitry 1462 of FIG. 14B. As illustrated, execution unit(s) circuitry 1462 may include one or more ALU circuits 1501, optional vector/single instruction multiple data (SIMD) circuits 1503, load/store circuits 1505, branch/jump circuits 1507, and/or Floating-point unit (FPU) circuits 1509. ALU circuits 1501 perform integer arithmetic and/or Boolean operations. Vector/SIMD circuits 1503 perform vector/SIMD operations on packed data (such as SIMD/vector registers). Load/store circuits 1505 execute load and store instructions to load data from memory into registers or store from registers to memory. Load/store circuits 1505 may also generate addresses. Branch/jump circuits 1507 cause a branch or jump to a memory address depending on the instruction. FPU circuits 1509 perform floating-point arithmetic. The width of the execution unit(s) circuitry 1462 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture

Figure 16:
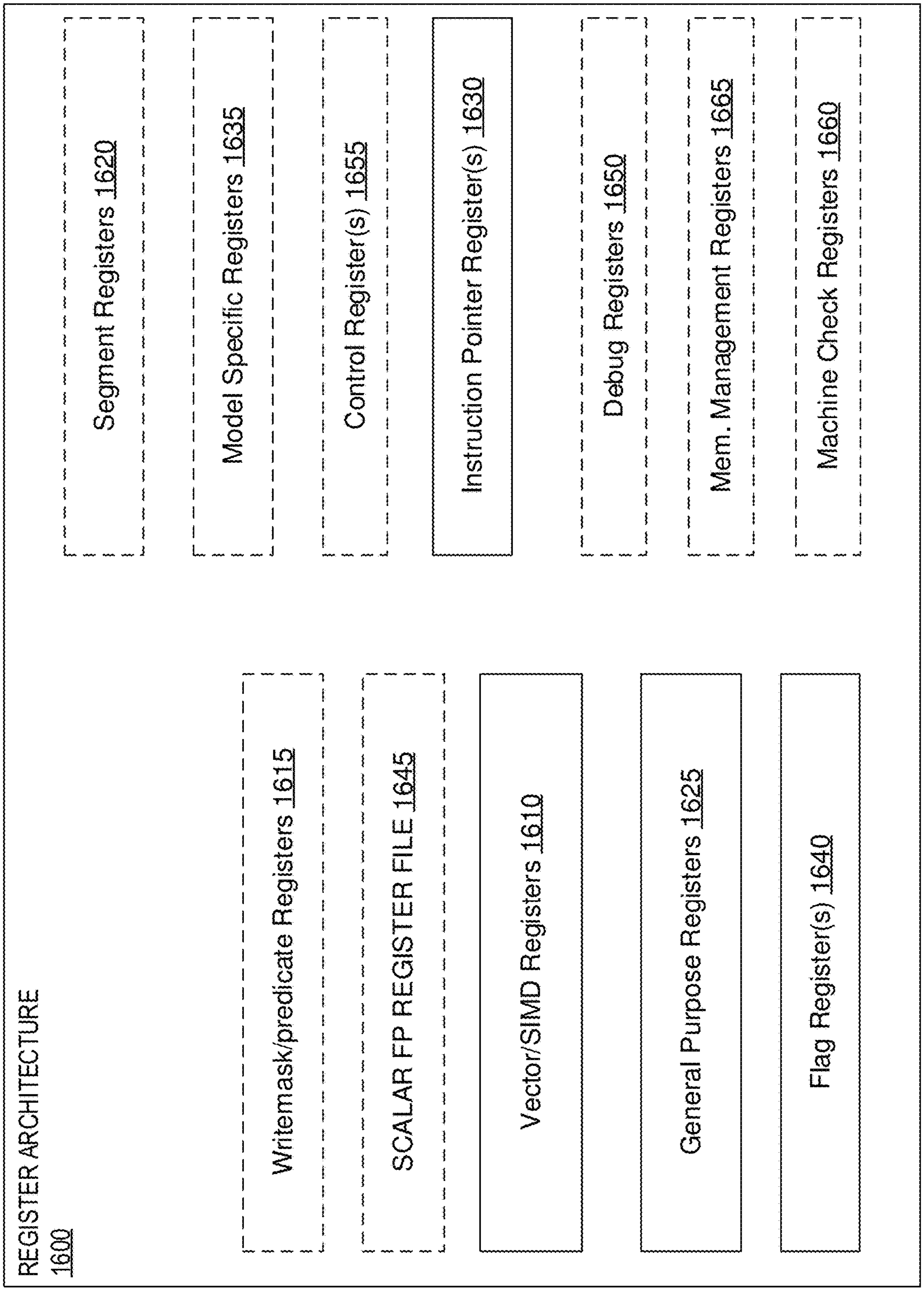
FIG. 16 is a block diagram of a register architecture according to some examples.

FIG. 16 is a block diagram of a register architecture 1600 according to some examples. As illustrated, the register architecture 1600 includes vector/SIMD registers 1610 that vary from 128-bit to 1,024 bits width. In some examples, the vector/SIMD registers 1610 are physically 512-bits and, depending upon the mapping, only some of the lower bits are used. For example, in some examples, the vector/SIMD registers 1610 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1600 includes writemask/predicate registers 1615. For example, in some examples, there are 8 writemask/predicate registers (sometimes called k0 through k7) that are each 16-bit, 32-bit, 64-bit, or 128-bit in size. Writemask/predicate registers 1615 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1615 corresponds to a data element position of the destination. In other examples, the writemask/predicate registers 1615 are scalable and includes a set number of enable bits for a given vector element (e.g., 8 enable bits per 64-bit vector element).

The register architecture 1600 includes a plurality of general-purpose registers 1625. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1600 includes scalar floating-point (FP) register file 1645 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1640 (e.g., EFLAGS, RFLAGS, etc.) store status and control information for arithmetic, compare, and system operations. For example, the one or more flag registers 1640 may store condition code information such as carry, parity, auxiliary carry, zero, sign, and overflow. In some examples, the one or more flag registers 1640 are called program status and control registers.

Segment registers 1620 contain segment points for use in accessing memory. In some examples, these registers are referenced by the names CS, DS, SS, ES, FS, and GS.

Machine specific registers (MSRs) 1635 control and report on processor performance. Most MSRs 1635 handle system-related functions and are not accessible to an application program. Machine check registers 1660 consist of control, status, and error reporting MSRs that are used to detect and report on hardware errors.

One or more instruction pointer register(s) 1630 store an instruction pointer value. Control register(s) 1655 (e.g., CR0-CR4) determine the operating mode of a processor (e.g., processor 1270, 1280, 1238, 1215, and/or 1300) and the characteristics of a currently executing task. Debug registers 1650 control and allow for the monitoring of a processor or core's debugging operations.

Memory (mem) management registers 1665 specify the locations of data structures used in protected mode memory management. These registers may include a global descriptor table register (GDTR), interrupt descriptor table register (IDTR), task register, and a local descriptor table register (LDTR) register.

Alternative examples may use wider or narrower registers. Additionally, alternative examples may use more, less, or different register files and registers. The register architecture 1600 may, for example, be used in register file/memory 'ISAB08, or physical register file(s) circuitry 15 58.

Instruction Set Architectures

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale CA implement nearly identical versions of the x86 instruction set (with some extensions that have been added with newer versions) but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

An ISA may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Example Instruction Formats

Examples of the instruction(s) described herein may be embodied in different formats. Additionally, example systems, architectures, and pipelines are detailed below. Examples of the instruction(s) may be executed on such systems, architectures, and pipelines, but are not limited to those detailed.

Figure 17:
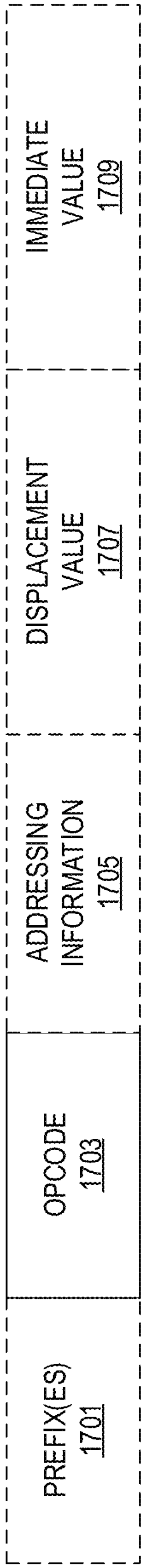
FIG. 17 illustrates examples of an instruction format.

FIG. 17 illustrates examples of an instruction format. As illustrated, an instruction may include multiple components including, but not limited to, one or more fields for: one or more prefixes 1701, an opcode 1703, addressing information 1705 (e.g., register identifiers, memory addressing information, etc.), a displacement value 1707, and/or an immediate value 1709. Note that some instructions utilize some or all the fields of the format whereas others may only use the field for the opcode 1703. In some examples, the order illustrated is the order in which these fields are to be encoded, however, it should be appreciated that in other examples these fields may be encoded in a different order, combined, etc.

The prefix(es) field(s) 1701, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1703 is used to at least partially define the operation to be performed upon a decoding of the instruction. In some examples, a primary opcode encoded in the opcode field 1703 is one, two, or three bytes in length. In other examples, a primary opcode can be a different length. An additional 3-bit opcode field is sometimes encoded in another field.

Figure 18:
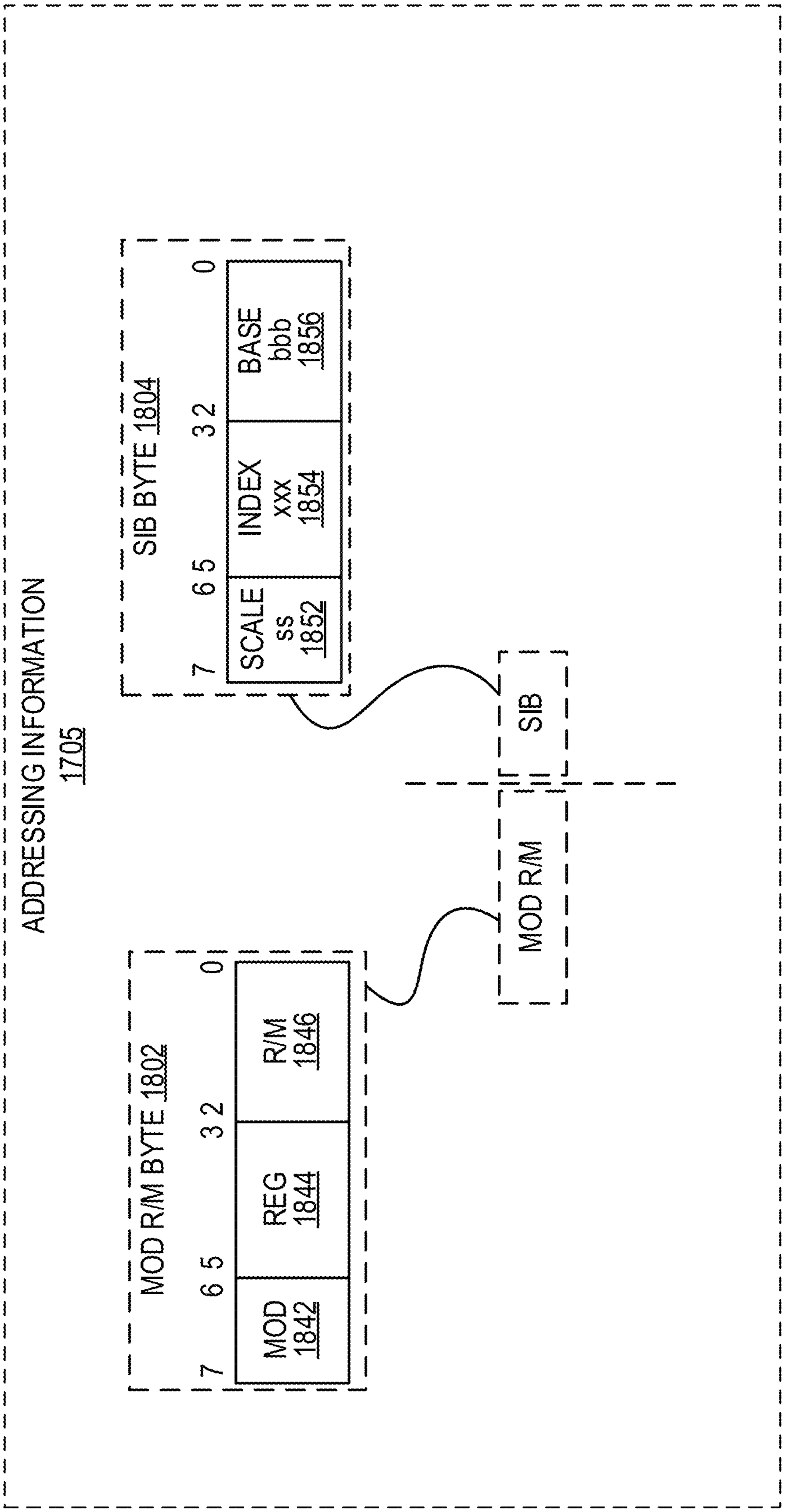
FIG. 18 illustrates examples of an addressing information field.

The addressing information field 1705 is used to address one or more operands of the instruction, such as a location in memory or one or more registers. FIG. 18 illustrates examples of the addressing information field 1705. In this illustration, an optional MOD R/M byte 1802 and an optional Scale, Index, Base (SIB) byte 1804 are shown. The MOD R/M byte 1802 and the SIB byte 1804 are used to encode up to two operands of an instruction, each of which is a direct register or effective memory address. Note that both of these fields are optional in that not all instructions include one or more of these fields. The MOD R/M byte 1802 includes a MOD field 1842, a register (reg) field 1844, and R/M field 1846.

The content of the MOD field 1842 distinguishes between memory access and non-memory access modes. In some examples, when the MOD field 1842 has a binary value of 11 (11b), a register-direct addressing mode is utilized, and otherwise a register-indirect addressing mode is used.

The register field 1844 may encode either the destination register operand or a source register operand or may encode an opcode extension and not be used to encode any instruction operand. The content of register field 1844, directly or through address generation, specifies the locations of a source or destination operand (either in a register or in memory). In some examples, the register field 1844 is supplemented with an additional bit from a prefix (e.g., prefix 1701) to allow for greater addressing.

The R/M field 1846 may be used to encode an instruction operand that references a memory address or may be used to encode either the destination register operand or a source register operand. Note the R/M field 1846 may be combined with the MOD field 1842 to dictate an addressing mode in some examples.

The SIB byte 1804 includes a scale field 1852, an index field 1854, and a base field 1856 to be used in the generation of an address. The scale field 1852 indicates a scaling factor. The index field 1854 specifies an index register to use. In some examples, the index field 1854 is supplemented with an additional bit from a prefix (e.g., prefix 1701) to allow for greater addressing. The base field 1856 specifies a base register to use. In some examples, the base field 1856 is supplemented with an additional bit from a prefix (e.g., prefix 1701) to allow for greater addressing. In practice, the content of the scale field 1852 allows for the scaling of the content of the index field 1854 for memory address generation (e.g., for address generation that uses 2scale*index+base).

Some addressing forms utilize a displacement value to generate a memory address. For example, a memory address may be generated according to 2scale*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, the displacement field 1707 provides this value. Additionally, in some examples, a displacement factor usage is encoded in the MOD field of the addressing information field 1705 that indicates a compressed displacement scheme for which a displacement value is calculated and stored in the displacement field 1707.

In some examples, the immediate value field 1709 specifies an immediate value for the instruction. An immediate value may be encoded as a 1-byte value, a 2-byte value, a 4-byte value, etc.

Figure 19:
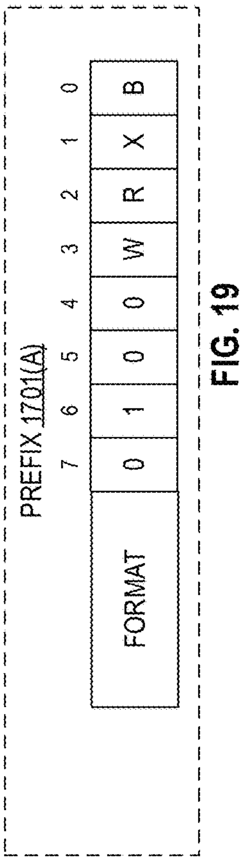
FIG. 19 illustrates examples of a first prefix.

FIG. 19 illustrates examples of a first prefix 1701(A). In some examples, the first prefix 1701(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1701(A) may specify up to three registers using 3-bit fields depending on the format: 1) using the reg field 1844 and the R/M field 1846 of the MOD R/M byte 1802; 2) using the MOD R/M byte 1802 with the SIB byte 1804 including using the reg field 1844 and the base field 1856 and index field 1854; or 3) using the register field of an opcode.

In the first prefix 1701(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 (24) registers to be addressed, whereas the MOD R/M reg field 1844 and MOD R/M R/M field 1846 alone can each only address 8 registers.

In the first prefix 1701(A), bit position 2 (R) may be an extension of the MOD R/M reg field 1844 and may be used to modify the MOD R/M reg field 1844 when that field encodes a general-purpose register, a 64-bit packed data register (e.g., an SSE register), or a control or debug register. R is ignored when MOD R/M byte 1802 specifies other registers or defines an extended opcode.

Bit position 1 (X) may modify the SIB byte index field 1854.

Bit position 0 (B) may modify the base in the MOD R/M R/M field 1846 or the SIB byte base field 1856; or it may modify the opcode register field used for accessing general purpose registers (e.g., general purpose registers 1625).

Figure 20A:
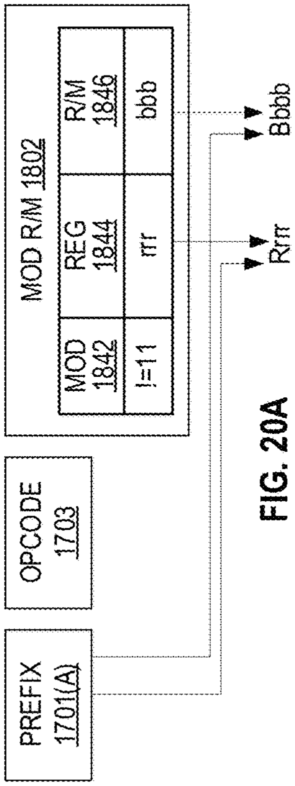
FIGS. 20A-D illustrate examples of how the R, X, and B fields of the first prefix in FIG. 19 are used.
Figure 20B:
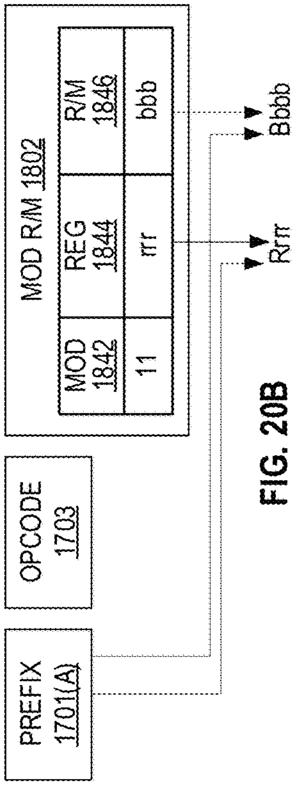
Figure 20C:
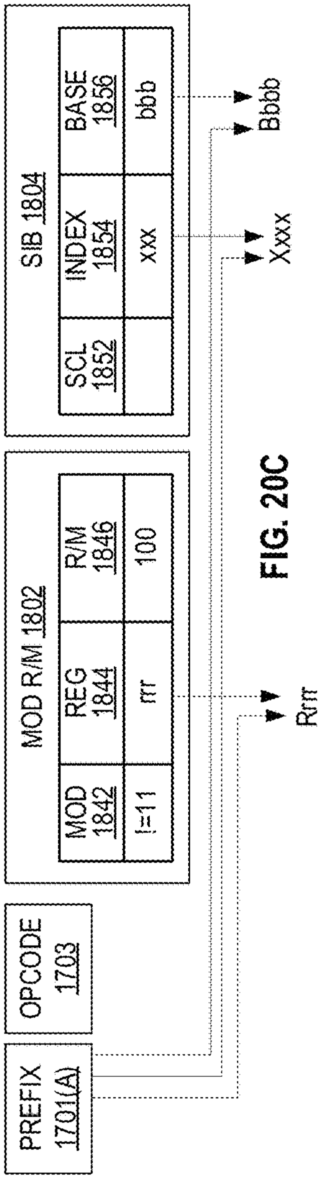
Figure 20D:
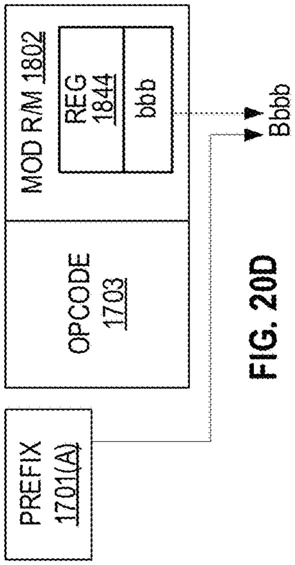

FIGS. 20A-D illustrate examples of how the R, X, and B fields of the first prefix 1701(A) are used. FIG. 20A illustrates R and B from the first prefix 1701(A) being used to extend the reg field 1844 and R/M field 1846 of the MOD R/M byte 1802 when the SIB byte 18 04 is not used for memory addressing. FIG. 20B illustrates R and B from the first prefix 1701(A) being used to extend the reg field 1844 and R/M field 1846 of the MOD R/M byte 1802 when the SIB byte 1804 is not used (register-register addressing). FIG. 20C illustrates R, X, and B from the first prefix 1701(A) being used to extend the reg field 1844 of the MOD R/M byte 1802 and the index field 1854 and base field 1856 when the SIB byte 1804 being used for memory addressing. FIG. 20D illustrates B from the first prefix 1701(A) being used to extend the reg field 1844 of the MOD R/M byte 1802 when a register is encoded in the opcode 1703.

Figure 21A:
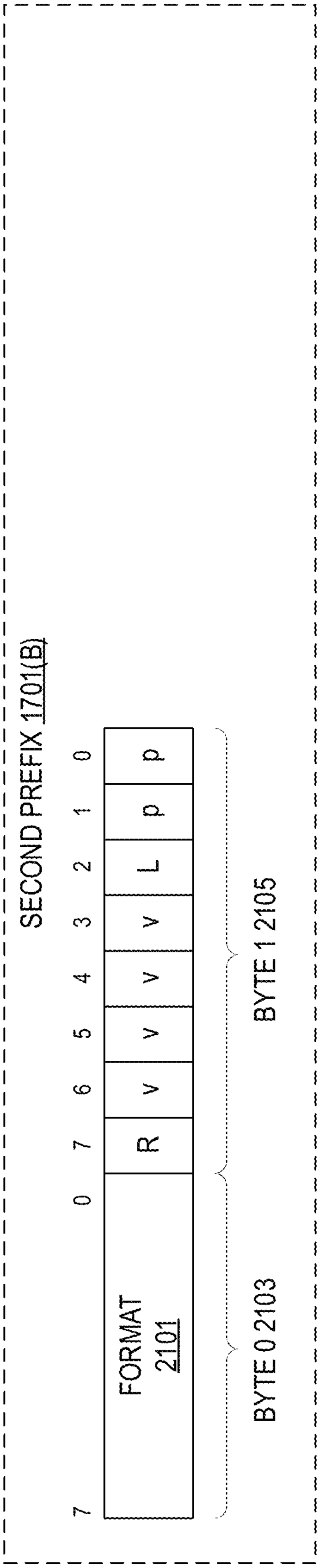
FIGS. 21A-B illustrate examples of a second prefix.
Figure 21B:
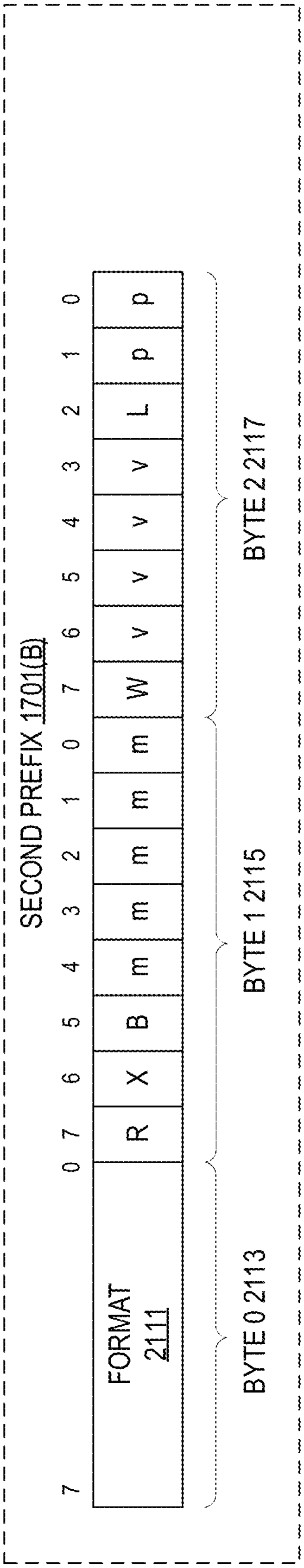

FIGS. 21A-B illustrate examples of a second prefix 1701 (B). In some examples, the second prefix 1701(B) is an example of a VEX prefix. The second prefix 1701(B) encoding allows instructions to have more than two operands, and allows SIMD vector registers (e.g., vector/SIMD registers 1610) to be longer than 64-bits (e.g., 128-bit and 256-bit). The use of the second prefix 1701(B) provides for three-operand (or more) syntax. For example, previous two-operand instructions performed operations such as A=A+B, which overwrites a source operand. The use of the second prefix 1701(B) enables operands to perform nondestructive operations such as A=B+C.

In some examples, the second prefix 1701(B) comes in two forms—a two-byte form and a three-byte form. The two-byte second prefix 1701(B) is used mainly for 128-bit, scalar, and some 256-bit instructions; while the three-byte second prefix 1701(B) provides a compact replacement of the first prefix 1701(A) and 3-byte opcode instructions.

FIG. 21A illustrates examples of a two-byte form of the second prefix 1701(B). In one example, a format field 2101 (byte 0 2103) contains the value C5H. In one example, byte 1 2105 includes an "R" value in bit[7]. This value is the complement of the "R" value of the first prefix 1701(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (Is complement) form and valid for instructions with 2 or more source operands; 2) encode the destination register operand, specified in Is complement form for certain vector shifts; or 3) not encode any operand, the field is reserved and should contain a certain value, such as 1111b.

Instructions that use this prefix may use the MOD R/M R/M field 1846 to encode the instruction operand that references a memory address or encode either the destination register operand or a source register operand.

Instructions that use this prefix may use the MOD R/M reg field 1844 to encode either the destination register operand or a source register operand, or to be treated as an opcode extension and not used to encode any instruction operand.

For instruction syntax that support four operands, vvvv, the MOD R/M R/M field 1846 and the MOD R/M reg field 1844 encode three of the four operands. Bits[7:4] of the immediate value field 1709 are then used to encode the third source register operand.

FIG. 21B illustrates examples of a three-byte form of the second prefix 1701(B). In one example, a format field 2111 (byte 0 2113) contains the value C4H. Byte 1 2115 includes in bits [7:5] "R," "X," and "B" which are the complements of the same values of the first prefix 1701(A). Bits[4:0] of byte 1 2115 (shown as mmmmm) include content to encode, as need, one or more implied leading opcode bytes. For example, 00001 implies a 0FH leading opcode, 00010 implies a 0F38H leading opcode, 00011 implies a 0F3AH leading opcode, etc.

Bit[7] of byte 2 2117 is used similar to W of the first prefix 1701(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (Is complement) form and valid for instructions with 2 or more source operands; 2) encode the destination register operand, specified in Is complement form for certain vector shifts; or 3) not encode any operand, the field is reserved and should contain a certain value, such as 1111b.

Instructions that use this prefix may use the MOD R/M R/M field 1846 to encode the instruction operand that references a memory address or encode either the destination register operand or a source register operand.

Instructions that use this prefix may use the MOD R/M reg field 1844 to encode either the destination register operand or a source register operand, or to be treated as an opcode extension and not used to encode any instruction operand.

For instruction syntax that supports four operands, vvvv, the MOD R/M R/M field 1846, and the MOD R/M reg field 1844 encode three of the four operands. Bits[7:4] of the immediate value field 1709 are then used to encode the third source register operand.

Figure 22:
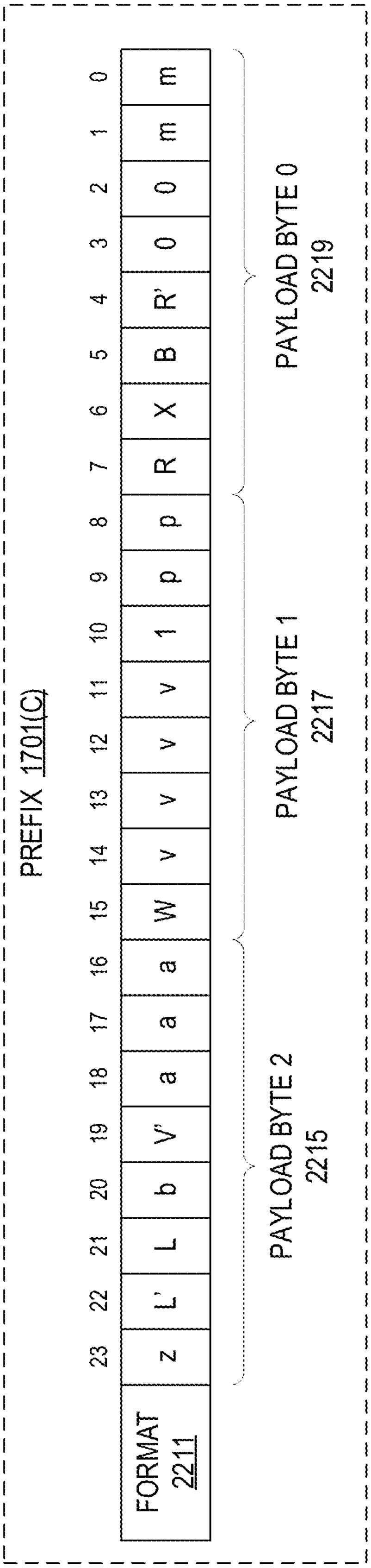
FIG. 22 illustrates examples of a third prefix.

FIG. 22 illustrates examples of a third prefix 1701(C). In some examples, the third prefix 1701(C) is an example of an EVEX prefix. The third prefix 1701(C) is a four-byte prefix.

The third prefix 1701(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 16) or predication utilize this prefix. Opmask register allow for conditional processing or selection control. Opmask instructions, whose source/destination operands are opmask registers and treat the content of an opmask register as a single value, are encoded using the second prefix 1701(B).

The third prefix 1701(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1701(C) is a format field 2211 that has a value, in one example, of 62H. Subsequent bytes are referred to as payload bytes 2215-2219 and collectively form a 24-bit value of P[23:0] providing specific capability in the form of one or more fields (detailed herein).

In some examples, P[1:0] of payload byte 2219 are identical to the low two mm bits. P[3:2] are reserved in some examples. Bit P[4] (R') allows access to the high 16 vector register set when combined with P[7] and the MOD R/M reg field 1844. P[6] can also provide access to a high 16 vector register when SIB-type addressing is not needed. P[7:5] consist of R, X, and B which are operand specifier modifier bits for vector register, general purpose register, memory addressing and allow access to the next set of 8 registers beyond the low 8 registers when combined with the MOD R/M register field 1844 and MOD R/M R/M field 1846. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in Is complement form for certain vector shifts; or 3) not encode any operand, the field is reserved and should contain a certain value, such as 1111b.

P[15] is similar to W of the first prefix 1701(A) and second prefix 1711(B) and may serve as an opcode extension bit or operand size promotion.

P[18:16] specify the index of a register in the opmask (writemask) registers (e.g., writemask/predicate registers 1615). In one example, the specific value aaa=OOO has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differ across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.)

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 23:
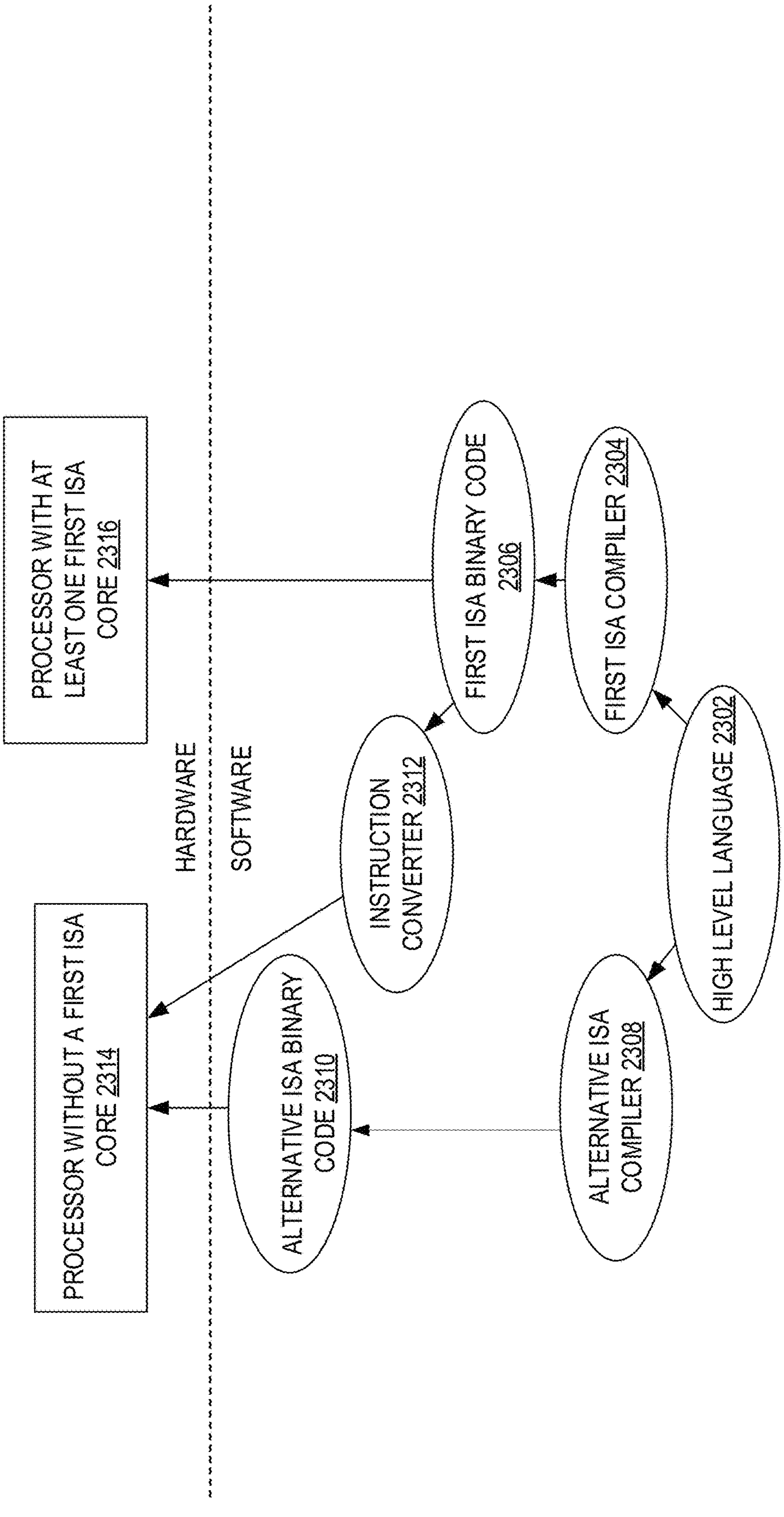
FIG. 23 is a block diagram illustrating the use of a software instruction converter to convert binary instructions in a source instruction set architecture to binary instructions in a target instruction set architecture according to examples.

FIG. 23 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 23 shows a program in a high-level language 2302 may be compiled using a first ISA compiler 2304 to generate first ISA binary code 2306 that may be natively executed by a processor with at least one first ISA core 2316. The processor with at least one first ISA core 2316 represents any processor that can perform substantially the same functions as an Intel® processor with at least one first ISA core by compatibly executing or otherwise processing (1) a substantial portion of the first ISA or (2) object code versions of applications or other software targeted to run on an Intel processor with at least one first ISA core, in order to achieve substantially the same result as a processor with at least one first ISA core. The first ISA compiler 2304 represents a compiler that is operable to generate first ISA binary code 2306 (e.g., object code) that can, with or without additional linkage processing, be executed on the processor with at least one first ISA core 2316. Similarly, FIG. 23 shows the program in the high-level language 2302 may be compiled using an alternative ISA compiler 2308 to generate alternative ISA binary code 2310 that may be natively executed by a processor without a first ISA core 2314. The instruction converter 2312 is used to convert the first ISA binary code 2306 into code that may be natively executed by the processor without a first ISA core 2314. This converted code is not necessarily to be the same as the alternative ISA binary code 2310; however, the converted code will accomplish the general operation and be made up of instructions from the alternative ISA. Thus, the instruction converter 2312 represents software, firmware, hardware, or a combination thereof that, through emulation, simulation, or any other process, allows a processor or other electronic device that does not have a first ISA processor or core to execute the first ISA binary code 2306.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e., A and B, A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Apparatus and Method for Booting an Application Processor

Processors based on the Intel Architecture (AI) have traditionally booted in 16-bit real mode through the startup inter-processor interrupt and initialization interrupt (SIPI/INIT) mechanism. The bootstrap processor (BSP) sends SIPI messages which pass an 8-bit vector, defining the 16-bit entry point in the first 1 MB of memory, to the application processor, which starts executing there in real mode.

In implementations using Trust Domain Extensions (TDX), the Basic Input/Output System (BIOS) puts application processors into a loop polling a mailbox location in memory. A software table provides a pointer to the mailbox and the OS writes a value and a callback pointer to cause the application processor in the polling loop to execute the callback in 64-bit mode. There are also approaches inside virtual machines that use custom register interfaces (e.g., ones for MSR registers) to boot a 64-bit application processor.

These implementations are limited in a variety of ways. For example, the INIT/SIPI mechanism requires 16-bit mode to boot, which is a burden for software development as the software cannot be generated with a typical compiler and must be executed in 16-bit mode on processors. Another disadvantage is that these implementations require addressable memory in the first 1 MB of the address space, which may complicate the design of the address decoder in the memory controller because memory cannot be contiguous. The limited vector size that can be transferred by the hardware does not have enough space to transfer information like a pointer to the page table for paged mode.

TDX implementations require polling which has a significant power overhead. This also makes it more complicated to keep some processors inactive or activate them at a later time ("hotplug") because the processor cannot be kept in polling mode for energy reasons. Using too much energy impacts the other cores due to power management sharing the power budget. The operating system would need to take over the processor and move it to a special idle loop that complicates the software. There is also a case where one kernel boots another kernel ("kexec"), replacing its memory image, and it is difficult to transfer the idle loops of non-booted processors to a new kernel in such a case. Previous implementations using custom registers (e.g., MSRs) rather than the APIC interface for SIPI require virtualization because they are too complicated to implement in micro-code/hardware and, thus, cannot be used natively with a VMM.

Embodiments of the disclosure include a per-package register that points to a structure in memory that describes the state of a newly booted application processor. The per-package register is shared by all the cores in the single processor package. The boot processor fills in this structure or uses an existing read-only one in flash and then uses an APIC startup inter-processor interrupt (SIPI) message to trigger booting the other processors. The other processors then use the memory structure to initialize themselves to 64-bit paged mode with page tables and status registers. In 64-bit paged mode, the processor uses a 64-bit virtual address space, which allows it to address up to 2^64 unique memory locations, thus greatly expanding to the addressable memory comparing to the 16-bit real mode. In some embodiments, the original vector is passed in a register to allow a 16-bit emulator to support legacy 16-bit SIPI code.

In one embodiment, the INIT/SIPI messages are sent from the boot processor using a register such as the interrupt command register (ICR). The ICR is a control register used in the Advanced Programmable Interrupt Controller (APIC) architecture, which is responsible for managing interrupts in. The INIT message puts the receiving processor into a WAIT-FOR-SIPI state and reinitializes most registers back to the reset state. In one implementation, the new INIT/SIPI architecture described herein (sometimes referred to as NEWINIT/NEWSIPI) supports booting directly into paged 64-bit mode and the execution environment for the target processor is defined through an entry structure in memory.

One implementation of the entry structure contains a new instruction pointer, control registers for paging, a stack pointer, various other state information, and storage to optionally store some previous register contents. The ICR register (MSR 830h or offset 300h in the MMIO APIC page) can be used to send INIT and SIPI messages between processors, such as from the boot processor/core to the other processors/cores. The INIT message initializes the other processors/cores by clearing registers and places the processors/cores into the WAIT-FOR-SIPI state.

In response to the SIPI message, the receiving processor checks one or more enable bits in a package-scoped entry structure register and in an entry structure memory location, and when NEWSIPI is enabled in both, it reads the information in the entry struct pointed to by the package-scoped entry structure register to initialize the program counter and other registers. When NEWSIPI is disabled, the receiving processor reverts to legacy real mode SIPI operations.

FIG. 24 illustrates an architecture and associated process for booting a processor/core in accordance with some embodiments. A boot processor/core 2401 generates an entry structure data structure (also referred to as SIPI entry structure), entry_struct 2411 in memory 2410 (e.g., filling in this structure in response to BIOS/boot code 2403 or using an existing read-only structure stored in flash). The boot processor/core 2401 then uses startup INIT/SIPI messages 2441A-B sent via a register such as the ICR 2440 as shown to initialize and boot the other processor/core 2420. More processor/cores may be booted by the boot processor/core 2401 in a similar manner.

In one implementation, upon receipt of the INIT message 2441A, the processor/core 2420 is put into a WAIT-FOR-SIPI state and reinitializes most registers back to the reset state as discussed herein above. In another implementation, upon receipt of the INIT message 2441A, the processor/core 2420 reads a new package-scoped entry structure register, IA32_SIPI_ENTRY_STRUCT_PTR MSR 2407, and confirms that the entry structure enable bit (e.g., bit 0 in one embodiment) is set to 1. This bit is sometimes referred to as the SIPI_ENTRY_STRUCT_PTR bit. If not set to 1, then the core/processor 2420 may use the legacy INIT flow if the processor is an IA64 processor; otherwise, it will shut down. If the entry structure enable bit is set to 1, the processor/core 2420 enables the NEWSIPI mode, clears its registers (e.g., via the INIT flow or a similar flow), and enters into a WAIT-FOR-SIPI state. While setting the enable bit to 1 indicates enablement in some embodiments, other embodiments may set the enable bit to 0.

In response to receipt of the SIPI message 2441B, the processor/core 2420 again confirms the entry structure enable bit (e.g., bit 0) is set to 1. If it is set to 0, then the legacy INIT flow may be used if the processor/core 2420 is IA64; otherwise it will shut down. If the entry structure enable bit is set to 1, the processor/core 2420 moves the ICR vector (content of the ICR register) to register R10 and loads state from the entry_struct 2411 in memory 2410, using the pointer provided from the SIPI_ENTRY_STRUCT_PTR MSR 2407. The processor/core 2420 uses the state from entry_struct 2411 to initialize to 64-bit paged mode with page tables and status registers. Details associated with INIT, SIPI, and the entry_struct 2411 of some implementations are provided below.

Embodiments of the Entry Structure

As mentioned, entry_struct 2411 is physically addressed in memory 2410 and specifies the execution environment of the processor/core 2420 after performing the SIPI operations. It may also include predefined space to save previous register contents for crash analysis purposes.

In some embodiments, for all fields in entry_struct 2411, the same reserved bit rules apply as for their matching registers. When any reserved or inconsistent bits are encountered on loading the register values, the receiving processor/core enters shutdown. In some implementations, all accesses to entry_struct 2411 happen with the same access rights as an otherwise unprivileged ring 0 access.

Processor State after New INIT

In one embodiment, in response to the new INIT message 2441A, each processor/core 2420 flushes its TLBs and loads all the state reset by the legacy INIT message (except where specified differently below). In particular, in response to the new INIT message 2441A, each processor/core 2420 executes in 64-bit supervisor mode, setting the fields of the code segment register (CS) to the following values in some embodiments: Selector=8, Base=0, Limit=ffffh, Type=11, S=1, DPL=0, P=1, L=1, D=0, G=1. It also sets the extended feature enable MSR (EFER) to SYSCALL[0]=1, LME[8]=1, and LMA[10]=1 and sets DS/FS/GS/ES/SS to a 0 base with no limit. The state is specified by the entry_struct 2411 and NMIs are blocked until the next interrupt return instruction (e.g., IRET).

Implementations of the Entry Structure Pointer

In one embodiment, the entry structure pointer is stored in a package scope register e.g., an entry structure pointer MSR, IA32_SIPI_ENTRY_STRUCT_PTR 2407, an example of which is shown in Table 1. This MSR defines the execution context of the target processor/core 2420 after receiving the SIPI message 2441B. In this embodiment, bit 0 indicates whether 64-bit SIPI is enabled and the SIPI_ENTRY_STRUCT_PTR encoded in bits MAXPA: 12 points to the entry_struct 2411 in memory 2410, an example of which is provided in Table 2. The MAXPA is the maximum physical address. In some implementations, the entry structure pointer MSR 2407 is read only after the package bit is set to indicate the completion of the Basic Input/Output System (BIOS) initialization process, e.g., the BIOS_DONE MSR bit.

TABLE 1

| SIPI Entry Structure Pointer Example (e.g., IA32_SIPI_ENTRY_STRUCT_PTR MSR 2407) | | | | |
|---|---|---|---|---|
| Bits | Field | Attr | Reset Value | Description |
| 63:MAXPA | Reserved | NA | 0 | — |
| MAXPA:12 | SIPI_ENTRY_STRUCT_PTR | RW | 0 | Physical address pointer to an entry structure data structure (e.g., entry_struct 2411) |
| 11:1 | Reserved | NA | 0 | — |
| 0 | ENABLED | RW | 0 | Enable 64-bit SIPI |

As shown in Table 2, an entry structure data structure such as entry_struct 2411 includes an enable bit at offset 0, which causes a processor shutdown if set to 0 while receiving INIT, and a new instruction pointer at offset 8 to execute after SIPI (valid values of which depend on new CR4, which indicates, e.g., whether 5 level paging is enabled or not and whether the RIP is 48-bit or 57-bit sign extended). The entry_struct 2411 also includes a new CR3 value, which must be consistent with the new CR4.PCIDE and with no reserved bits set; a new CR0 value comprising non-flexible bits which must match fixed values and no reserved bits set; and a new CR4 value comprising non-flexible bits which must match a corresponding fixed value, must be consistent with the new CR3, the new RIP, the new CR0, and with no reserved bits set.

Consistency Checks

In one embodiment, the processor will shut down if the entry_struct 2411 is not aligned to 4096 bytes, when entry_struct->features!=1 or when any register values are inconsistent with other specified control registers.

TABLE 2

| Entry Structure Data Structure Example (e.g., entry_struct 2411) | | | | |
|---|---|---|---|---|
| Offset | Size | RW | Name | Description |
| 0 | 8 | R | FEATURES | Bit 0 - enable bit (0 - shutdown). Other bits are reserved. |
| 8 | 8 | R | RIP | New instruction pointer to execute after SIPI. Valid values depend on new CR4. |
| 16 | 8 | R | CR3 | New CR3 value. Must be consistent with new CR4. PCIDE and no reserved bits set. |
| 24 | 8 | R | CR0 | New CR0 value. Non-flexible bits must match fixed values and no reserved bits set. |
| 32 | 8 | R | CR4 | New CR4 value. Non-flexible bits must match fixed value. Must be consistent with new CR3, new RIP, new CR0 and no reserved bits set. |

In addition to the "features" field, the entry structure also includes values for the instruction pointer RIP, the new CR3 register that is for paging, and the new CR0 and CR4 registers. Tables 3 and 4 show the fields of exemplary CR0 and CR4 registers, where certain fields are preset to certain values.

TABLE 3

| Exemplary CR0 Register | | |
|---|---|---|
| Bit | Field | Comments |
| 0 | PE | Always 1 |
| 1 | MP | Always 0 |
| 2 | EM | Always 0. Must be 0 for SSE |
| 3 | TS | Always 0 |
| 5 | NE | Always 1 |
| 16 | WP | Always 1 |
| 18 | AM | Always 0 |
| 29 | NW | Always 0 |
| 31 | PG | Always 1 |

TABLE 4

| Exemplary CR4 Register | | |
|---|---|---|
| Bit | Field | Comments |
| 0 | VME | Always 0 |
| 1 | PVI | Always 0 |
| 2 | TSD | |
| 3 | DE | Always 1 |
| 4 | PSE | Always 0. PSE has no meaning for 4 or 5 level paging |
| 5 | PAE | Always 1 |
| 6 | MCE | |
| 7 | PGE | Always 1. SW can use INVPCID to invalidate all global pages |
| 8 | PCE | |
| 9 | OSFXSR | |
| 10 | OSXMMEXCPT | |
| 11 | UMIP | Always 1. All instructions targeted by UMIP are removed. |
| 12 | LA57 | |
| 13 | VMXE | Always 1 |
| 14 | SMXE | |
| 16 | FSGSBASE | |
| 17 | PCIDE | |
| 18 | OSXSAVE | |
| 20 | SMEP | |
| 21 | SMAP | |
| 22 | PKE | |

The following pseudo code specifies operation of each processor/core 2420 when receiving INIT in accordance with some embodiments of the disclosure:

```
IF in guest mode THEN
   Trigger exit
FI
IF IA32_SIPI_ENTRY_STRUCT_PTR.ENABLED = 0 THEN
Shutdown OR fallback to legacy INIT ; FI
RFLAGS = 2 # clear all modifiable bits in RFLAGS (in particular IF)
Clear flexible bits in CR2/CR3/CR4
Clear TS and AM bits in CR0, preserve CR0.CD # rest is fixed values Set
CS/SS/DS/ES/FS/GS/GDTR/IDTR/TS selector to 0, with P=1, W=1
Set IDTR/TS/GDTR limits to 0 Clear FS/GS bases
Clear KERNEL_GS MSR
Set RDX to 0x000n06xxx, where n is extended model value and x is a
stepping number
Clear all other GPRs Clear DR0/DR1/DR2/DR3 Set DR6 to 0xffff0ff0 Set
DR7 to 0x400
Set x87 FPU control word to 0x37f
Set x87 FPU status word to 0
Set x87 FPU tag word to 0xffff
Flush all TLBs
IF IA32_APICBASE.BSP = 1 THEN   Force 64bit supervisor mode
   Execute 64bit reset vector
ELSE
   Enter wait for sipi state
FI
```

The following pseudocode specifies operation of each processor/core 2420 when receiving SIPI in accordance with some embodiments of the disclosure:

```
IF IA32_SIPI_ENTRY_STRUCT_PTR.ENABLED = 0 THEN Shutdown ; FI
// following memory reads are done physically with normal ring 0 rights honoring range
registers and allowing MKTME keys but not TDX
ENTRY_STRUCT = IA32_SIPI_ENTRY_STRUCT_PTR[12:MAXPA]
IF ENTRY_STRUCT->FEATURES != 1 THEN Non triple fault Shutdown OR fallback
to legacy SIPI; FI
# note the order of these checks is not defined
newCR4 = ENTRY_STRUCT->CR4 # read entry_struct.CR4
newRIP = ENTRY_STRUCT->RIP # read entry_struct.RIP
newCR0 = ENTRY_STRUCT->CR0 # read entry_struct.CR0
newCR3 = ENTRY_STRUCT->CR3 # read entry_struct.CR3
IF newCR4.VME != 0 OR newCR4.PVI != 0 OR newCR4.DE != 1 OR newCR4.PSE !=
0 OR newCR4.PAE != 1 OR newCR4.UMIP != 1 OR
newCR4 has reserved bits set OR
newCR0.PE != 1 OR newCR0.MP != 1 OR newCR0.EM != 0 OR newCR0.ET != 1 OR
newCR0.NE != 1 or newCR0.NW != 0 OR newCR0.PG != 1 OR
newCR3 has reserved bits set depending on newCR4.PCIDE OR newRIP is not
canonical depending on newCR4.LA57 THEN
   Unbreakable Shutdown
FI
CR4 = newCR4 ; CR3 = newCR3 ; CR0 = newCR0
Move received SIPI vector zero extended to R10 //SIPI vector stores the instruction
pointer where execution begins after the SIPI operation (shifted by 12 bits).
Force 64-bit supervisor mode
NMIs are blocked
RIP = newRIP
```

In one implementation, the 64-bit SIPI passes the original APIC vector (also referred to as legacy vector) that a legacy SIPI uses to specify the 16-bit code execution address in the R10 register to the target processor/core 2420. The original APIC vector is an 8-bit vector, and the 16-bit code execution address is shifted down by 12 bits. This allows firmware to support a legacy OS that does not know about the 64-bit SIPI by pointing the entry_struct to an emulation subroutine in the firmware space. When a legacy OS tries to boot a CPU using legacy SIPI (without changing the entry_struct in memory which it doesn't know about), it will trigger the emulation subroutine. The emulation can then start emulating 16-bit code at the specified address and execute the legacy OS boot code until it reaches 64-bit code.

The embodiments of the disclosure provide numerous benefits over existing implementations. For example, booting application processors does not need to support 16-bit mode. As a result, users/customers do not need to write custom 16-bit code to start application processors. The initial entry code does not need to be placed in the first 1 MB physical memory, which provides more flexibility in physical memory allocation for firmware, OS, and hardware. Moreover, passing the legacy vector enables software emulation of legacy 16-bit SIPI entry code as needed.

Figure 25:
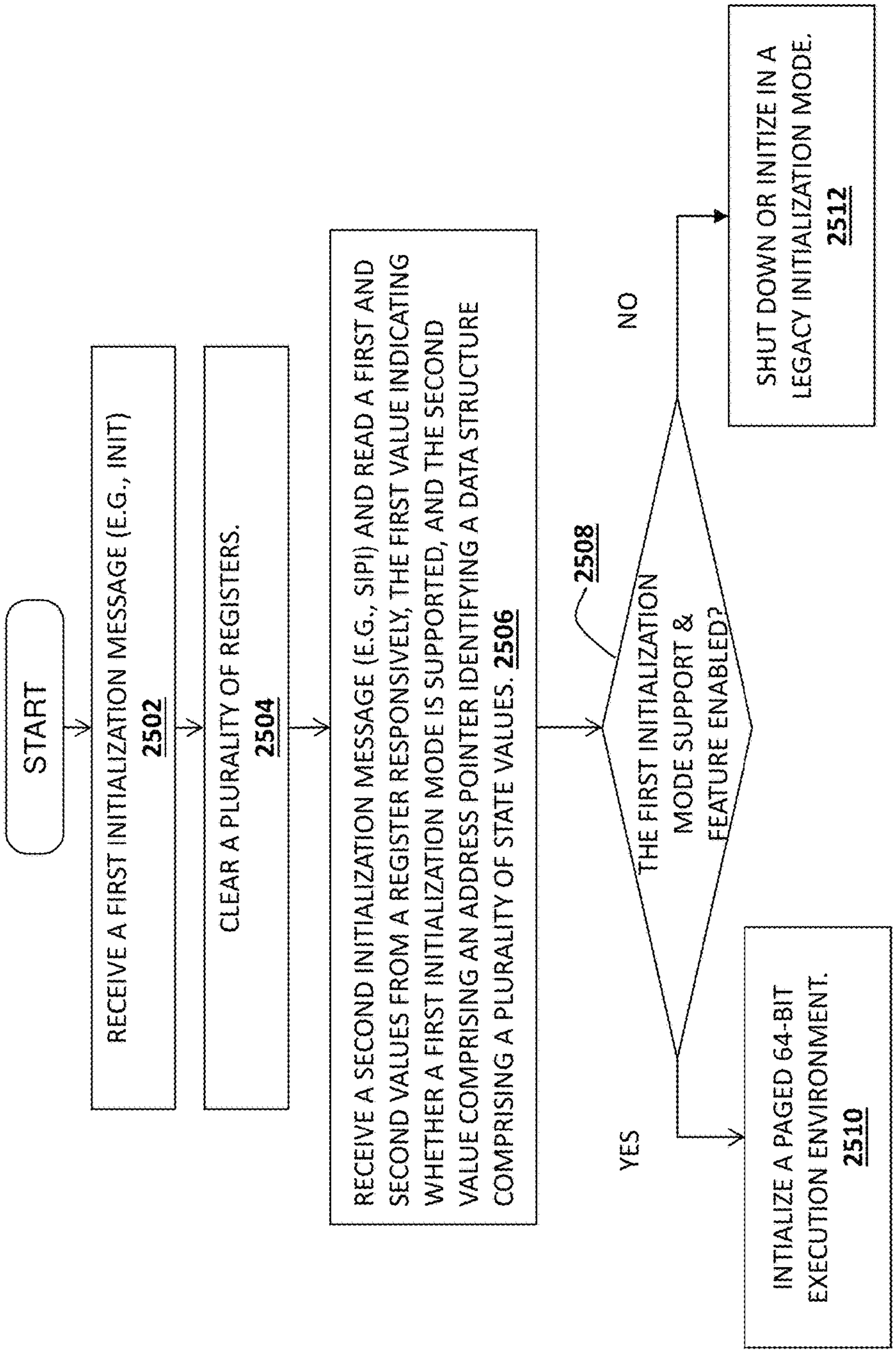
FIG. 25 illustrates operations to boot a processor/core in accordance with some embodiments.

FIG. 25 illustrates operations to boot a processor/core in accordance with some embodiments. The operations may be performed by an application processor or a processor core (e.g., process/core 2420). A processor core of a multicore processor is used as an example to describe the operations.

At reference 2502, the processor core receives a first initialization message (e.g., the INIT message). The processor core then clears a plurality of registers responsive to the first initialization message at reference 2504. The processor core is placed into a state to wait for a SIPI message. The processor core may also flush its TLBs and load all the state reset by the legacy INIT message, except executing the 64-bit supervisor mode, setting the fields of the CS to a set of values (exemplary values are listed herein above).

At reference 2506, the processor core receives a second initialization message (e.g., the SIPI message) and reading the first and second values from a register responsive to receiving the second initialization message, the first value indicating whether a first initialization mode is supported, and the second value comprising an address pointer identifying a data structure comprising a plurality of state values. In some embodiments, the first initialization mode is the paged 64-bit mode, and the register is a package scope register e.g., an MSR, IA32_SIPI_ENTRY_STRUCT_PTR 2407. The first and second values are indicated through the one or more enable bits and the physical address pointer to an entry structure data structure, respectively, as discussed herein above.

At reference 2508, it is determined whether the first initialization mode is supported and whether the data structure indicates enabling the paged 64-bit execution environment feature.

Responsive to the first value indicating the first initialization mode is supported and the data structure indicating enabling the paged 64-bit execution environment, the processor core initializes the paged 64-bit execution environment using the plurality of state values from the data structure at reference 2510.

Otherwise, the processor core is shut down or initialized in a legacy initialization mode (e.g., the 16-bit real mode) at reference 2512.

In some embodiments, when the first initialization mode is not supported, the first core is shut down. In some embodiments, when the first initialization mode is supported but the data structure indicates disabling the paged 64-bit execution environment, the first core is to perform initialization in accordance with a legacy initialization mode.

In some embodiments, initializing the 64-bit paged mode execution environment comprises loading a plurality of control register values or status register values from the data structure.

In some embodiments, the first and second initialization messages are transmitted by a boot processor/core executing initialization program code.

In some embodiments, the initialization program code comprises basic input-output system (BIOS) firmware code.

In some embodiments, the first and second initialization messages transmitted by the boot processor/core are stored in an interrupt command register (ICR) and the first core is to read the first and second initialization messages from the ICR.

In some embodiments, when the first initialization mode is supported, the first core is to flush all translation lookaside buffers (TLBs) responsive to the first initialization message.

In some embodiments, the data structure indicates an instruction pointer pointing to instructions to be executed in the paged 64-bit execution environment after the initialization.

In some embodiments, the data structure indicates one or more values of a control register for paging.

EXAMPLES

The following are example implementations of different embodiments of the disclosure.

Example 1. A processor comprising: a register to store a first value and a second value related to a secure boot process; a plurality of cores, at least a first core of the plurality of cores to perform operations to boot directly into a paged 64-bit execution environment, the operations comprising: receiving a first initialization message, the first core to clear a plurality of registers responsive to the first initialization message; receiving a second initialization message and reading the first and second values from the register responsive to receiving the second initialization message, the first value indicating whether a first initialization mode is supported, and the second value comprising an address pointer identifying a data structure comprising a plurality of state values; and initializing the paged 64-bit execution environment using the plurality of state values from the data structure responsive to the first value indicating the first initialization mode is supported and the data structure indicating enabling the paged 64-bit execution environment.

Example 2. The processor of example 1, wherein when the first initialization mode is not supported, the first core is shut down.

Example 3. The processor of examples 1 or 2, wherein when the first initialization mode is supported but the data structure indicates disabling the paged 64-bit execution environment, the first core is to perform initialization in accordance with a legacy initialization mode.

Example 4. The processor of any of examples 1-3, wherein initializing the 64-bit paged mode execution environment comprises loading a plurality of control register values or status register values from the data structure.

Example 5. The processor of any of examples 1-4, wherein the first and second initialization messages are transmitted by a boot processor/core executing initialization program code.

Example 6. The processor of any of examples 1-5 wherein the initialization program code comprises basic input-output system (BIOS) firmware code.

Example 7. The processor of any of examples 1-6 further comprising: an interrupt command register (ICR) to store the first and second initialization messages transmitted by the boot processor/core, the first core to read the first and second initialization messages from the ICR.

Example 8. The processor of any of examples 1-7, wherein when the first initialization mode is supported, the first core is to flush all translation lookaside buffers (TLBs) responsive to the first initialization message.

Example 9. The processor of any of examples 1-8, wherein the data structure indicates an instruction pointer pointing to instructions to be executed in the paged 64-bit execution environment after the initialization.

Example 10. The processor of any of examples 1-9, wherein the data structure indicates one or more values of a control register for paging.

Example 11. A method comprising: storing a first value and a second value related to a secure boot process in a register; and booting a first core of a plurality of cores directly into a paged 64-bit execution environment by performing: receiving a first initialization message, the first core to clear a plurality of registers responsive to the first initialization message; receiving a second initialization message and reading the first and second values from the register responsive to receiving the second initialization message, the first value indicating whether a first initialization mode is supported, and the second value comprising an address pointer identifying a data structure comprising a plurality of state values; and initializing the paged 64-bit execution environment using the plurality of state values from the data structure responsive to the first value indicating the first initialization mode is supported and the data structure indicating enabling the paged 64-bit execution environment.

Example 12. The method of example 11, wherein when the first initialization mode is not supported, the first core is shut down.

Example 13. The method of examples 11 or 12, wherein when the first initialization mode is supported but the data structure indicates disabling the paged 64-bit execution environment, the first core is to perform initialization in accordance with a legacy initialization mode.

Example 14. The method of any of examples 11-13, wherein initializing the 64-bit paged mode execution environment comprises loading a plurality of control register values or status register values from the data structure.

Example 15. The method of any of examples 11-14, wherein the first and second initialization messages are transmitted by a boot processor/core executing initialization program code.

Example 16. A machine-readable medium having program code stored thereon which, when executed by a machine, causes the machine to perform: storing a first value and a second value related to a secure boot process in a register; and booting a first core of a plurality of cores directly into a paged 64-bit execution environment by performing: receiving a first initialization message, the first core to clear a plurality of registers responsive to the first initialization message; receiving a second initialization message and reading the first and second values from the register responsive to receiving the second initialization message, the first value indicating whether a first initialization mode is supported, and the second value comprising an address pointer identifying a data structure comprising a plurality of state values; and initializing the paged 64-bit execution environment using the plurality of state values from the data structure responsive to the first value indicating the first initialization mode is supported and the data structure indicating enabling the paged 64-bit execution environment.

Example 17. The machine-readable medium of example 16, wherein the first and second initialization messages are transmitted by a boot processor/core executing initialization program code.

Example 18. The machine-readable medium of example 16 or 17, wherein the initialization program code comprises basic input-output system (BIOS) firmware code.

Example 19. The machine-readable medium of any of examples 16-18, wherein when the first initialization mode is supported, the first core is to flush all translation lookaside buffers (TLBs) responsive to the first initialization message.

Example 20. The machine-readable medium of any of examples 16-19, wherein the data structure indicates an instruction pointer pointing to instructions to be executed in the paged 64-bit execution environment after the initialization.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more buses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the disclosure may be implemented using different combinations of software, firmware, and/or hardware. Throughout this detailed description, for the purpose of explanation, numerous specific details were set forth in order to provide a thorough understanding of the present disclosure. It will be apparent, however, to one skilled in the art that the disclosure may be practiced without some of these specific details. In certain instances, well known structures and functions were not described in elaborate detail in order to avoid obscuring the subject matter of the present disclosure. Accordingly, the scope and spirit of the disclosure should be judged in terms of the claims which follow.

What is claimed is:

1. A processor comprising:

a register to store a first value and a second value related to a secure boot process; and a plurality of cores, at least a first core of the plurality of cores to perform operations to boot directly into a paged 64-bit execution environment, the operations comprising:

receiving a first initialization message, the first core to clear a plurality of registers responsive to the first initialization message;

receiving a second initialization message and reading the first and second values from the register responsive to receiving the second initialization message, the first value indicating whether a first initialization mode is supported, and the second value comprising an address pointer identifying a data structure comprising a plurality of state values; and initializing the paged 64-bit execution environment using the plurality of state values from the data structure responsive to the first value indicating the first initialization mode is supported and the data structure indicating enabling the paged 64-bit execution environment.

2. The processor of claim 1, wherein when the first initialization mode is not supported, the first core is shut down.

3. The processor of claim 1, wherein when the first initialization mode is supported but the data structure indicates disabling the paged 64-bit execution environment, the first core is to perform initialization in accordance with a legacy initialization mode.

4. The processor of claim 1, wherein initializing the 64-bit paged mode execution environment comprises loading a plurality of control register values or status register values from the data structure.

5. The processor of claim 1, wherein the first and second initialization messages are transmitted by a boot processor/core executing initialization program code.

6. The processor of claim 5, wherein the initialization program code comprises basic input-output system (BIOS) firmware code.

7. The processor of claim 5, further comprising:

an interrupt command register (ICR) to store the first and second initialization messages transmitted by the boot processor/core, the first core to read the first and second initialization messages from the ICR.

8. The processor of claim 1, wherein when the first initialization mode is supported, the first core is to flush all translation lookaside buffers (TLBs) responsive to the first initialization message.

9. The processor of claim 1, wherein the data structure indicates an instruction pointer pointing to instructions to be executed in the paged 64-bit execution environment after the initialization.

10. The processor of claim 1, wherein the data structure indicates one or more values of a control register for paging.

11. A method comprising:

storing a first value and a second value related to a secure boot process in a register; and booting a first core of a plurality of cores directly into a paged 64-bit execution environment by performing:

receiving a first initialization message, the first core to clear a plurality of registers responsive to the first initialization message;

receiving a second initialization message and reading the first and second values from the register responsive to receiving the second initialization message, the first value indicating whether a first initialization mode is supported, and the second value comprising an address pointer identifying a data structure comprising a plurality of state values; and initializing the paged 64-bit execution environment using the plurality of state values from the data structure responsive to the first value indicating the first initialization mode is supported and the data structure indicating enabling the paged 64-bit execution environment.

12. The method of claim 11, wherein when the first initialization mode is not supported, the first core is shut down.

13. The method of claim 11, wherein when the first initialization mode is supported but the data structure indicates disabling the paged 64-bit execution environment, the first core is to perform initialization in accordance with a legacy initialization mode.

14. The method of claim 11, wherein initializing the 64-bit paged mode execution environment comprises loading a plurality of control register values or status register values from the data structure.

15. The method of claim 11, wherein the first and second initialization messages are transmitted by a boot processor/core executing initialization program code.

16. A non-transitory computer-readable storage medium storing instructions that when executed by a processor of a computing system, are capable of causing the computing system to perform:

storing a first value and a second value related to a secure boot process in a register; and booting a first core of a plurality of cores directly into a paged 64-bit execution environment by performing:

receiving a first initialization message, the first core to clear a plurality of registers responsive to the first initialization message;

receiving a second initialization message and reading the first and second values from the register responsive to receiving the second initialization message, the first value indicating whether a first initialization mode is supported, and the second value comprising an address pointer identifying a data structure comprising a plurality of state values; and initializing the paged 64-bit execution environment using the plurality of state values from the data structure responsive to the first value indicating the first initialization mode is supported and the data structure indicating enabling the paged 64-bit execution environment.

17. The non-transitory computer-readable storage medium of claim 16, wherein the first and second initialization messages are transmitted by a boot processor/core executing initialization program code.

18. The non-transitory computer-readable storage medium of claim 17, wherein the initialization program code comprises basic input-output system (BIOS) firmware code.

19. The non-transitory computer-readable storage medium of claim 16, wherein when the first initialization mode is supported, the first core is to flush all translation lookaside buffers (TLBs) responsive to the first initialization message.

20. The non-transitory computer-readable storage medium of claim 16, wherein the data structure indicates an instruction pointer pointing to instructions to be executed in the paged 64-bit execution environment after the initialization.

* * * * *